(12) United States Patent
Davies

(10) Patent No.: US 7,961,650 B2
(45) Date of Patent: Jun. 14, 2011

(54) NETWORK ARCHITECTURE

(76) Inventor: Christopher Michael Davies, Toronto (CA)

( * ) Notice: Subject to any disclaimer, the term of this patent is extended or adjusted under 35 U.S.C. 154(b) by 793 days.

(21) Appl. No.: 10/598,020

(22) PCT Filed: Feb. 16, 2005

(86) PCT No.: PCT/CA2005/000194
§ 371 (c)(1),
(2), (4) Date: Apr. 5, 2007

(87) PCT Pub. No.: WO2005/079001

PCT Pub. Date: Aug. 25, 2005

(65) Prior Publication Data

US 2007/0286097 A1    Dec. 13, 2007

Related U.S. Application Data

(60) Provisional application No. 60/544,314, filed on Feb. 17, 2004.

(30) Foreign Application Priority Data

| Feb. 16, 2004 | (CA) | 2457909 |
| Apr. 20, 2004 | (CA) | 2464274 |
| May 17, 2004 | (CA) | 2467063 |
| Jun. 22, 2004 | (CA) | 2471929 |
| Aug. 16, 2004 | (CA) | 2476928 |
| Sep. 20, 2004 | (CA) | 2479485 |

(51) Int. Cl.
*H04L 12/28* (2006.01)

(52) U.S. Cl. .................. 370/255; 709/243

(58) Field of Classification Search ............... 370/255; 709/243, 239; 455/566
See application file for complete search history.

(56) References Cited

U.S. PATENT DOCUMENTS 6,788,650 B2    9/2004    Chen et al.
(Continued)

FOREIGN PATENT DOCUMENTS

JP    2002-158669    5/2002
(Continued)

OTHER PUBLICATIONS

International Search Report issued in PCT/CA2005/00194, Jun. 9, 2005.

*Primary Examiner* — Dang T Ton
*Assistant Examiner* — Wei Zhao
(74) *Attorney, Agent, or Firm* — Torys LLP

(57) ABSTRACT

The present invention provides a network architecture. An embodiment includes a plurality of nodes interconnected by links. Each node can maintain knowledge of other nodes in a database. The database contains a list of other nodes in the network, and a 'next-best-step' for each of those other nodes, pointing to a neighbouring node that is the next best step to that other node. Where a particular node of the network is not in the list, then the next-best-step is assumed to be the next-best-step most commonly identified in the database. Such a network will form a "core" wherein any node in the network can find any other node in the network by first seeking out that other node at the core. Once the nodes locate each other via the core, a more optimum route forms in the network according to the most desirable path between those nodes.

35 Claims, 54 Drawing Sheets

U.S. PATENT DOCUMENTS

| | | | |
|---|---|---|---|
| 2002/0046273 A1* | 4/2002 | Lahr et al. | 709/224 |
| 2003/0177263 A1* | 9/2003 | Robinson | 709/239 |
| 2004/0003111 A1 | 1/2004 | Maeda et al. | |
| 2004/0018839 A1 | 1/2004 | Andric et al. | |
| 2004/0054807 A1* | 3/2004 | Harvey et al. | 709/243 |
| 2004/0097232 A1* | 5/2004 | Haverinen | 455/436 |
| 2005/0070303 A1* | 3/2005 | Lagno et al. | 455/456.1 |

FOREIGN PATENT DOCUMENTS

| | | |
|---|---|---|
| JP | 2003-069579 | 3/2003 |
| WO | WO 02/073354 A2 | 9/2002 |
| WO | WO 02/076028 A1 | 9/2002 |
| WO | WO 03/046760 A2 | 6/2003 |
| WO | WO 03/058917 A1 | 7/2003 |

* cited by examiner

The ultimate destination node is connected to several nodes in the network and prepares to send an initial destination node update to its directly connected neighbor nodes.

As destination node knowledge spreads, each
node that gets told of the destination node
selects the node that told it as the 'target node'
for messages routed to that destination node.

Knowledge of the destination node continues to spread, with each node that is told about the destination node choosing the node that told it. If another node provided it with a better hop cost later, the node would choose the directly connected node with the better hop cost.

In this step all nodes in the network are aware of the destination node and have a 'target node' that they can send messages that are destined for the destination node.

Step 1 – Node A creates queue A1 and asks node B For a queue to send messages to.
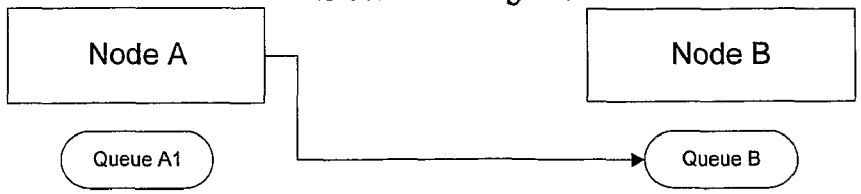
Step 2 – Node B creates queue B1 and tells node A about it using queue A1.
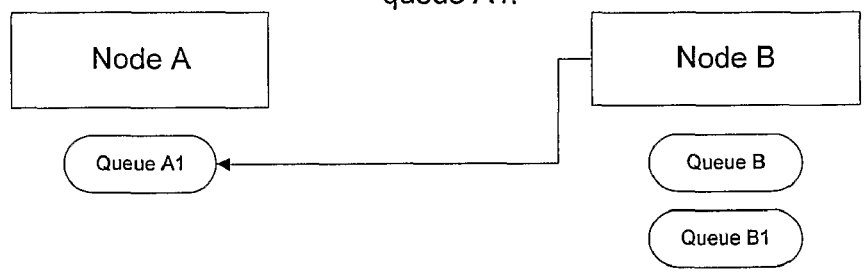
Step 3 – Node A sends a messages to queue B1 and node B sends ACK's to node A1.
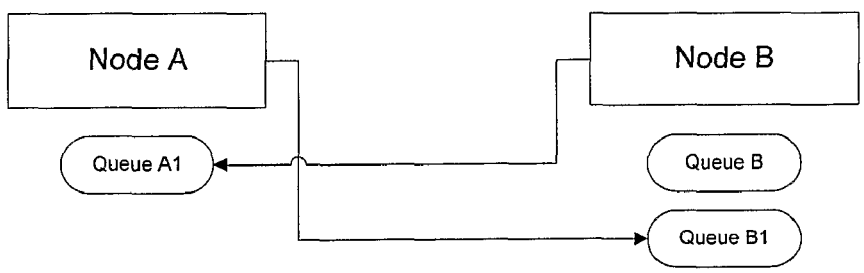
Step 4 – Node A sends a messages to queue B confirming a connection to queue B1
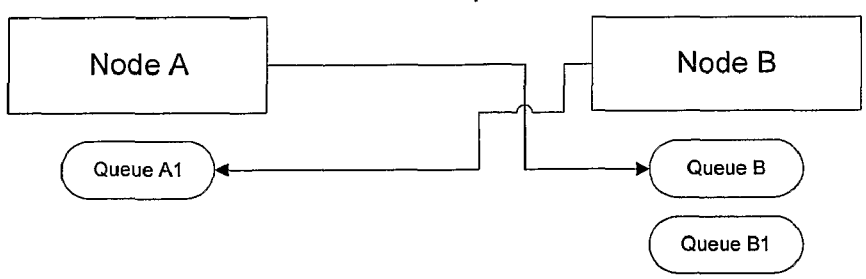
Fig 31

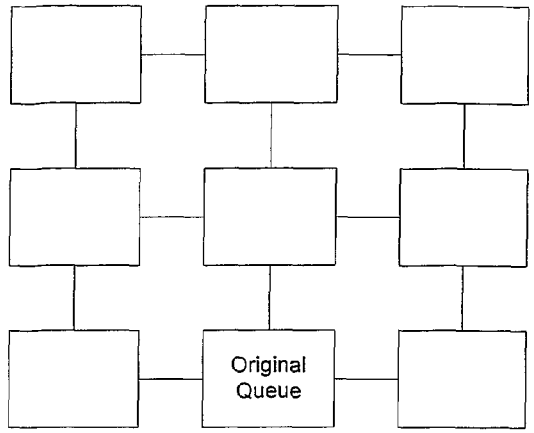
Step 1 – an EUS has created a Queue, and only the node that contains the EUS knows of the queue.
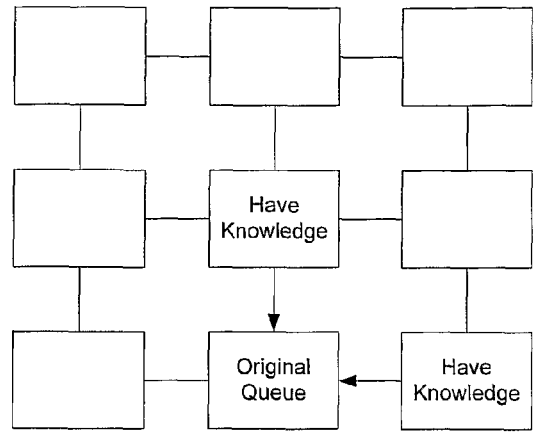
Step 2 – Next iteration, two directly connected nodes now know of the queue. The arrows represent chosen destinations.
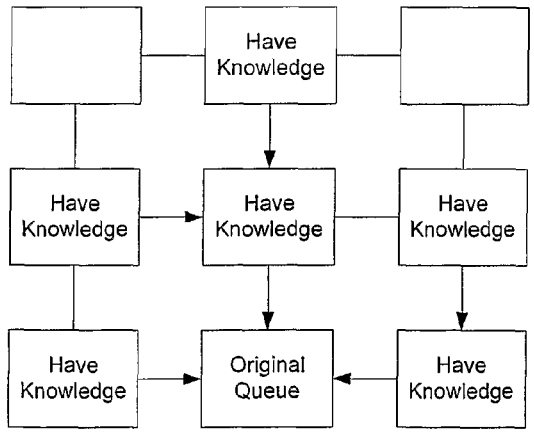
Step 3 – Knowledge continues to spread
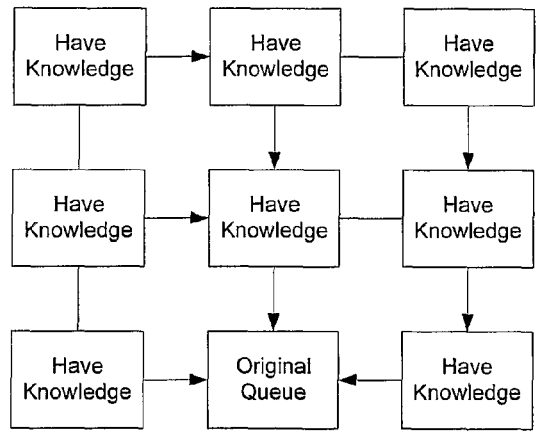
Step 4 – The whole network now has knowledge of the queue and there are no loops.
Fig 32

Latency At Infinity

The nodes with the thick outlines constitute the data path

A network of nodes connected by links. An arrow indicates a nodes choice for its next best step to the core. A line with two arrows indicates two nodes have chosen each other as their next best step to the core.

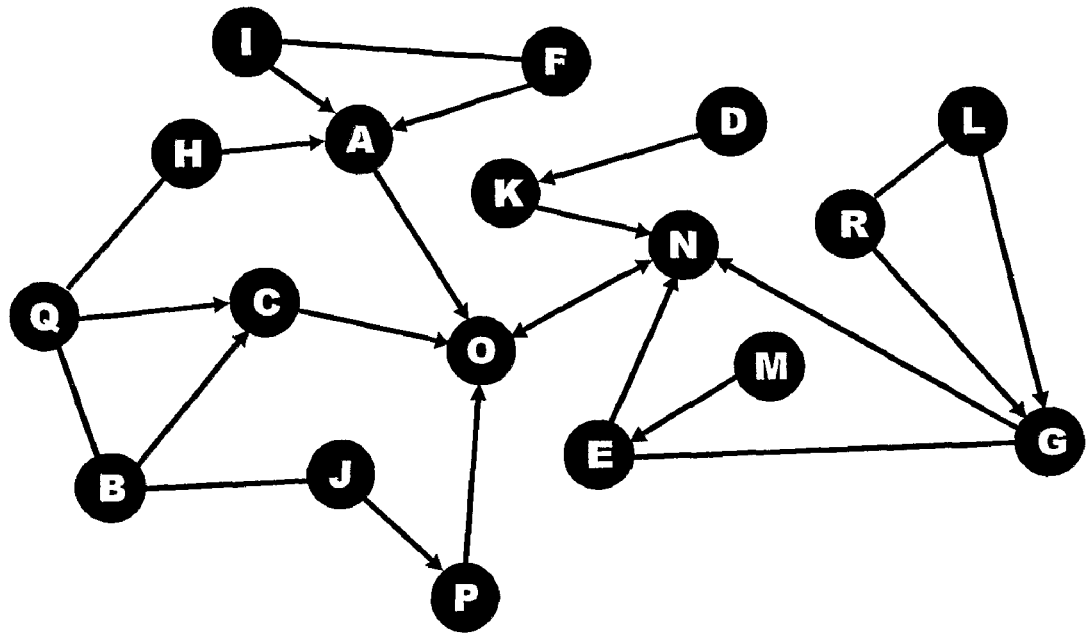

This is the identical network that has been rearranged to better show the hierarchy that is formed by having each node pick its next best step to the core. The two nodes at the top of the hierarchy form the core.

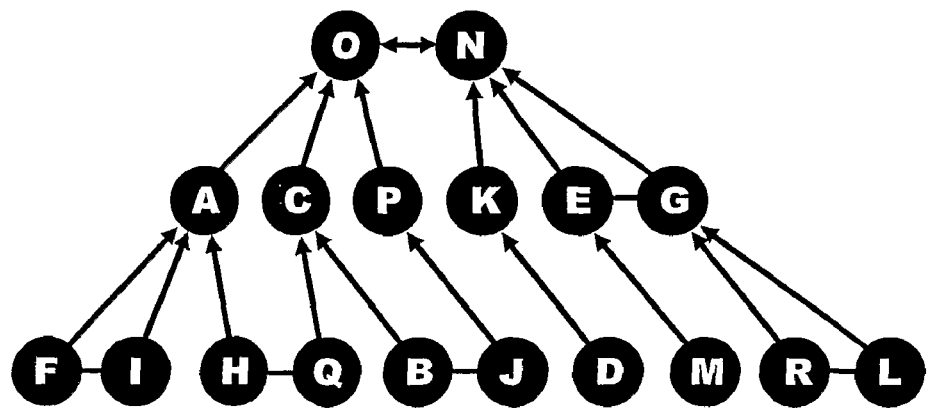

Fig 54

NETWORK ARCHITECTURE

PRIORITY CLAIMS

The present application claims priority from Canadian Patent Application No. 2,457,909, filed Feb. 16, 2004, U.S. Provisional Patent Application No. 60/544,341, filed Feb. 17, 2004, Canadian Patent Application No. 2,464,274, filed Apr. 20, 2004, Canadian Patent Application No. 2,467,063, filed May 17, 2004, Canadian Patent Application No. 2,471,929, filed Jun. 22, 2004, Canadian Patent Application No. 2,476, 928, filed Aug. 16, 2004 and Canadian Patent Applicant No. 2,479,485, filed Sep. 20, 2004, the contents of all of which are incorporated herein by reference.

FIELD OF THE INVENTION

The present invention relates generally to electronic, telecommunication and computing devices that communicate with each other and more particularly to a network architecture therefor.

BACKGROUND OF THE INVENTION

Networked devices are now an extremely important aspect of our social fabric. The public switched telephone network ("PSTN") is perhaps the first example of a ubiquitous network of telecommunication devices that changed the way people interact. Now, mobile telephone networks, the Internet, local area networks ("LAN"), wide area networks ("WAN"), voice over internet protocol ("VOIP") networks, are widely deployed and growing.

It is trite to say that each of these devices need to be able to reach each other in order to fulfill networking functions. With the PSTN, a system of telephone numbers is employed, including country codes, area codes, local exchanges, etc. At least in North America, the explosion of telephonic devices has stretched the standard ten digit number scheme. With the Internet, the Internet Protocol Version 4 ("IPV4") promulgates a system of Internet Protocol ("IP") addresses to identify points on the Internet, and thus each networked device has an address making it reachable on the Internet. Due at least in part to the limited length of the IPV4 address field, IP addresses can bear little geographic relationship to their physical location. As a result, routers and routing tables throughout the Internet are extremely bloated, increasing complexity in traffic routing and increasing network latency. IPV6 offers potential relief addresses, but the upgrade to IPV6 is expected to be slow.

In very general terms, many prior art network architectures rely on routing devices to maintain addresses and locations of the devices throughout the network. Such routing devices are essentially traffic cops, routing traffic along appropriate pathways. Such architectures become clumsy and awkward as the networks grow.

Various "router-less" network architectures have been proposed. Some of these architectures are referred to as peer-to-peer networks, while others are referred to as ad-hoc networks. Regardless, these prior art architectures also tend to suffer from scaling and/or other limitations. One attempt to improve network architectures is Ad Hoc On Demand Distance Vector ("AODV"). AODV is a reactive protocol that uses a broadcast flood in order to establish a new connection or fix a broken connection. AODV is described in detail in the Internet Engineering Task Force ("IETF") document found at http://www.ietf.org/rfc/rfc3561.txt. While AODV has the advantage of being able to easily organize nodes into an ad-hoc network one of the problems it has is that the maximum network size is extremely limited.

Another attempt to improve network architectures is 'Destination Sequenced Distance Vector' ("DSDV"). DSDV is a proactive protocol that uses a constant flood of updates to create and maintain routes to and from all nodes in the network. A detailed description of DSDV is found at http://citeseer.ist.psu.edu/cache/papers/cs/2258/http:zSzzSzww-w.srvloc.orgzSzcharliepzSz txtzSzsigcomm94zSzpaper.pdf/perkins94highly.pdf or http://citeseer.ist.psu.edu/perkins94highly.html. While DSDV has the advantage of providing loop free routing it has the disadvantage of a only working in small networks. In large networks the control traffic easily exceeds the available bandwidth.

Another attempt to improve network architectures is 'Optimized Link State Routing' ("OLSR"). OLSR is a proactive protocol that attempts to build knowledge of the network topology. A detailed description of OLSR can be found in this IETF draft http://hipercom.inria.fr/olsr/draft-ietf-manet-olsr-11.txt. While OLSR has the advantage of being a more efficient link state protocol it is still unable to support larger networks.

Another attempt to improve network architectures is 'Open Shortest Path First' ("OSPF"). OSPF is a proactive link state protocol that is used by some internet core routers. A detailed description of OSPF can be found in this IETF draft http://www.ietf.org/rfc/rfc1247.txt. While OSPF allows core internet routers to route around failure is has limitations on the size of networks it is able to support.

Despite the differences between AODV, DSDV, OLSR and OSPF they all share some, of the same problems—e.g. the difficulty of scaling past a few hundred nodes. This limitation occurs because as the network grows, the amount of control traffic required grows much faster. Rapidly, the amount of control traffic needed will exceed the capacity of the network In general, prior art network architectures do not provide the good scalability, nor do they provide the ability to allow low capacity devices to fully interact with the larger network, and in mobile environments, prior art architectures do not always provide seamless mobility.

SUMMARY OF THE INVENTION

It is an object of the present invention to provide a novel system and method for networking that obviates or mitigates at least one of the above-identified disadvantages of the prior art.

A first aspect of the invention provides a network that comprises a plurality of nodes and a plurality of links interconnecting neighbouring ones of the nodes. Each of the nodes are operable to maintain information about each of the nodes that are within first portion of the nodes. The information includes: a first identity of another one of the nodes within the first portion; and for each first identity, a second identity representing a neighbouring node that is a desired step to reach the another one of the nodes respective to the first identity. Each of the nodes are operable to determine a neighbouring node that is a desired step to locate the nodes in a second portion of the nodes that are not included in the first portion.

In a particular implementation of the first aspect, the determination is based on which of the neighbouring nodes most frequently appears in each second identity.

In a particular implementation of the first aspect, each of the nodes is operable to exchange the information with its neighbouring nodes.

In a particular implementation of the first aspect, each link has a set of service characteristics such that any path between two of the nodes has a cumulative set of service characteristics; and wherein the desired step is based on which of the paths has a desired cumulative set of service characteristics.

In a particular implementation of the first aspect, the service characteristics include at least one of bandwidth, latency and bit error rate.

In a particular implementation of the first aspect, the nodes are at least one of computers, telephones, sensors, personal digital assistants.

In a particular implementation of the first aspect, the links are based on at least one of wired and wireless connections.

In a particular implementation of the first aspect, a network core is formed between neighbouring nodes that determine each other's desired step to reach the nodes within the second portion.

In a particular implementation of the first aspect, each node is operable to instruct other nodes between the core and the node to maintain information about the node.

In a particular implementation of the first aspect, each node is operable to request information about the nodes within the second portion; each node being operable to make the request to the other nodes between the core and the node.

One advantage of the present invention over the prior art is that the network architecture taught herein allows for large scale self-organizing networks. This feature is enabled, for certain embodiments, because very few nodes in the network need actually have knowledge of the entire network. Collectively, all nodes in the network have knowledge of the entire network, and nodes that are unaware of other nodes, but which need find such other nodes, are provided with means of locating those other nodes by seeking such knowledge from other nodes in the network having relevant knowledge. For these and other reasons, the present invention is a novel self-organizing network architecture that enables for substantially larger self-organizing networks than prior art self-organizing network architecture. Thus, a second aspect of the invention provides a self-organizing network comprising at least 2,000 nodes interconnected by a plurality of links. A third aspect of the invention provides a self-organizing network comprising at least 5,000 nodes interconnected by a plurality of links. A fourth aspect of the invention provides a self-organizing network comprising at least 10,000 nodes interconnected by a plurality of links. A fifth aspect of the invention provides a self-organizing network comprising at least 100,000 nodes interconnected by a plurality of links.

BRIEF DESCRIPTION OF THE DRAWINGS

The invention will now be described by way of example only, and with reference to the accompanying drawings, in which:

FIG. 31 is a schematic representation of a network showing an arrangement of nodes and queues in accordance with an embodiment of the invention;

FIG. 32 shows a number of flow-charts depicting a series of steps showing knowledge of a queue propagating a network in accordance with an embodiment of the invention;

FIG. 54 is a schematic representation of a network showing each node's next best step to the core, and that same network rearranged to better illustrate the hierarchy this process creates.

DETAILED DESCRIPTION OF THE INVENTION

Figure 1:
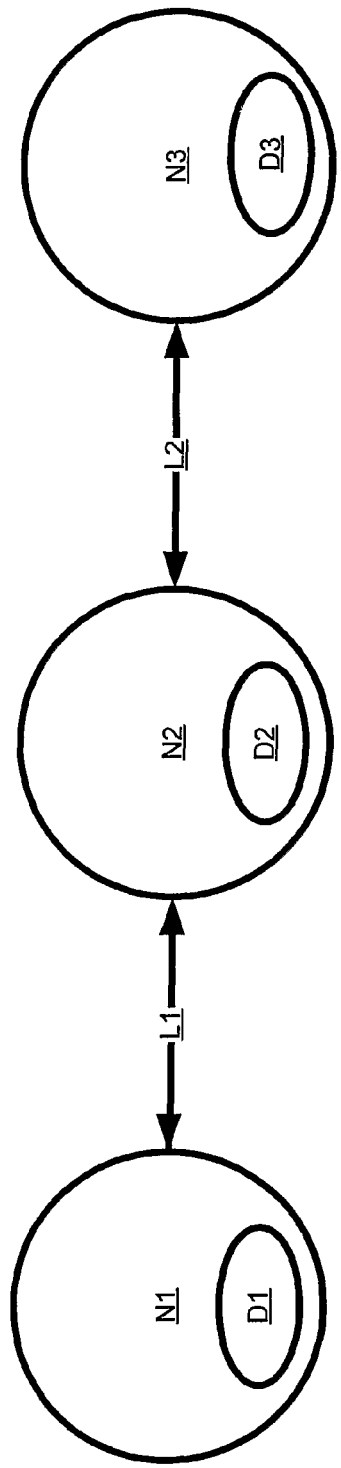
FIG. 1 is a schematic representation of a network in accordance with an embodiment of the invention.

The embodiments of the invention described herein includes a self-organizing network and computer readable medium for storing a set of programming instructions for execution within a self-organizing network. Referring now to FIG. 1 a network in accordance with an embodiment of the invention is indicated generally at 30. Network 30 comprises a plurality of nodes N1, N2 and N3. Collectively, nodes N1, N2 and N3 are referred to as nodes N, and generically they are referred to as node N. This nomenclature is used for other elements discussed herein.

Node N1 is connected to node N2 via a first physical link L1. Node N2 is connected to node N3 via a second link L2. Node N1 is a neighbour to node N2 and likewise node N2 is a neighbour to node N1, since they are connected by link L1. By the same token, node N3 is a neighbour to node N2 and likewise node N2 is a neighbour to node N3, since they are connected by link L2. Thus, the term "neighbour" (and variants thereof, as the context requires) is used herein to refer to nodes N that are connected another node N by a single link L.

Each node N is any type of computing device that is operable to communicate with another node N via a respective link L. Any type of computing device is contemplated, such a personal computer ("PC"), a laptop computer, a personal digital assistant ("PDA"), a voice over internet protocol ("VOIP") landline telephone, a cellular telephone, a smart sensor, etc., or combinations thereof. Each node N can be different types of computing devices.

Each link L is based on any type of communications link, or combinations or hybrids thereof, be they wired or wireless, including but not limited to OC3, T1, Code Division Multiple Access ("CDMA"), Orthogonal Frequency Multiple Access ("OFDM"), Global System for Mobile Communications ("GSM"), Global Packet Relay Service ("GPRS"), Ethernet, 802.11 and its variants, Bluetooth etc.

It should now be understood that the types of computing devices used to implement a particular node N, and the types of links L therebetween are not particularly limited, and that in general terms, each node N is operable to connect and communicate with any neighbouring nodes N via the respective link L therebetween.

Each node N maintains a network information database D that is configured to maintain knowledge about at least some of the other nodes N within network 30. Each database D is maintained in volatile storage (e.g. random access memory ("RAM")) and/or non-volatile storage (e.g. hard disc drive) or combinations of volatile or non-volatile storage, in a computing environment associated with its respective node N. Database D is used by each node N to locate other nodes N in network 30, so that the particular node N can send traffic to that other node N and/or to share knowledge about those other nodes N.

Each database D is shown on FIG. 1 as an oval indicated with the reference D and located within its respective node N, to represent that node N maintaining its own respective database D. More particularly, database D1 is shown within node N1, database D2 is shown within node N2, and database D3 is shown within node N3. The size, complexity and other overhead metrics that define the structure of each database D are chosen so that a particular database D only occupies a portion of the overall computing resources that are available in its respective node N. The structure of database D is thus typically, though not necessarily, chosen to leave a significant portion of the computing resources of node N free to perform the regular computing tasks of that node N. Further details about such overhead metrics will be discussed in greater detail below.

However, for the exemplary network 30 in FIG. 1, it will be assumed that all nodes N have substantially equal computing resources and that all links L have substantially the same service characteristics. (As used herein, the term "service characteristics" as applied to links L includes any known quality of service ("QOS") metrics including bandwidth, latency, bit error rate, etc that can be used to assess the quality of a link L. Service characteristics can also include pricing, in that the financial cost incurred to carry traffic over one link may be different than the financial cost to carry traffic over another link). It will thus be assumed that each database D has substantially the same structure—an example of such a structure being shown in Table I.

TABLE I

| | Exemplary Structure of each Database D | | |
|---|---|---|---|
| Row Number Heading | Column 1 Rank | Column 2 Node name | Column 3 Best Neighbour |

In general terms, each database D provides a list of at least some of the nodes N in network 30, other than the node N that is maintaining the particular database D ("other nodes N"). Each database D also ranks those other nodes N according to their importance within network 30. Metrics that reflect importance include, but are not limited to, the proximity of such other nodes N, and/or which of the other nodes N carries a proportionately greater share of traffic in network 30, and/or the proximity of a node N to a data flow going to another node N. Other metrics will now occur to those of skill in the art, some of which will be discussed in greater detail below. Each database D also identifies those other nodes N, and the neighbouring node N that represents the next best step to reach a respective other node N.

Explaining Table I in greater detail, in Column 1 of Table I, "Rank", indicates a number, increasing in value for each row in database D based on the number of other nodes N that are maintained in the particular database D.

In Column 2 of Table I, "Node name" identifies the specific other node N. Such a node name can be based on any known or future network addressing scheme. Examples of known node addressing schemes include telephone numbers, or Medium Access Control ("MAC") addresses, or Internet Protocol ("IP") addresses. Such an addressing scheme can be chosen according to other factors affecting the design of network 30 and/or the nodes N therein. Of note, however, in the addressing scheme the name of each node N need not reflect the location of that node N in the network, as is found in other addressing schemes—e.g. telephone numbers that have area codes corresponding to a geographic location. In order to simplify explanation of the embodiments herein, the node name is identified according to the reference character in the Figures. For example, where a Node Name entry under Column 2 indicates "N1", then node N1 is being identified.

In Column 3 of Table I, "Best Neighbour" indicates which of the neighbour nodes N provides the next best step in an overall route to reach the other node N named in Column 2. [In the present embodiment, the term "Best Neighbour" is used, but this should not be construed in a limiting sense for all embodiments of the invention, in that any desired criteria to determine a "Best Neighbour" or otherwise desired neighbour can be chosen.] Thus, Column 3 will always identify a neighbour node N, while Column 2 need not indicate a neighbour node N. It should be understood that entries in Column 3 need not actually be the name of the neighbour node N, according to the same addressing scheme used for Column 2, but can be any indicator of that particular neighbour node N. However, to simplify explanation of the embodiments herein, entries in Column 3 will actually reflect the name of the neighbour node N.

When network 30 is initialized (e.g. when all of the nodes N each connect to each other according to the topology shown in FIG. 1), the contents of each database D will be empty, except that each database D will contain a "null" entry identifying the particular node N that owns the particular database D. Table II thus shows how database D1 is initially populated with a "null" entry, identifying node N1.

TABLE II

| | Initial contents of Database D1 | | |
|---|---|---|---|
| Row Number Heading | Column 1 Rank | Column 2 Node name | Column 3 Best Neighbour |
| Row 0 | ∅ | N1 | N/A |

Explaining Table II in greater detail, in Row 0 of Column 1 of Table II, the entry is given a null entry of "0", to indicate that this particular information in database D1 is about the actual node N1 that owns that database D1. In Row 0 of Column 2 of Table II, the entry is "N1", to identify node N1 by name. In Row 0 of Column 3 of Table II, the entry is "N/A", to indicate that the best neighbour is inapplicable, since this entry of Table II refers to the owner of database D1.

Likewise, Table III thus shows how database D2 is initially populated with a "null" entry, identifying node N2.

TABLE III

| | Initial contents of Database D2 | | |
|---|---|---|---|
| Row Number Heading | Column 1 Rank | Column 2 Node name | Column 3 Best Neighbour |
| Row 0 | ∅ | N2 | N/A |

Likewise, Table IV thus shows how database D3 is initially populated with a "null" entry, identifying node N3.

TABLE IV

| | Initial contents of Database D2 | | |
|---|---|---|---|
| Row Number Heading | Column 1 Rank | Column 2 Node name | Column 3 Best Neighbour |
| Row 0 | ∅ | N3 | N/A |

Figure 2:
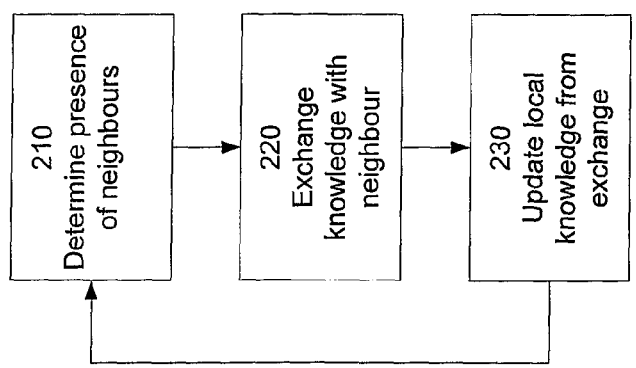
FIG. 2 shows a flow-chart depicting a method of spreading network knowledge in accordance with an embodiment of the invention.

In order to populate a remainder of each database D, and maintain their contents, a microprocessor on each node N will perform a set of programming instructions. Those instructions can be substantially the same for each node N. Referring now to FIG. 2, a flowchart representing a method for maintaining network knowledge in accordance with an embodiment of the invention is indicated generally at 200. Method 200 can be implemented into a set of programming instructions for execution on a microprocessor on each node N to populate and maintain the contents of each database D. In order to assist in the explanation of the method, it will thus be assumed that method 200 is operated on each node N in system 30 in order to maintain the database D respective to that node N. The following discussion of method 200 will thus lead to further understanding of system 30 and its various components. (However, it is to be understood that system 30 and/or method 200 can be varied, and need not be performed in the exact sequence shown in FIG. 2, and that system 30 and/method 200 need not work exactly as discussed herein, and that such variations are within the scope of the present invention.)

Thus, before beginning explanation of method 200, it will be assumed that database D for each node N has been populated only according to Tables II, III and IV, and that each node N has been activated and is physically connected to each other according to the structure of links L shown in FIG. 1.

Beginning first at step 210, the presence of neighbours is determined. In general terms, at step 210 each node N determines whether it has any new neighbouring nodes N, or whether any existing neighbouring nodes N have ceased connecting that that node N. When step 210 is first performed by node N1, node N1 will thus send out an initialization message over link L1 to node N2 in order to query the existence of node N2 and the end of link L1. Such an initialization message can be performed according to any known means corresponding to the type of protocol used to implement link L1.

Likewise, step 210 will also be performed by node N2, and node N2 will thus send out a network initialization signal over link L1 to node N1 in order to query the existence of node N1. By the same token, node N2 will thus send out a network initialization signal over link L2 to node N3 in order to query the existence of node N3.

Finally, step 210 will also be performed by node N3, and node N3 will thus send out a network initialization signal over link L2 to node N2 in order to query the existence of node N2.

Figure 3:
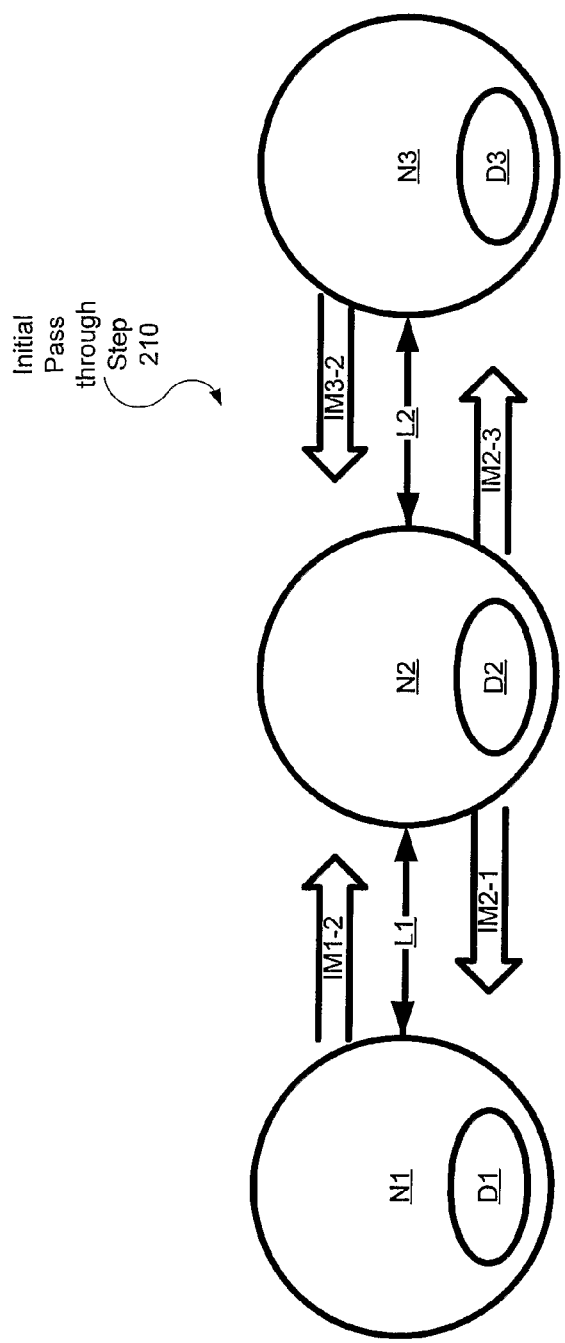
FIG. 3 is a schematic representation of a network depicting a performance of a step of the method of FIG. 2, in accordance with an embodiment of the invention.

Referring now to FIG. 3, this initial performance of step 210 by each node N is represented by showing a plurality of initialization messages IM being sent according to the above. Specifically, initialization message IM1-2 is being sent from node N1 to node N2; initialization message IM3-2 is being sent from node N3 to node N2; initialization message IM2-3 is being sent from node N2 to node N3; initialization message IM2-1 is being sent from node N2 to node N1. In a present embodiment, initialization messages IM do not exchange node knowledge, in order to simplify initialization messages IM, and allow node knowledge of a node N to spread in substantially the same manner for all nodes N. This initialization message IM can contain processing and memory characteristics of node N as it relates to the node's ability to maintain network knowledge. Such processing and memory characteristics can include, the memory of the node N that is dedicated to maintaining network knowledge, and the like. In the present embodiment, however, node names N themselves are not exchanged as part of the initialization messages IM.

As a result of locating neighbours using initialization messages IM, each node N will now be aware of its neighbouring nodes N, and thus be in a position to begin populating and maintaining its respective database D by making use of neighbouring databases D.

Thusly, referring again to FIG. 2, method 200 will advance from step 210 to step 220 at which point network knowledge will be exchanged between neighbour nodes N, such neighbours having been identified at step 210. Each node N can now make use of a neighbouring database D to gain more knowledge about network N.

Figure 4:
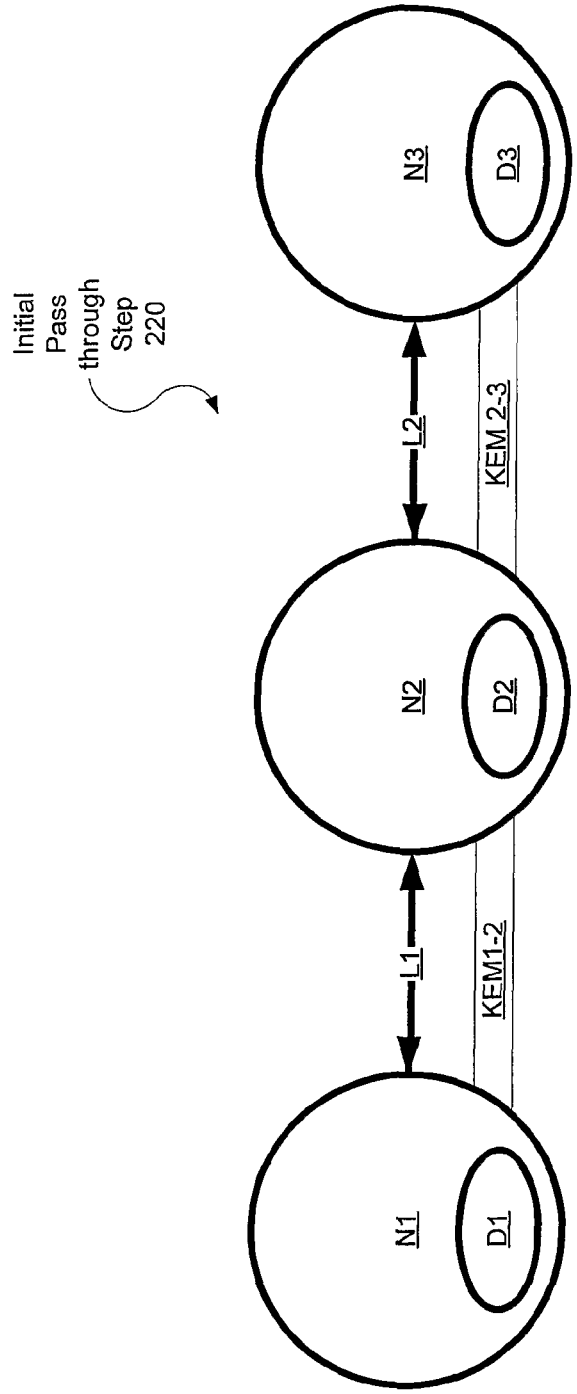
FIG. 4 is a schematic representation of a network depicting a performance of a step of the method of FIG. 2, in accordance with an embodiment of the invention.

Referring now to FIG. 4, the initial performance of step 220 by each node N is represented by showing a set of bi-directional knowledge exchange messages KEM. The knowledge exchange between node N1 and node N2 is indicated as knowledge exchange message KEM1-2, while the knowledge exchange between node N2 and node N3 is indicated as knowledge exchange message KEM2-3.

Referring again to FIG. 2, method 200 then advances from step 220 to step 230, at which point local knowledge is updated as a result of the information exchange from step 220. As a result of exchanging messages KEM, databases D1, D2 and D3 can be updated to reflect information about neighbouring nodes N, as shown in Tables V, VI, VII respectively. Table V thus shows how database D1 is now populated after the initial performance of step 230 by node N1.

TABLE V

| (Updated from Table III) Database D1 | | | |
|---|---|---|---|
| Row Number Heading | Column 1 Rank | Column 2 Node name | Column 3 Best Neighbour |
| Row 0 | Ø | N1 | N/A |
| Row 1 | 1 | N2 | N2 |

Explaining Table V in greater detail, in Row 0 remains the same as from Table III. However, Row 1 is now populated, showing that node N1 now has knowledge of a node named node N2, and that node N2 is the best neighbour through which node N2 can be reached.

Likewise, Table VI thus shows how database D2 is now populated after the initial performance of step 230 by node N2.

TABLE VI

| (Updated from Table IV) Database D2 | | | |
|---|---|---|---|
| Row Number Heading | Column 1 Rank | Column 2 Node name | Column 3 Best Neighbour |
| Row 0 | Ø | N2 | N/A |
| Row 1 | 1 | N1 | N1 |
| Row 2 | 2 | N3 | N3 |

Explaining Table VI in greater detail, in Row 0 remains the same as from Table IV. However, Row 1 is now populated, showing that node N2 now has knowledge of a node named node N1, and that node N1 is the best neighbour through which node N1 can be reached. By the same token, Row 2 is now populated, showing that node N2 now has knowledge of a node named node N3, and that node N3 is the best neighbour through which node N3 can be reached. Note that node N1 has been given a rank of "1", while node N3 has been given a rank of "3". In the present example, such rankings were made purely as matter of convenience given that no metrics exist in which to actually choose which to rank higher. However, rankings made on more complex bases will be discussed in greater detail below.

Likewise, Table VII thus shows how database D3 is populated after the initial performance of step 230 by node N3.

TABLE VII (Updated from Table V) Database D3

| Row Number Heading | Column 1 Rank | Column 2 Node name | Column 3 Best Neighbour |
|---|---|---|---|
| Row 0 | Ø | N3 | N/A |
| Row 1 | 1 | N2 | N2 |

Explaining Table VII in greater detail, in Row 0 remains the same as from Table V. However, Row 1 is now populated, showing that node N3 now has knowledge of a node named node N2, and that node N2 is the best neighbour through which node N2 can be reached.

Figure 5:
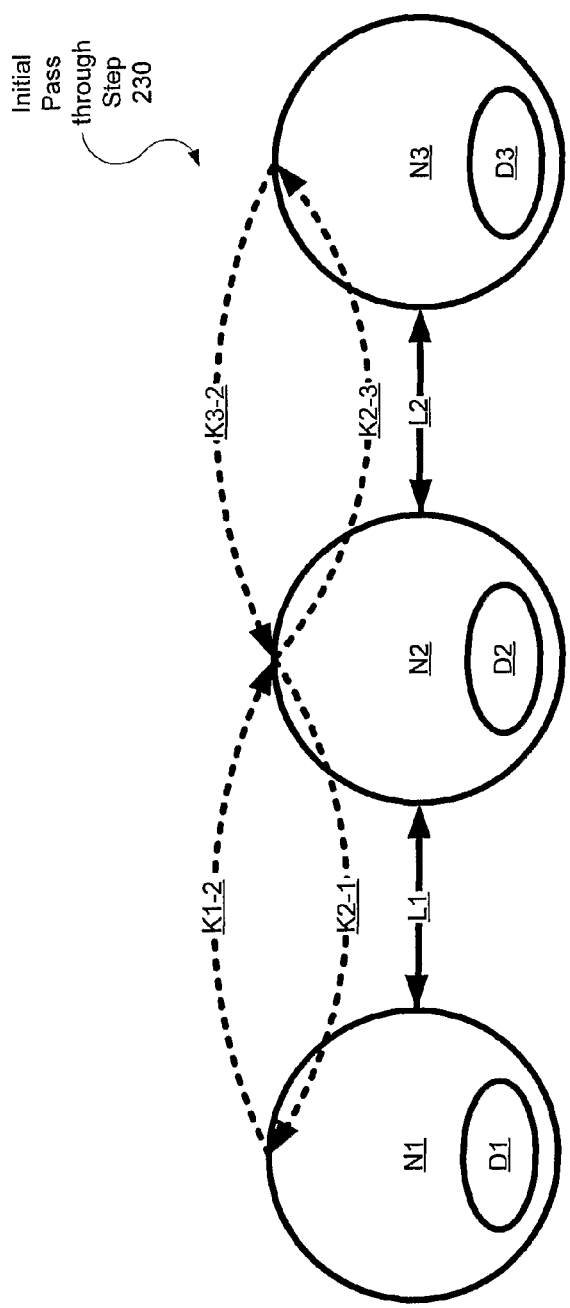
FIG. 5 is a schematic representation of a network depicting a performance of a step of the method of FIG. 2, in accordance with an embodiment of the invention.

The contents of Tables V, VI and VII are shown as knowledge paths K, represented by dotted lines in FIG. 5. Knowledge path K1-2 corresponds with Row 1 of Table V, indicating that node N1 has knowledge of N2; knowledge path K2-1 corresponds with Row 1 of Table VI, indicating that node N2 has knowledge of N1; likewise knowledge path K2-3 corresponds with Row 2 of Table VI, indicating that node N2 has knowledge of node N3; and knowledge path K3-2 corresponds with Row 1 of Table VII, indicating node N3 has knowledge of node N2.

Payload traffic generated at an origin node N that is intended for a destination node N can now actually be delivered to nodes N in accordance with knowledge paths K. Where a knowledge path exists between an origin node N and a destination node N. Such delivery of payload traffic can be effected via the best neighbour routings shown in Column 3, to the extent that Column 2 is populated in the database D of the origin node N with network knowledge about the destination node N.

(As used herein, "payload traffic" or "payload" refers to any data generated by an application executing on the origin node N that is intended for a destination node N. For example, where nodes N are computers, then payload traffic can include emails, web pages, application files, printer files, audio files, video files or the like. Where nodes N are telephones, then payload traffic can include voice transmissions. Other types of payload data will now occur to those of skill in the art.)

More specifically, nodes N1 and nodes N2 can now exchange payload traffic, since they have knowledge of each other. Nodes N2 and N3 can also exchange payload traffic, since they have knowledge of each other. However, at this point, nodes N1 and N3 cannot exchange traffic since they do not have knowledge of each other.

Having now completely performed method 200 once, method 200 then cycles back from step 230 to step 200 where method 200 begins anew for the second time. Returning again to step 210, the presence of neighbours are determined. During this second exemplary cycle through method 200, it will be assumed that no new nodes N are added to network 30, and no existing nodes N are removed. Accordingly, nothing occurs at step 210 since no changes have occurred and method 200 advances from step 210 to step 220.

Continuing with the present example, referring again to FIG. 2, method 200 will advance again from step 210 to step 220 at which point additional network knowledge will be exchanged between neighbour nodes N. Once again, each node N can now make use of a neighbouring database D to gain more knowledge about network N.

Figure 6:
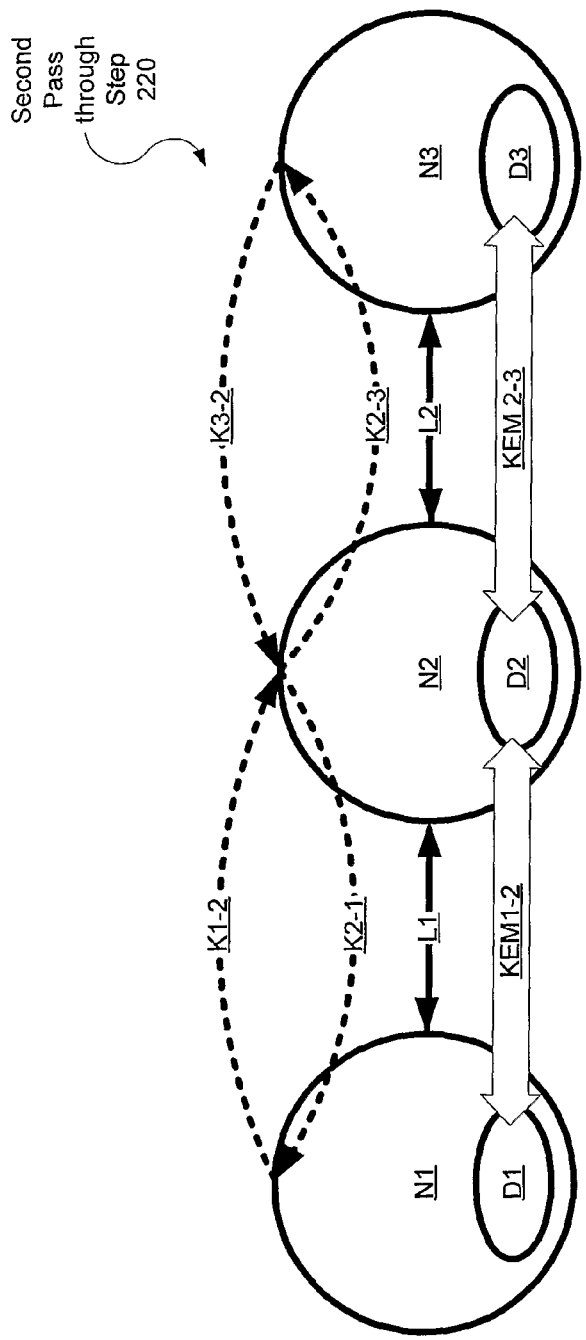
FIG. 6 is a schematic representation of a network depicting a performance of a step of the method of FIG. 2, in accordance with an embodiment of the invention.

Referring now to FIG. 6, the second performance of step 220 by each node N is once again represented by bi-directional knowledge exchange messages KEM. The knowledge exchange between node N1 and node N2 is indicated as knowledge exchange message KEM1-2, while the knowledge exchange between node N2 and node N3 is indicated as knowledge exchange message KEM2-3.

Referring again to FIG. 2, method 200 then advances, for the second time, from step 220 to step 230, at which point local knowledge is updated as a result of the information exchange from step 220. As a result of exchanging messages KEM, databases D1, D2 and D3 can be updated to reflect information about neighbouring nodes N, as shown in Tables VIII, IX, X respectively. Table VIII thus shows how database D1 is now populated after the second performance of step 230 by node N1.

TABLE VIII (Updated from Table V) Database D1

| Row Number Heading | Column 1 Rank | Column 2 Node name | Column 3 Best Neighbour |
|---|---|---|---|
| Row 0 | Ø | N1 | N/A |
| Row 1 | 1 | N2 | N2 |
| Row 2 | 2 | N3 | N2 |

Explaining Table V in greater detail, in Rows 0 and 1 remain the same as from Table V. However, Row 2 is now populated, showing that node N1 now has knowledge of a node named node N3, and that node N2 is the best neighbour through which node N3 can be reached.

Likewise, Table IX thus shows how database D2 is now populated after the initial performance of step 230 by node N2.

TABLE IX (Updated from Table VI) Database D2

| Row Number Heading | Column 1 Rank | Column 2 Node name | Column 3 Best Neighbour |
|---|---|---|---|
| Row 0 | Ø | N2 | N/A |
| Row 1 | 1 | N1 | N1 |
| Row 2 | 2 | N3 | N3 |

Explaining Table IX in greater detail, in Rows 0, 1 and 2 remain the same as from Table VI, since there are no new nodes N in network 30 for node N2 to become aware of through exchanging messages with its neighbouring nodes N.

Likewise, Table X thus shows how database D3 is populated after the initial performance of step 230 by node N3.

TABLE X (Updated from Table VII) Database D3

| Row Number Heading | Column 1 Rank | Column 2 Node name | Column 3 Best Neighbour |
|---|---|---|---|
| Row 0 | Ø | N3 | N/A |
| Row 1 | 1 | N2 | N2 |
| Row 2 | 2 | N1 | N2 |

Explaining Table VII in greater detail, in Rows 0 and 1 remain the same as from Table V. However, Row 2 is now populated, showing that node N3 now has knowledge of a node named node N1, and that node N2 is the best neighbour through which node N1 can be reached.

Figure 7:
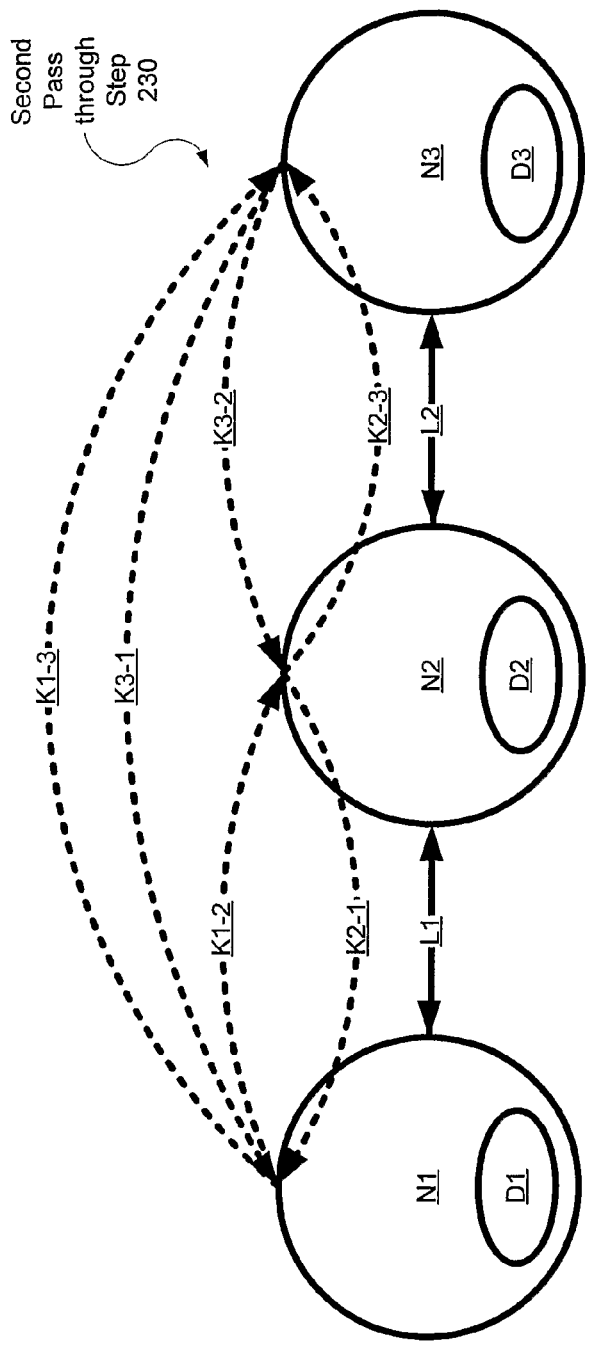
FIG. 7 is a schematic representation of a network depicting a performance of a step of the method of FIG. 2, in accordance with an embodiment of the invention.

The contents of Tables X, IX and X are shown as knowledge paths K, represented by dotted lines in FIG. 7. In FIG. 7, (and as previously shown in FIG. 5), knowledge path K1-2 indicates that node N1 has knowledge of N2; knowledge path K2-1 indicates node N2 has knowledge of N1; likewise knowledge path K2-3 indicates that node N2 has knowledge of node N3; and knowledge path K3-2 indicates node N3 has knowledge of node N2. However, FIG. 7 also now includes two additional knowledge paths: knowledge path K1-3 indicates that nodes N1 now has knowledge of node N3, and likewise knowledge path K3-1 indicates that node N3 now has knowledge of node N1.

Payload traffic generated at an origin node N that is intended for a destination node N can now actually be delivered to nodes N in accordance with knowledge paths K. Where a knowledge path exists between an origin node N and a destination node N. Such delivery of payload traffic can be effected via the best neighbour routings shown in Column 3, to the extent that Colun=2 is populated in the database D of the origin node N with network knowledge about the destination node N. Thus, more specifically, all nodes N can all now exchange payload traffic, since they have knowledge of each other. Of particular note, after this pass through method 200, node N1 and node N3 can send payload traffic to each other, via node N2 as the step between them.

Figure 8:
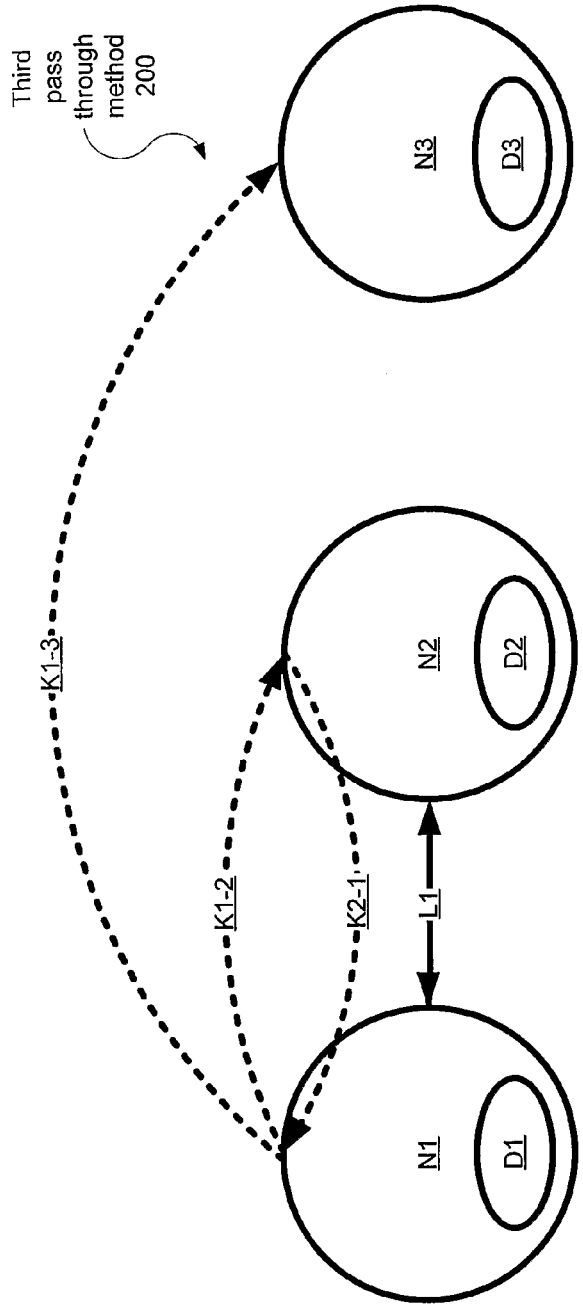
FIG. 8 is a schematic representation of a network depicting a performance of a step of the method of FIG. 2, in accordance with an embodiment of the invention.

Having now completely performed method 200 twice, method 200 then cycles back from step 230 to step 200 where method 200 begins anew. Prior to the performance of the third exemplary cycles through method 200, it will be assumed that node N3 is removed from network 30 due to a failure of link L2, as represented in FIG. 8. Returning again to step 210, the presence of neighbours are determined. This third time, during the exchange of initialization messages IM, nodes N2 and N3 will determine that each other is no longer a neighbour. At step 220 knowledge is exchanged with neighbours according to the neighbours found present at step 210. Finally, at step 230, local knowledge is updated based on the exchange.

After step 230, and as shown in FIG. 8, the result is that database D1 remains the same, maintaining the contents as shown in Table VIII, because insufficient cycles of method 200 have occurred for the loss of node N3 to propagate to database D1. However, database D2 is now updated in accordance with Table XI.

TABLE XI (Updated from Table IX) Database D2

| Row Number Heading | Column 1 Rank | Column 2 Node name | Column 3 Best Neighbour |
|---|---|---|---|
| Row 0 | Ø | N2 | N/A |
| Row 1 | 1 | N1 | N1 |

Database D3 is also updated to reflect the initial data found in Table IV. This is represented in FIG. 8, and no existing nodes N are removed. Accordingly, nothing occurs at step 210 since no changes have occurred and method 200 advances from step 210 to step 220.

The contents of the databases D after this third pass of method 200 are reflected by the knowledge paths K shown in FIG. 8.

Figure 9:
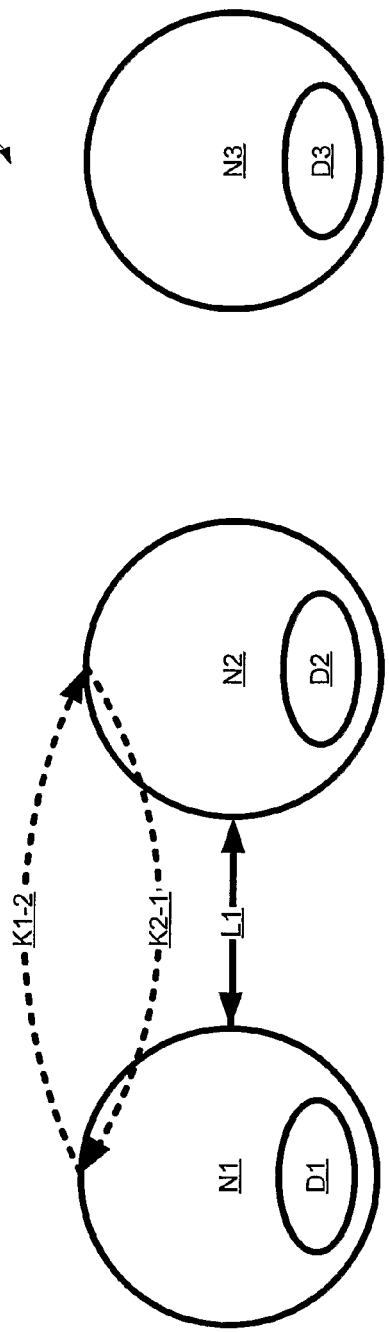
FIG. 9 is a schematic representation of a network depicting a performance of a step of the method of FIG. 2, in accordance with an embodiment of the invention.

During a fourth pass of method 200, the loss of node N3 will finally propagate to node N1, resulting in the knowledge paths K shown in FIG. 9.

(Those of skill in the art will recognize that the foregoing is simplified explanation for purposes of explanation, which when implemented can cause the introduction of a trivial loop. To address this, a 'poison reverse' can be introduced to get rid of the trivial loop that gets introduced in any network when a node is removed. A poison reverse is discussed in greater detail below. to further reduce introductions of loops, a delay can be introduced during the spread of node knowledge, while implementing a 'zero' delay (e.g. substantially instantaneous) removal of node knowledge. Finally when the distance from data flow (discussed in greater detail below) reaches a certain limit a node informs its neighbouring nodes to remove knowledge of that particular node even if it still has valid knowledge of that node. A more detailed discussion of node removal is provided further below.)

Figure 10:
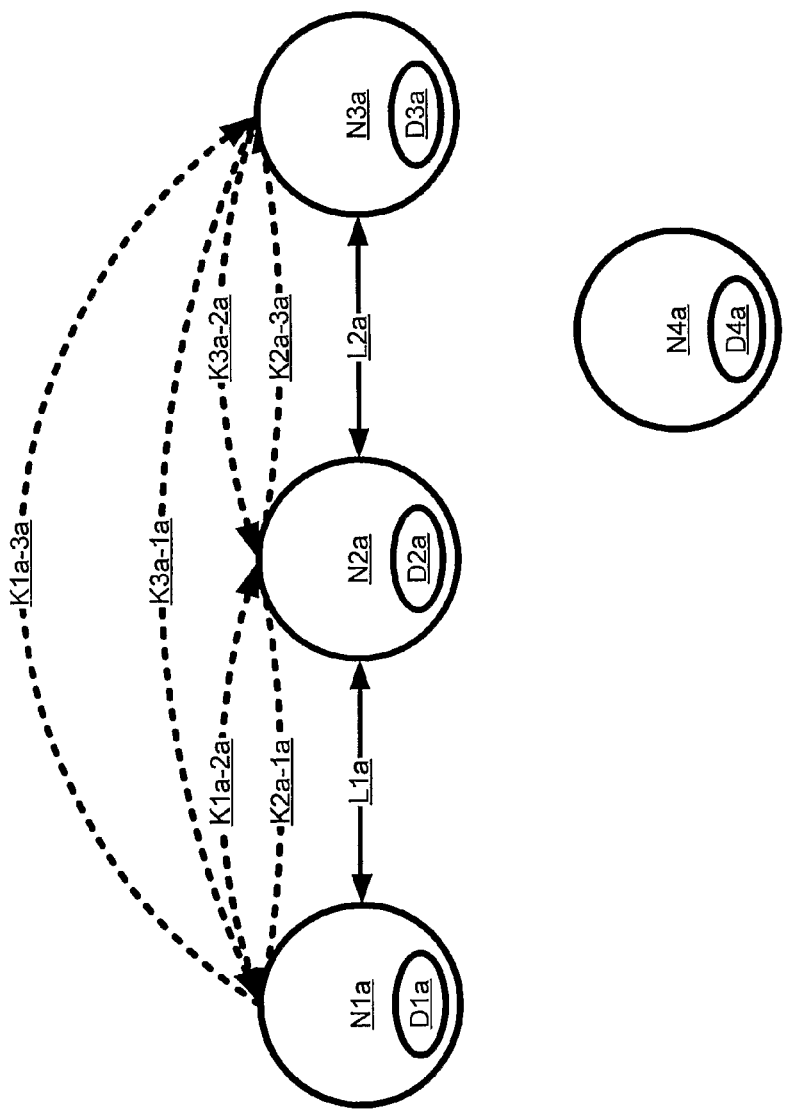
FIG. 10 is a schematic representation of a network in accordance with another embodiment of the invention.

It should now be understood that the teachings herein are applicable to networks of greater complexity than network 30. For example, referring now to FIG. 10, a slightly more complex network in accordance with another embodiment of the invention is indicated generally at 30a. Network 30a includes substantially the same elements as network 30, and like elements include like references but followed by the suffix "a". More specifically, network 30a includes more nodes Na and links La, but the basic structure of those nodes Na and links La are substantially the same as their counterparts in system 30. To simplify explanation, however, network 30a is shown without specific tables showing the contents of databases Da.

Network 30a includes nodes Na1, Na2 and Na3 that are connected via links La1 and La2 like their respective counterparts nodes N1, N2 and N3 in network 30. In this example, it is initially assumed that network 30a has undergone two complete passes through method 200 and thus databases D are in the same state as shown for network 30 in FIG. 7. In contrast to network 20, however, it is also assumed that network 30a includes a fourth node Na4, that is initially, not connected to any other node Na.

Figure 11:
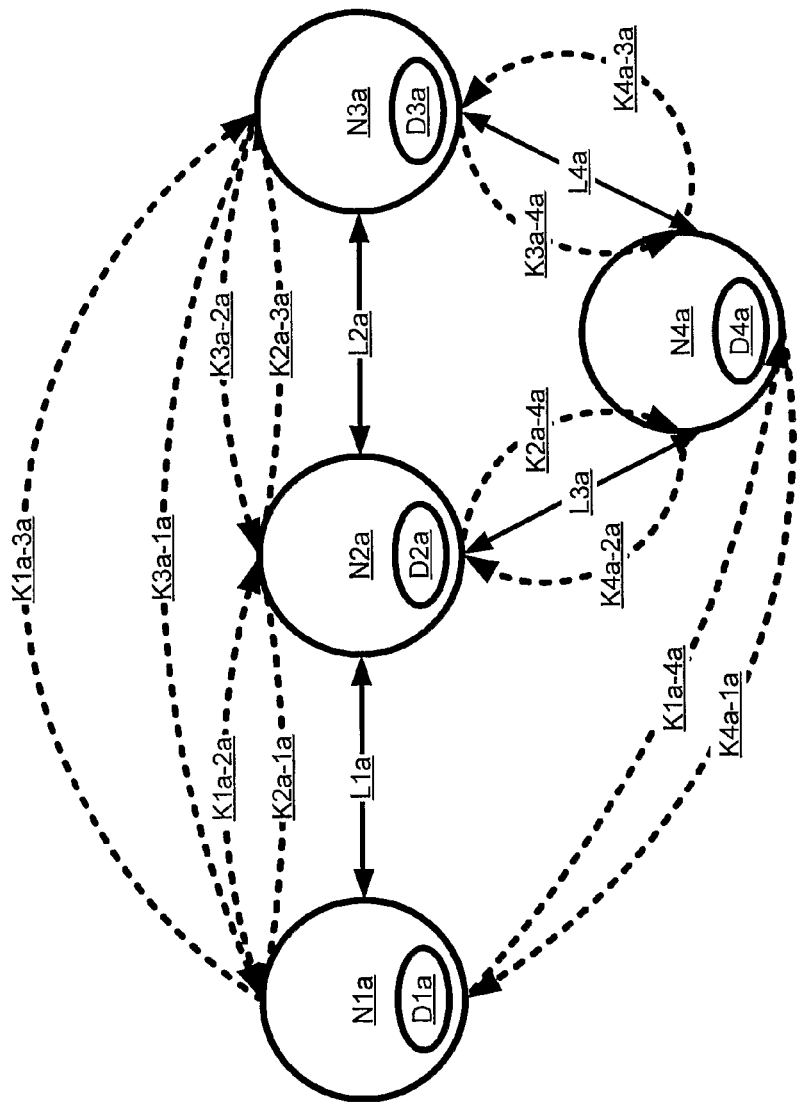
FIG. 11 is a schematic representation of a network in accordance with another embodiment of the invention.

Referring now to FIG. 11, assume that node N4a joins the rest of network 30a by the formation of link L3a spanning node N4a and node N2a; and by the formation of link L4a spanning node N4a and node N3a. After a sufficient number of cycles of method 200 are performed by each node N, additional knowledge paths K (as shown in FIG. 11) will form according to the updated contents of databases D, as aggregated in Table XII.

TABLE XII

| | Databases Da | | | | | | | | | | | |
|---|---|---|---|---|---|---|---|---|---|---|---|---|
| | Database D1a | | | Database D2a | | | Database D3a | | | Database D4a | | |
| Row | 1 Rank | 2 Node Name | 3 Best Neighbour | 4 Rank | 5 Node Name | 6 Best Neighbour | 7 Rank | 8 Node Name | 9 Best Neighbour | 10 Rank | 11 Node Name | 12 Best Neighbour |
| 1 | Ø | N1a | N/A | Ø | N2a | N/A | Ø | N3a | N/A | Ø | D4a | N/A |
| 2 | 1 | N2a | N2a | 1 | N3a | N3a | 1 | N2a | N2a | 1 | N2a | N2a |

TABLE XII-continued

| | | Database D1a | | | Database D2a | | | Database D3a | | | Database D4a | |
|---|---|---|---|---|---|---|---|---|---|---|---|---|
| | | Databases Da | | | | | | | | | | |
| Row | 1 Rank | 2 Node Name | 3 Best Neighbour | 4 Rank | 5 Node Name | 6 Best Neighbour | 7 Rank | 8 Node Name | 9 Best Neighbour | 10 Rank | 11 Node Name | 12 Best Neighbour |
| 3 | 2 | N3a | N2a | 2 | N4a | N4a | 2 | N4a | N4a | 2 | N3a | N3a |
| 4 | 3 | N4a | N2a | 3 | N1a | N1a | 3 | N1a | N2a | 3 | N1a | N2a |

Figure 12:
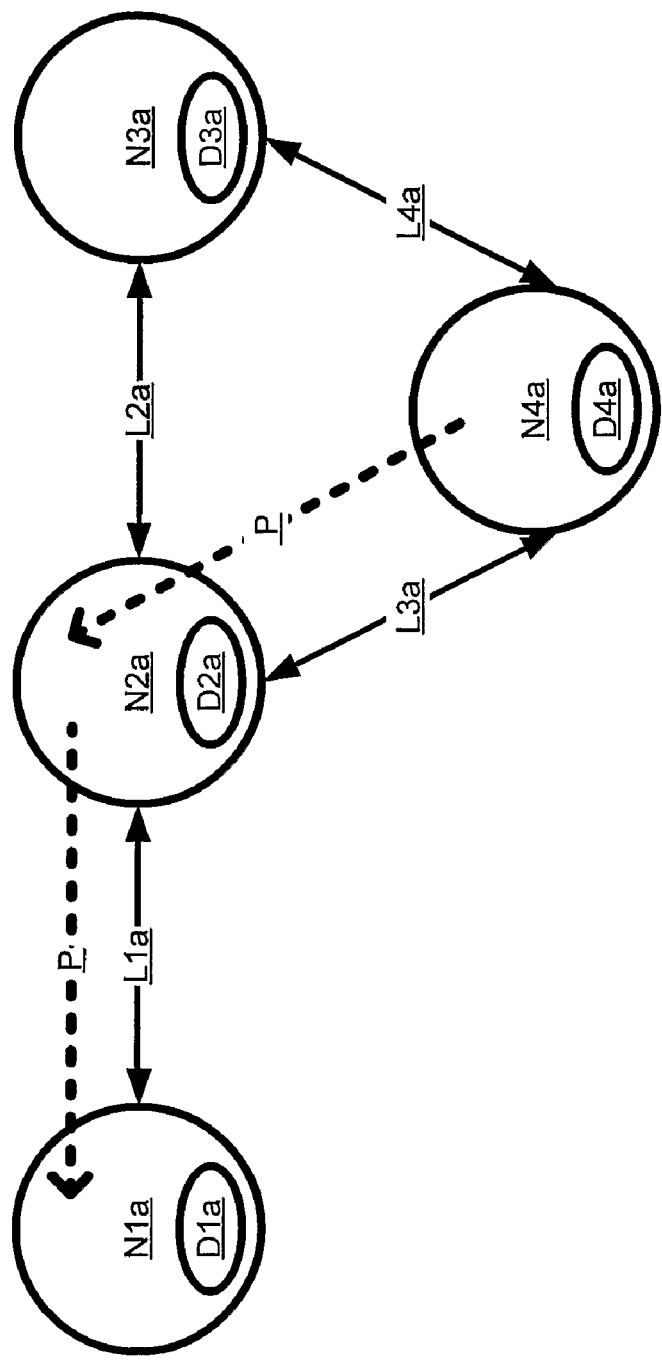
FIG. 12 is another schematic representation of the network of FIG. 11.

Payload traffic generated at an origin node Na that is intended for a destination node Na can now actually be delivered in accordance with knowledge paths Ka. For example, assume that node N4a wishes to send payload traffic to node N1a. Using the information in Table XII, it can be seen that traffic will be routed to node N1a from node N4a via node N2a. This traffic path P is shown in FIG. 12, which shows network 30a in the same state as FIG. 11, but with knowledge paths Ka removed so that traffic path P can be seen more clearly.

At this point it can be noted that various nodes can reach other nodes through different paths, even though certain preferred paths have been identified. Such preferred paths have been chosen since the embodiments thus far have assumed that all links L and La have substantially the same service characteristics. For example, in FIGS. 11 and 12, corresponding to Table XII, node N4a reaches node N1a via node N1a. This is reflected in Table XII at Row 4, Column 12, wherein node N2a is reflected as the next best neighbour to reach node N1a from node N4a. However, while less preferred in the example shown in Table XII, it is physically possible for payload traffic to be delivered along the path from node N4a, via node N3a and node 2a before final delivery to node N1a, which is the path that would be used if link L3a did not exist.

Figure 13:
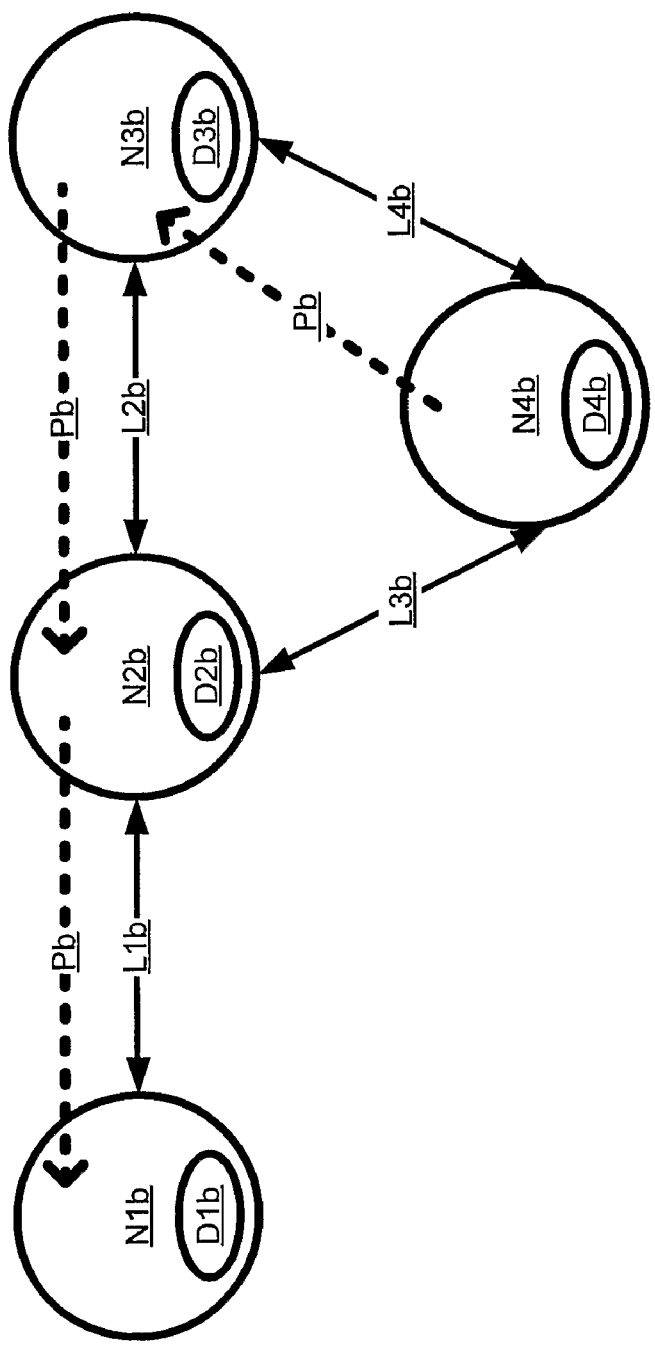
FIG. 13 is a schematic representation of a network in accordance with another embodiment of the invention.

However, in another embodiment, service characteristics for each link can vary, and databases for each node incorporate knowledge of such service characteristics when selecting a best neighbour as a next best step through which to route payload traffic. For example, referring now to FIG. 13, another network in accordance with another embodiment of the invention is indicated generally at 30b. Network 30b is substantially the same as network 30a, and like elements include like references but followed by the suffix "b". More specifically, network 30b includes links Lb, which follow the same paths as links La in network 30a. Also, network 30b includes four nodes Nb, which are substantially the same as nodes Na in network 30a. However in network 30b each link Lb has different service characteristics, whereas in network 30a each link La has the same service characteristics. Table XIII shows an exemplary set of service characteristics for each link Lb.

TABLE XIII

Service Characteristics for Links Lb

| Row | Column 1 Link | Column 2 Bandwidth | Column 3 Cost |
|---|---|---|---|
| 1 | L1b | 1 Megabit/second | $0.10 per kilobyte |
| 2 | L2b | 10 Megabit/second | $0.05 per kilobyte |
| 3 | L3b | 0.5 Megabit/second | $0.10 per kilobyte |
| 4 | L4b | 10 Megabit/second | $0.20 per kilobyte |

Explaining Table XIII in greater detail, column 1 identifies the particular link Lb in question. Column 2 identifies the bandwidth of the link Lb identified in the same row. Column 3 indicates the financial cost for carrying traffic over a particular link Lb in terms of cents per kilobyte. (It should now be understood that Table XIII can include any other service characteristics that are desired, such as bit error rate, latency etc.) The information for each link Lb can thus be made part of each database Db, and propagated through network 30b using method 200 or a suitable variant thereof, in much the same manner as node knowledge can be propagated throughout network 30b.

Databases Db respective to each node Nb know the details of each link Lb to which they are directly connected. For example, Node N4b will know the details of links L3b and L4b as shown in Table XIII. By the same token, node N3b will know the details of links L4b and L2b. In a present embodiment, each node Nb only knows about itself and the links Lb that it has to directly connected nodes Nb. But each node Nb need no knows anything about the overall network topology.

However, each node Nb Databases Db respective to each node Nb on either end of a particular pathway will know the cumulative service characteristics associated with the links Lb that define that pathway, once that database Db has knowledge of that node. Thus, once node N4b knows about node N1b, node N4b will also know the cumulative service characteristics, (and therefore the cumulative 'cost') of all links Lb between node N4b and node N1b.

Thus, once a particular node Nb has information about the characteristics of a particular link, then that node Nb can use such information in order to determine the "Best Neighbour" as the next best step through which to route traffic. For example, in Table XIII it can be seen that the bandwidth of link L3b is only 0.5 Megabits/second—whereas the bandwidth of link L4b and link L2b are both ten Megabits/second. Thus, payload traffic sent from node N4b to node N2b will be delivered to node N2b much faster if it is sent via node N3b, rather than if it is sent directly over link L3b.

Thus, using Table XIII node N4b can determine that node N3b is the next best step to reach both nodes N2b and nodes N1b, if speed of delivery of payload traffic is a priority. Table XIV thus shows how a portion of databases Db would appear if node N4b made such a determination (assuming that the information in Table XIII is not shown in Table XIV).

TABLE XIV

| | | Databases Db | | | | | | | | | | |
|---|---|---|---|---|---|---|---|---|---|---|---|---|
| | | Database D1b | | | Database D2b | | | Database D3b | | | Database D4b | |
| Row | 1 Rank | 2 Node Name | 3 Best Neighbour | 4 Rank | 5 Node Name | 6 Best Neighbour | 7 Rank | 8 Node Name | 9 Best Neighbour | 10 Rank | 11 Node Name | 12 Best Neighbour |
| 1 | Ø | N1b | N/A | Ø | N2b | N/A | Ø | N3b | N/A | Ø | D4b | N/A |
| 2 | 1 | N2b | N2b | 1 | N3b | N3b | 1 | N2b | N2b | 1 | N2b | N3b |
| 3 | 2 | N3b | N2b | 2 | N4b | N4b | 2 | N4b | N4b | 2 | N3b | N3b |
| 4 | 3 | N4b | N2b | 3 | N1b | N1b | 3 | N1b | N2b | 3 | N1b | N3b |

By the same token, FIG. 12 shows the path Pb of payload traffic for traffic originating from node N4b destined for node Nb based on the contents of database D4b as shown in Table XIV. In FIG. 12, path Pb does not travel via link L3b, but instead travels via links L4b and L2b. It should now be understood that complex, and multiple criteria can be employed when determining the best neighbour through which to route traffic. Table XIV can thus be populated optimizing service characteristics of link Lb, optimizing for bandwidth, cost, bit error rate, etc.

Of course, Table XIV would change if the best neighbour was chosen based on the next best step having the least financial cost, and ignoring bandwidth altogether. Referring again to Table XIII, in this case, since link L3b is financially less expensive than link L4b, then node N4b would choose node N2b as its next best step to reach node N2b and node N1b, and thus database D1b would appear the same as database D1a in Table XII.

It should now be apparent that the next best step can be based on a set of complex criteria for evaluating each link—for example, some overall rating of a link Lb can be determined by combining columns 2 and columns 3 of Table XIII, to provide a service characteristic rating that is a combination of both bandwidth and financial cost for a particular link.

It is again to be emphasized that the teachings herein are applicable to networks of greater complexity than networks 30, 30a and 30b. For example, referring now to FIG. 14, a more complex network in accordance with another embodiment of the invention is indicated generally at 30c. Network 30c includes the same types of elements as networks 30, 30a and 30b and like elements include like references but followed by the suffix "c". Of note, in this embodiment it is assumed that all links Lc have substantially the same length and substantially the same service characteristics, though in other embodiments links Lc can have varying lengths and service characteristics, similar to links Lb. Network 30c includes more nodes Na and links La, and to simplify explanation, however, network 30c is shown without specific tables showing the contents of databases Dc.

In contrast to networks 30, 30a and 30b, however, in network 30c it is assumed that databases Dc have only a limited number of rows in order to set an upper limit on the memory resources of each node Nc that will be consumed by its respective database Dc. Thus, in this network 30c, each node is does not maintain knowledge about the entire network 30c, but only a portion of the network 30c. (Such a configuration is in fact presently preferred when the teachings herein are applied to networks of a size where knowledge of the entire network results in an impractically large consumption of the overall computing resources of a given node.) For purposes of assisting in explanation, it will be assumed that each database Dc can store eleven rows of information. The first row is the null row as previously described in relation to Table II, which identifies the node Nc to which a particular database Dc belongs. The remaining nine rows allow the database Dc to maintain knowledge of nine other nodes Nc within network 30c.

Note that it is not necessary for each node Nc to have the same capacity for storage, and such capacity need not be fixed but can be dynamically allocated, either automatically or manually, as the needs of a particular node Nc change, but nodes Nc in network 30c are constructed to a limit of nine other nodes for explanation purposes.

Figure 14:
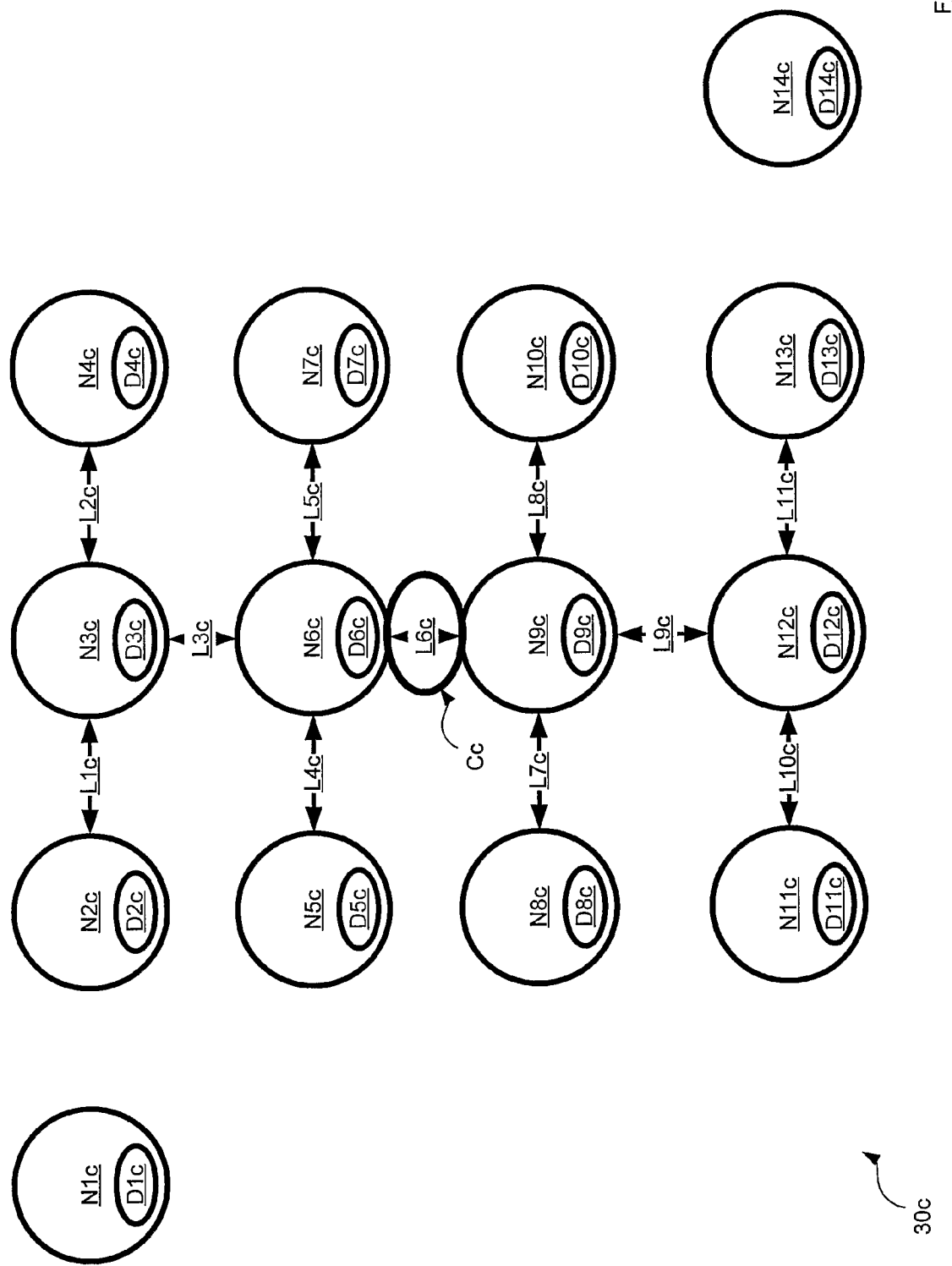
FIG. 14 is a schematic representation of a network in accordance with another embodiment of the invention.

Databases Dc for each node Nc maintain a concept of a "core". Where a specific node Nc is not included in a particular database Dc, then the core represents a default path for which that given node Nc may be located. As shown in FIG. 14, network 30c includes a core Cc which lies along link L6c, the details of which will be discussed in greater detail below. In general, it is presently preferred to ensure that the aggregate storage capacity of at least the databases Dc that comprise the core Cc is sufficient to ensure that the databases Dc that define the core Cc have knowledge of every node Nc within the network 30c. Accordingly, the size of the network according to the architecture of network 30c will thus complement the collective storage capacity of the two nodes Nc that define the core Cc. Thus, in the present example, collectively, node N6c and node N9c have sufficient capacity such that the nine rows in each of databases D6c and D9c are sufficient to maintain knowledge of every node within network 30c.

Thus, while each node Nc performs method 200, it will "hear" of more other nodes Nc than that node Nc will store. Accordingly, each node Nc is also operable to perform a prioritization operation to choose which nine other nodes Nc within network 30c to maintain knowledge of within its database Dc. Such a prioritization operation can be based on any prioritization criterion or criteria, or combinations thereof, such as which other nodes Nc are closest, which other nodes Nc carry the most traffic, which other nodes Nc does that particular node typically send payload traffic, etc, and such other criteria as will now occur to those of skill in the art. Such prioritization criteria thus also provides the "rank" of each node Nc in order of importance, thereby defining the order in which the database Dc is populated, and the order for which node knowledge should be sent to other nodes Nc in the network.

In the present example, it will be assumed that the prioritization criteria for each node Nc is to populate its database Dc in order maintain knowledge of:
(a) the other nodes Nc that are closest that that node Nc ("proximal nodes Nc"). Proximal nodes Nc are ranked in order of proximity;
(b) originating or destination nodes Nc with which the node Nc must have knowledge of in order to pass payload traffic on behalf of that originating or destination node Nc; ("originating or destination nodes Nc"). Originating and destination nodes are ranked according to the amount of payload traffic being carried on their behalf, and supersede proximal nodes.

(c) the other nodes Nc with which that node Nc sends or receives payload traffic; ("payload traffic nodes Nc"). Payload traffic nodes Nc are ranked according to the importance of a particular payload traffic in relation to another, and supersede all proximal nodes and supersede up to half of the originating or destination nodes Nc. Importance of payload traffic can be based on volume of traffic, or speed of traffic, or the like;

(d) up to a maximum of nine other nodes Nc during any particular cycle of method 200.

It is to be reiterated that the foregoing prioritization criteria is simplified for purposes of explanation of the present embodiment. In another, more presently preferred embodiment, nodes are ordered by their distance from a marked data stream value, except in such cases where:

1. This node is in the path of a High Speed Propagation Path ("HSPP", which is discussed in greater detail below) for this destination node, and this directly connected node is:
   In the path to the core and the HSPP is a notify HSPP.
   One of the nodes that told us of this HSPP and the HSPP is a request HSPP.
2. This node is marked in the data stream for this destination node.

If a node is marked in the data stream it will tell its directly connected nodes that have not marked it in the data stream a Distance from Data Stream (also referred herein as a Distance From Stream or "DFS") of 0. those that have marked it in the data stream it will tell a DFS equal to the link Cost ("LC") associated with the Service Characteristics of the links to the destination node. This will be explained in greater detail below.]

The formation of core Cc in network 30c will now be explained. In network 30c, it is initially assumed that nodes N2c through N13c are connected by links L1c through L11c, as shown in FIG. 14. It is also assumed that nodes N1c and nodes N14c are initially not connected to the remainder of network 30c.

Figure 15:
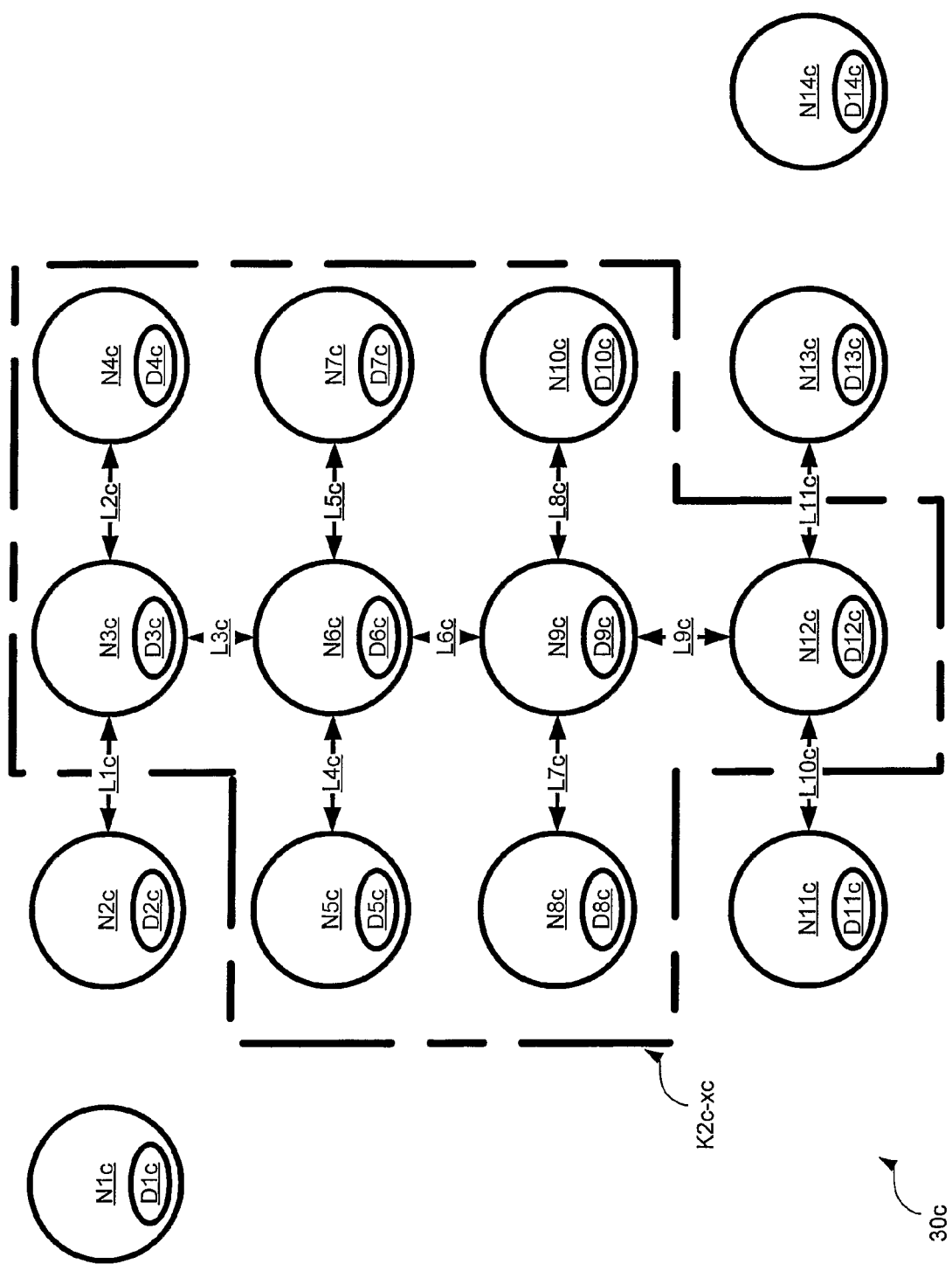
FIG. 15 is another schematic representation of the network of FIG. 14.
Figure 16:
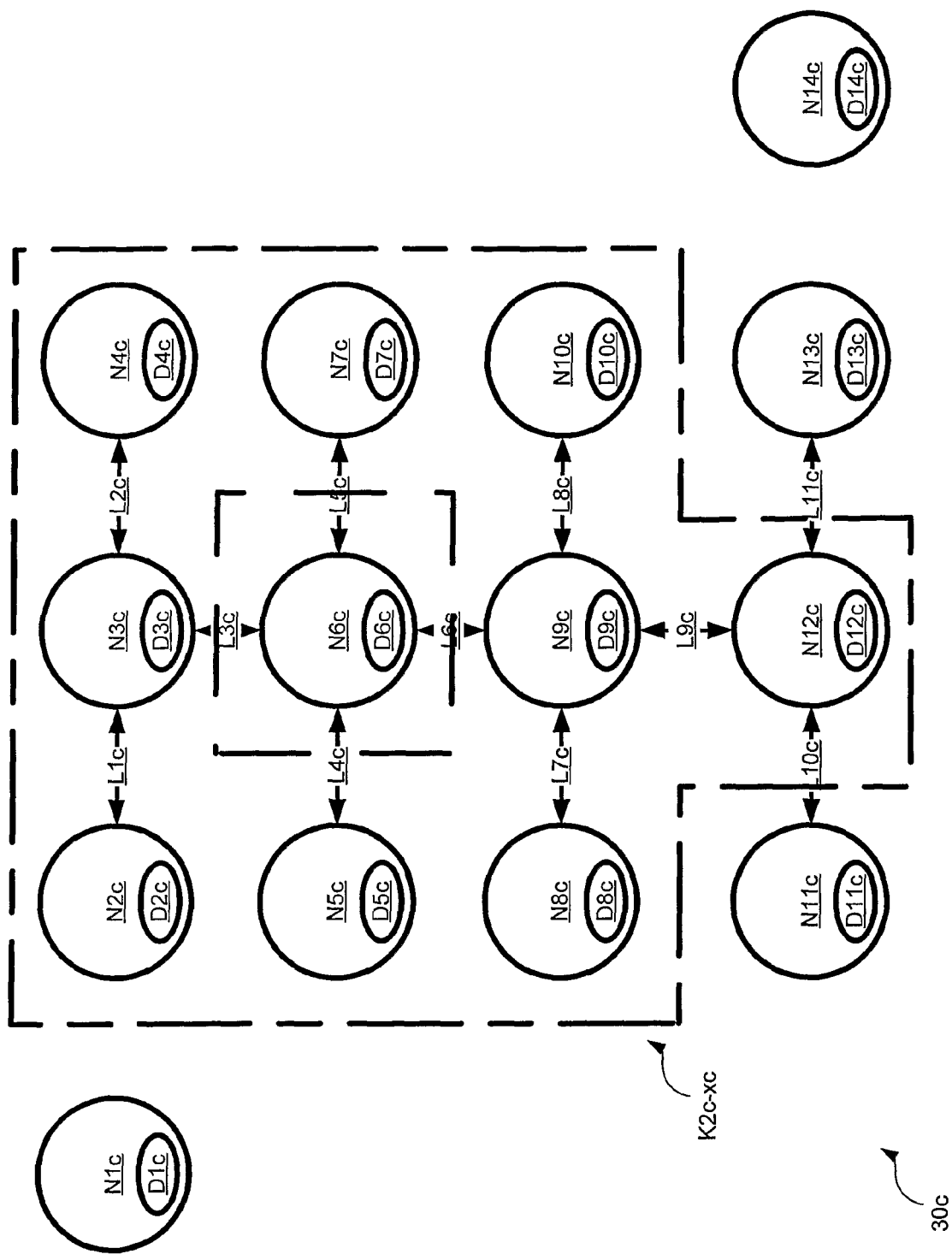
FIG. 16 is another schematic representation of the network of FIG. 14.

It is also assumed that, initially, no node Nc is attempting to send payload traffic to another node Nc, and that method 200 has been performed by each of nodes N2c and N13c to populate their respective databases Dc, subject to the prioritization criteria described above. FIG. 15 shows the other nodes Nc with which database D2c will be populated, represented as a closed dashed Figure and referred to herein as knowledge path block K2c-xc. Knowledge paths block Kc-xc surrounds all of the other nodes Nc of which node N2c is aware, i.e. nodes N3c-N10c, an node N12c. FIG. 16 shows the other nodes Nc with which database D6c will be populated, represented as a closed dashed Figure and referred to herein as knowledge path block K6c-xc. Knowledge path block K6c-xc surrounds all of the other nodes Nc of which node N6c is aware, i.e. nodes N2c-N5c, and nodes N7c-N11c, and node N12c. While not shown in the Figures, those of skill in the art will now appreciate the contents of the other databases Dc at this point in the present example.

At this point, it is also useful to note that payload traffic between any of nodes N2c-N6c and any of nodes N8c-N13c will all need to pass through link L6c. Thus, for this particular network, link L6c represents the "core" of network 30c at this point in the example. The core is shown in FIG. 14 as an ellipse encircling link L6c and indicated at Cc. The fact that link L6c is specifically the core Cc of network 30c need not be expressly maintained in each database Dc. Rather, each database Dc will determine a "Best Neighbour" indicating a neighbour that is the next best step in order to reach core Cc. The "Best Neighbour" to reach core Cc can be determined by examining database Dc to find which neighbouring node Nc is most frequently referred to as the "Best Neighbour" to reach the other nodes that are expressly maintained in database Dc. In the event that no neighbouring node Nc appears more frequently as a Best Neighbour, then the Best Neighbour appearing in Row 1, associated with the top-most ranked other node, can be selected as the Best Neighbour to reach the network 30c. A core is formed any time that two neighbouring nodes Nc point to each other as being the Best Neighbour to reach the core.

(Applying this core determination method to an earlier example, in Table XII and FIG. 11 recall that the Best Neighbour to the core of network 30a for node N1a would be node N2a; the Best Neighbour to the core of network 30a for node N2a would be node N3a; the Best Neighbour to the core of the network 30a for node N3a would be Node N2a; and the Best Neighbour to the core of network 30a for node N4a would be node N2a. Since node N2a points to node N3a, and node N3a points to node N2a, then link L2a would be the "core" of network 30a.)

It should now be apparent that when a network, such as network 30c, is first initialized a plurality of cores will form until method 200 is performed a sufficient number of times such that databases Dc are populated and maintain a substantially steady state. Also, as nodes Nc are added or removed, or links Lc are added or removed, (and/or other factors affecting the overall state of the network change), then the location of core Cc can change, and/or multiple cores can form.

Figure 17:
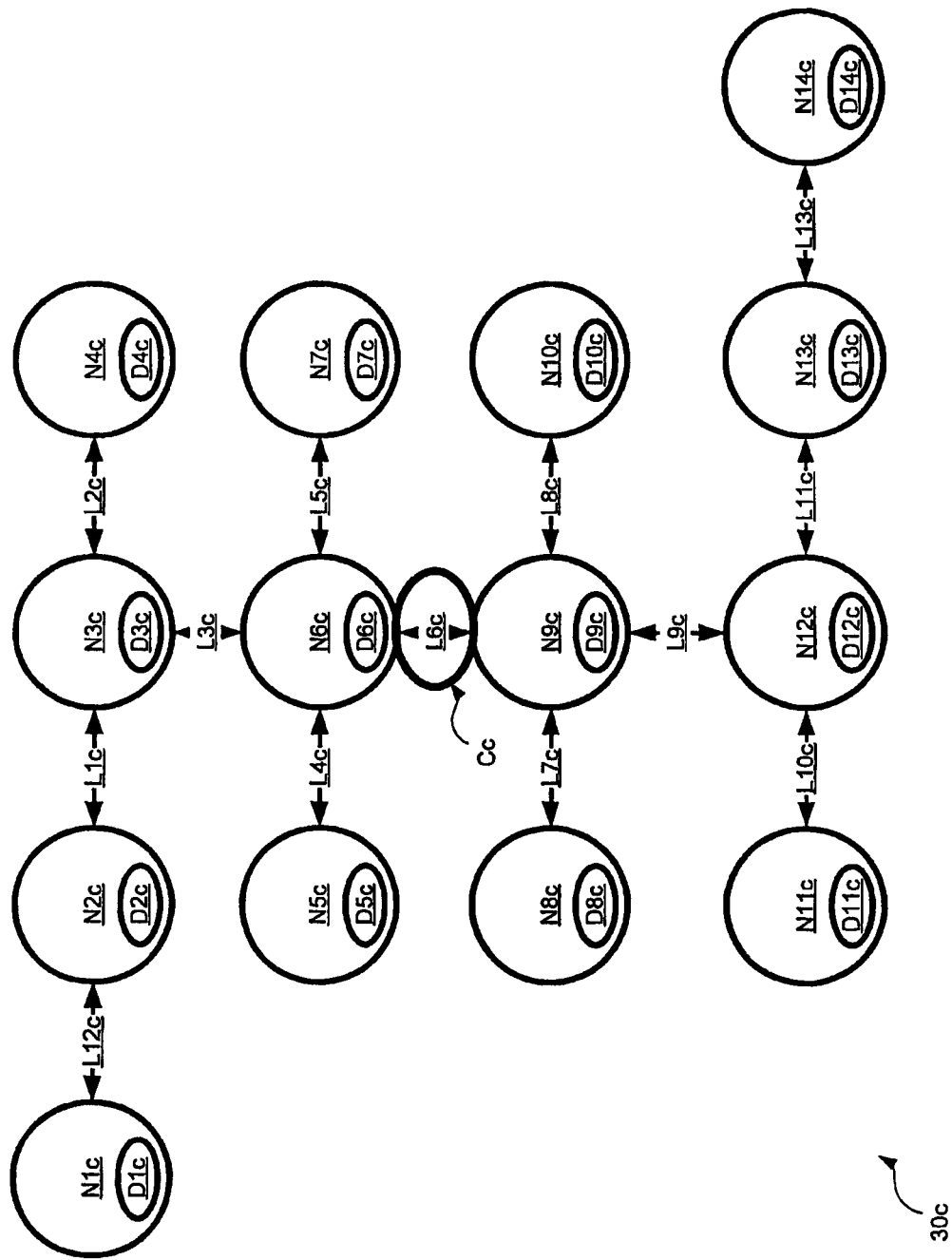
FIG. 17 is a schematic representation of a network in accordance with another embodiment of the invention.

Building on the example shown in FIGS. 14-16, and referring now to FIG. 17, it will be assumed that two new links are added to network 30c. Specifically, link 12c now joins nodes N1c and N2c, while link 13c now joins nodes N13c and N14c. As method 200 is performed by nodes N1c and N14c, and re-performed by the remaining nodes Nc, the location of core Cc at link L6c will ultimately not change in this particular configuration of network 30c. However, the contents of each database Dc may change according to the above-mentioned prioritization criteria. For example, node N2c will add node N1c to its database D2c, and drop node 12c from database D2c.

Also of note, node N1c will populate database D1c with knowledge about nodes N2c-N10c, while node N14c will populate database D14c with knowledge about nodes N5c-N13c. Thus, nodes N1c and N14c will not have knowledge of each other. Now assume that node N1c wishes to send payload traffic to node N14c.

Figure 18:
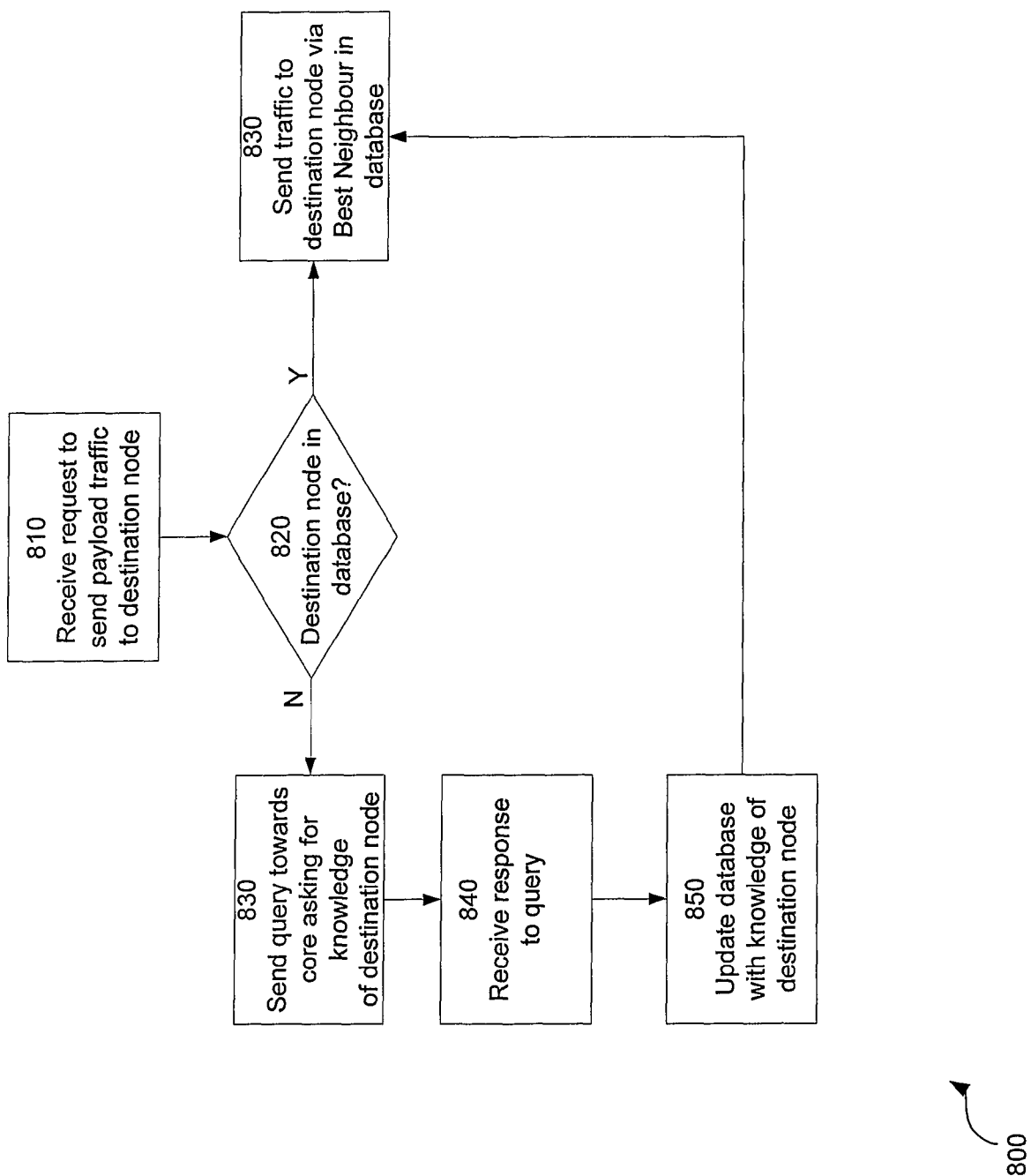
FIG. 18 shows a flow-chart depicting a method of obtaining network knowledge in accordance with another embodiment of the invention.

Since node N1c has no knowledge of node N14c, at this point node N1c can perform method 800 shown in FIG. 18 in order to gain such knowledge. Beginning at step 810, originating node N1c will receive a request to send payload traffic to destination node N14c. Such a request can come from another application executing on a computing environment associated with originating node N1c.

(As an aside, and as will become more apparent from further teachings herein, to put this entire method in more colloquial terms, a request sent to a neighbor node can be in the form of: 'if you see route information for my destination node, can you make sure to tell me about it so I can make a good choice on where to send my payload data'. If anode has some payload to send, but no place to send it, it will hang onto that payload until a timeout on the payload expires (if there is one), or it needs that room for other packets, or it gets told a route update that will allow it to route to a directly connected node.)

Next, at step 820, a determination is made as to whether the destination node to which the payload traffic is destined is located in the local database Dc. In this example, recall that database D1c does not include information about destination node N14c, and so the result of this determination would be "no", and method 800 would advance from step 820 to 830. (If, however, the destination node was in the database D1c, then at step 840, payload traffic could be sent via the Best Neighbour identified in the database, in much the same manner as was described in relation to network 30a in FIG. 12, or network 30b in FIG. 13.)

Next, at step 830 a query will be sent towards the core asking for knowledge of destination node N14c. Such a query will be passed towards the core Cc, by each neighbouring node Nc, along the path of "Best Neighbours" that lead to core Cc, until the query reaches a node Nc that has knowledge of node N14c. Thus, each node Nc will receive the query, examine its own database Dc, and, if it has knowledge of destination node N14c, it will send such knowledge back through the path to originating node N1c. If the node Nc receiving the query does not have knowledge of destination node N14c, then it will pass the query on to the neighbouring node Nc that is its Best Neighbour leading to core Cc, until the query reaches a node Nc that has knowledge of node N14c. In the present example, the query from node N1c will follow the path from node N2c; to node N3c; to node N6c; and finally to node N9c, since node N9c will have knowledge of node N14c due the prioritization criteria defined above. Thus, the knowledge of node N14c will be passed back through node N6c; to node N3c; to node N2c and finally to node N1c, with nodes N6c, N3c, N2c each keeping a record of the knowledge of node N14c in their respective databases Dc so that they can pass payload traffic on behalf of network N1c.

Next, at step 840 a response will eventually be received by the originating node Nc to the query generated at step 830. In the present example, node N1c will thus receive knowledge back from node N9c about node N14c, and, at step 850, node N1c will update its database D1c with knowledge of node N14c. Method 800 can then advance from step 850 to step 830 and payload traffic can be sent to node N14c from node N1c, in much the same manner as was described in relation to network 30a in FIG. 12, or network 30b in FIG. 13.

Figure 19:
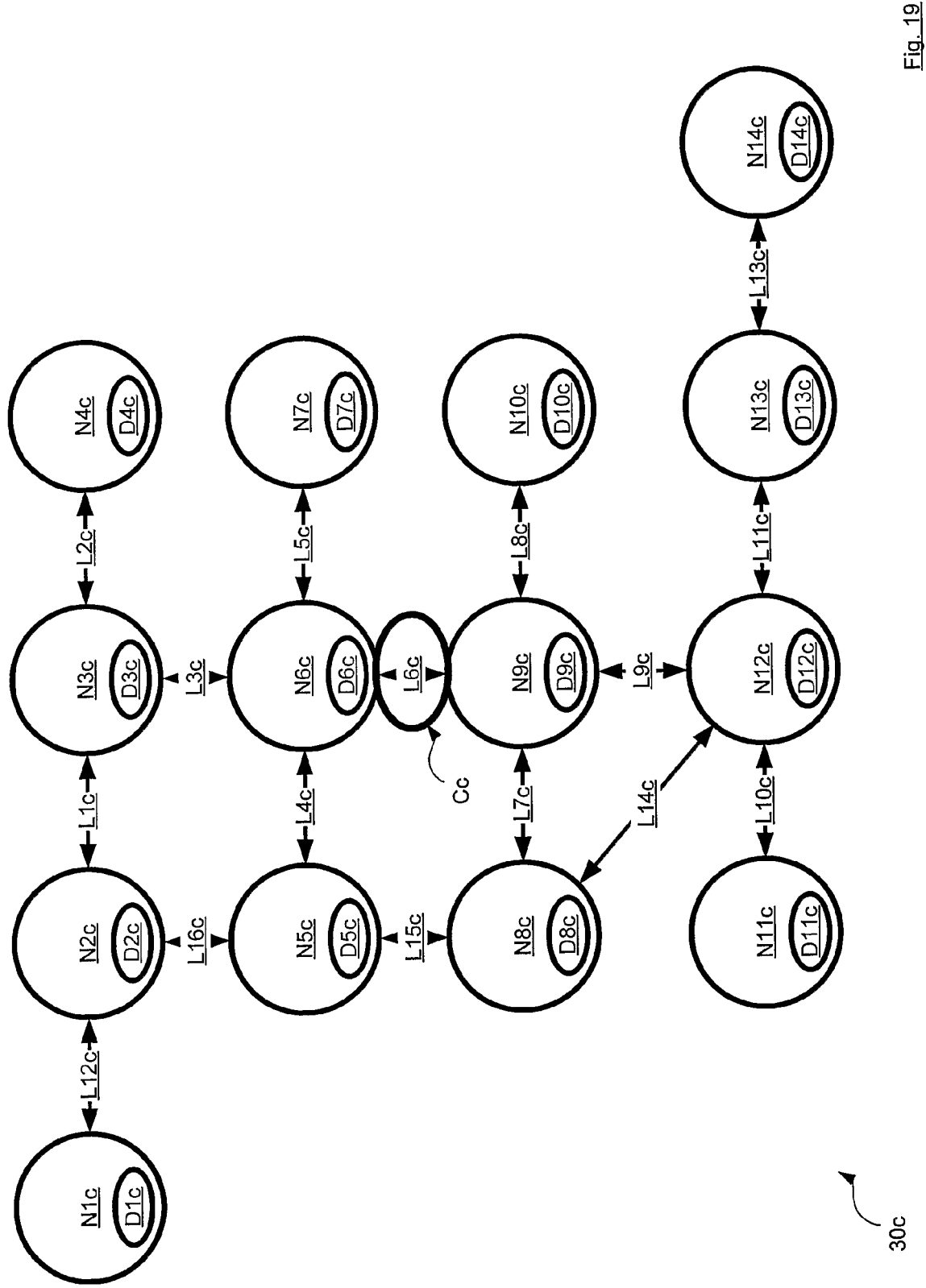
FIG. 19 is a schematic representation of a network in accordance with another embodiment of the invention.

Building on the example shown in FIG. 17, and referring now to FIG. 19, it will be assumed that three new links are added to network 30c. Specifically, link L14c is added to join node N12c and node N8c; link L15c is added between node N8c and node N5c; and link L16c is added between node N5c and node N2c. ach node Nc performs method 200 a number of times to absorb the knowledge of these new links Lc. As such knowledge propagates throughout network 30c, eventually, the path of payload traffic from node N1c to node N14c will travel via nodes N2c; N5c; N8c; N12c and N13c.

It should now be understood that where links L14c, L15c and L16c existed prior to nodes N1c and N14c gaining knowledge of each other, then nodes N1c will initially gain knowledge of node N14c via the core Cc as described in relation to FIGS. 17 and 18; and then the optimum path (i.e. path with the fewest number of hops through Best Neighbours) will converge to the example shown in FIG. 19.

While method 800 is directed to "pulling" knowledge of a destination node N that is not known by an originating node from the core Cc, it should now also be appreciated that where a new destination node Nc joins network 30c, that node Nc can also "push" knowledge of itself towards nodes at the core Cc, so that when method 800 is performed an originating node Nc can be sure that it will find information about the new/destination node Nc at core Cc. In the example given in FIG. 14, such a "push" of knowledge was not needed due to the performance criteria that automatically ensured that node N9c at core C would gain knowledge of node N14c. However, in other configurations of network 30c, a "push" of knowledge of nodes Nc at the core Cc can be desired.

While only specific combinations of the various features and components of the present invention have been discussed herein, it will be apparent to those of skill in the art that desired subsets of the disclosed features and components and/or alternative combinations of these features and components can be utilized, as desired. For example, While the foregoing discussions contemplates substantially synchronous performance of method 200 by each node N (and its variants), it should be understood that such synchronous performance is not necessary and is used merely to simplify explanation.

As another variation, each node N (and its variants) can also keep a separate record of all information that was sent to that node N (and its variants) by neighbouring nodes N (and its variants), even if that particular neighbouring node N (and its variants) was not chosen as the Best Neighbour for storage in that database D. This can allow that node N with its Best Neighbour removed to select its next Best Neighbour from the remaining neighbouring nodes N without having to rerun method 200, or otherwise wait for an update from all other remaining neighbour nodes.

The present invention thus provides a novel system, method and apparatus for networking.

Still further embodiments of the invention are contemplated and a review of certain of these embodiments will lead to further understanding of the invention. In the embodiments that follow, certain terms or concepts may differ somewhat from the previous section. Such differences are to be viewed as alternatives and/or supplements to the previous embodiments.

In general, the network architecture of the present invention can enable individual nodes in the network to coordinate their activities such that the sum of their activities allows communication between nodes in the network.

The principle limitation of existing ad-hoc networks used in a wireless environment networks is the ability to scale past a few hundred nodes, yet the network architecture and associated methods at least mitigate and in certain circumstances overcome prior art scaling problems.

Exemplary embodiments thus follow in order to clarify understanding. These examples, when making specific reference to numbers, other parties' software or other specifics, are not meant to limit the generality of the method and system described herein. A person of skill in the art will be able to realize when two or more merged concepts could be separately implemented or useful, even if not explicitly described as such. Alternative embodiments should not be considered mutually exclusive unless specifically stated.

In the following embodiments, the following terms are used:

Nodes

Each node in a network is directly connected to one or more other nodes via a link. A node could be a computer, network adapter, switch, wireless access point or any device that contains memory and ability to process data. However, the form of a node is not particularly limited.

Links

A link is a connection between two nodes that is capable of carrying information. A link between two nodes could be several different links that are 'bonded' together. A link could be physical (wires, etc), actual physical items (such as boxes, widgets, liquids, etc), computer buses, radio, microwave, light, quantum interactions, sound, etc. A link could be a series of separate links of varying types. However, the form of a link is not particularly limited.

Calculation of Link Cost

'Link Cost' is a value that allows the comparison between two or more links. In this document the lower the 'link cost' the better the link. This is a standard approach, and someone skilled in the art will be aware of possible variations.

Link cost is a value that is used to describe the quality of the link. The link cost for the link can be based on (but not limited to):

1. line quality
2. uptime
3. link consistency
4. latency
5. bandwidth
6. signal to noise ratio
7. remaining battery power on the node The link cost will be able to change over time as the factors that is it based on change.

Persons skilled in the art will be able to assign link costs, or create a dynamic discovery mechanism.

It is suggested that the assignment of link costs is consistent across the network. For example two identical links in different parts of the networks should have the same or similar link costs.

It is suggested that the link cost of a pipe has an approximately direct relationship to its quality. For example, a 1 Mbit pipe should have 10 times the link cost of 10 Mbit pipe. These link costs will be used to find the best path through the network using a Dykstra like algorithm An alternative embodiment involves randomly varying the calculated link cost by a small random amount that does not exceed 1% (for example) of the total link cost.

Node Names

Each node in the network has a unique name.
This unique name could be:
1. Generated by the node.
2. Assigned prior to node activation.
3. Requested from a central location by the node in a manner similar in result to a DHCP (Dynamic Host Configuration Protocol) server. If a node was to request a name from a central location using this described network, it would first pick a random unique name and use that name to request a name from the central location.

A node may keep its name permanently, or may generate a new name on startup or any time it wants to. Node A can send a message to node B if node A knows the name of node B.

A node may have multiple names in order to emulate several different nodes. For example a node might have two names: 'Print_Server' and 'File_Server'.

A node may generate new a name for each new connection that is established to it.

Ports are discussed as a destination for messages, however the use of ports in these examples is not meant to limit the invention to only using ports. A person skilled in the art would be aware of other mechanisms that could be used as message destinations. For example, nodes could generate a unique name for each connection.

Usually nodes should have a unique name. An alternative embodiment would allow a node to share a name with another node or nodes in the network. This will be discussed in detail later.

There is no limitation implied by the inventors as to the number of names a node has, how often it adds or removes names, what the name is, or if it tells anyone about the name or names that it has selected.

For the sake of clarity in this document we assume that each node has only one unique name associated with it. This should not be seen as limiting the scope of this invention. A node may share the same name as one or more other nodes in the network.

Establishing Connections Between Nodes

If a link is able be established between two nodes and these nodes wish to establish a link then nodes will need to exchange some information to establish that connection. This information may include version numbers, etc.

Figure 20:
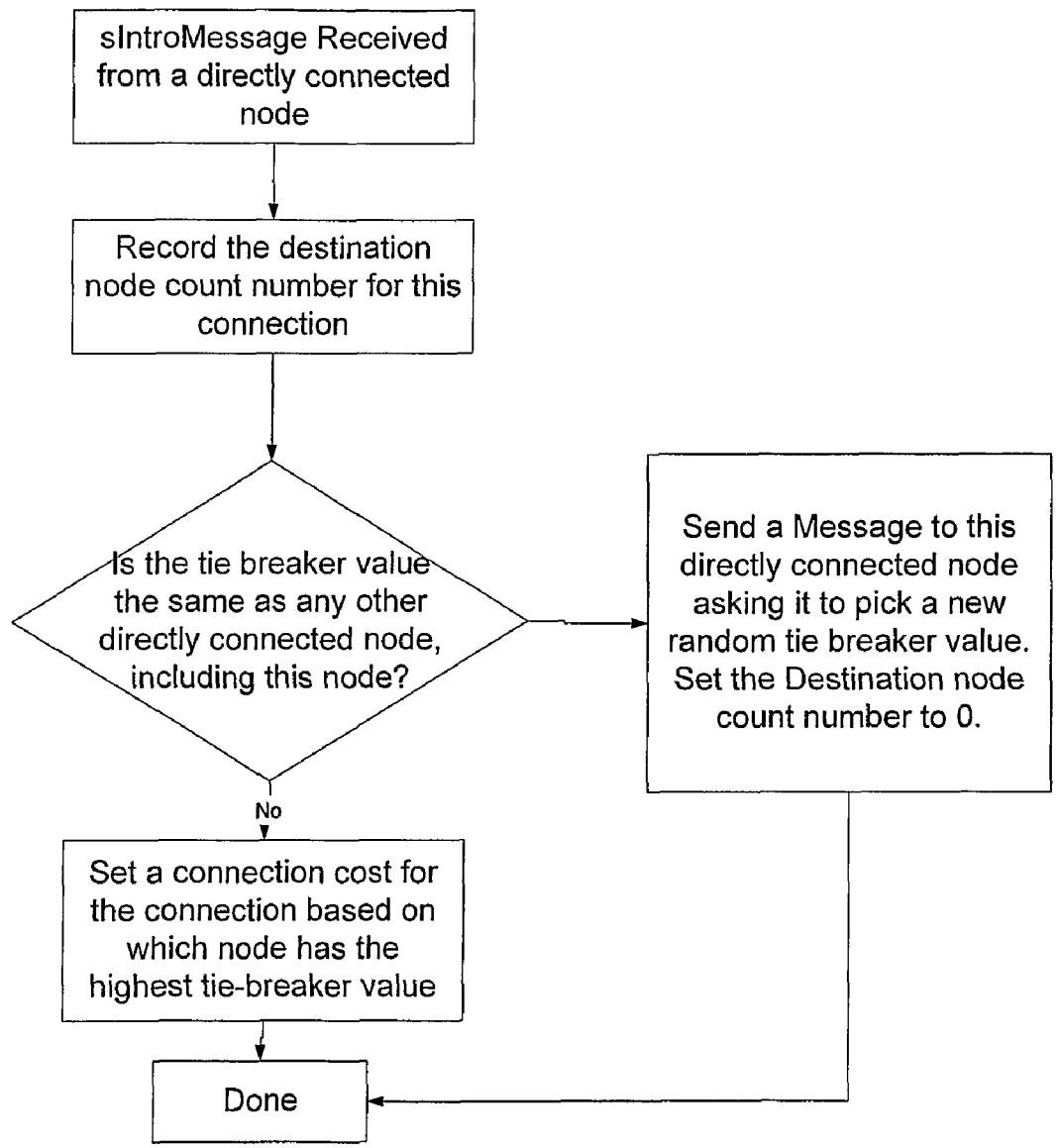
FIG. 20 shows a flow-chart depicting a method of exchanging information to establish a connection between nodes in accordance with another embodiment of the invention.

Alternative embodiments could include the exchanging of a 'tie-breaker' number that will allow a node to choose between to otherwise equal links. It is suggested that the same tie-breaker value is given to all directly connected nodes. If a node A tells node B that it has already seen an equivalent tie-breaker number from some other node then node B will need to pick a new tie-breaker number and send it to all of its directly connected nodes. This process is illustrated in FIG. 20.

The request for a new tie-breaker number might look like this (for example):

```
struct sRequestNewTieBreaker {
    // This structure is empty, if the node sees this message it will
    // generate a new tie breaker value and tell all its directly connected
    // nodes this new value
}
```

Alternative embodiments could include a maximum count of nodes that this node wants to know about. For example, if node A has limited memory it would tell node B to tell it about no more then X different nodes.

Alternative embodiments could include exchanging of link costs for the link that was used to establish the connection. If the link cost changes during the operation of the network a node may send a message to its directly connected node on the other end of the link that the link cost has changed. If link costs are exchanged, nodes may agree on the same link cost or may still pick different link costs, indicating an asymmetrical connection.

If all three previous alternative embodiments were included the message exchanged would look like this (for example):

```
struct sIntroMessage {
    // the number used to break ties
    int                uiTieBreakerNumber;
    // the maximum number of destination nodes
    // this node wants to know about.
    int                uiNodeCapacityCount;
    // the link cost for the connection between these two nodes
    float              fLinkCost;
}
```

Figure 21:
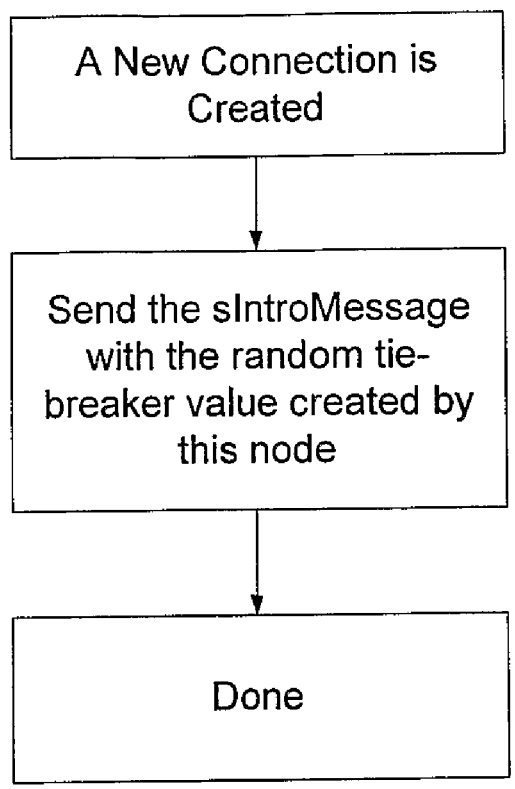
FIG. 21 shows a flow-chart depicting an initialization process for a method of establishing a connection between nodes in accordance with another embodiment of the invention.

FIG. 21 is a flowchart of initialization process.

A connection is assumed to be able to deliver the messages in order and error free. If this is not possible is it assumed that the connection will be treated as 'failed'.

The Spread of Node Knowledge

In order for node A to send a message to node B, node A needs to know the name of node B as well as the directly connected node or link that is the next best step to get to node B.

If node A or node B wants another node to send them messages then they have to tell at least one directly connected node about their name.

When a node has established a link to another node it can start sending node information. Node information includes the name of the node and the cumulative link cost to reach that node. When the network is just turned on, no node knows about the names of any other node except itself, thus the initial cumulative link cost for the nodes that it knows about (itself) would be 0.

When a node receives knowledge of another node A from link L it will add the link cost of the link L to the cumulative link cost it was told for node A and store that information associated with the link L in database D. When the link cost for node A that was received from connection L is referenced by this node from database D, it will implicitly include the link cost for that link L that was added to it.

Each node stores the information that it has received from each link. A node does not need to know the name of the node on the other end of the link. All it needs to do is record the knowledge that the node on the other end of the link is sending it. A node will store all the node updates it has received from neighbour nodes.

When a node N has received knowledge of node B from a link it will compare the cumulative link costs for node B that it has received from other links. It will pick the link with the lowest cumulative link cost as its "Best Neighbour" for the messages flowing to node B. When a node N sends an update for node B to its directly connected nodes it will tell them the name of the node and the lowest cumulative link cost that it has received from its directly connected nodes.

Figure 22:
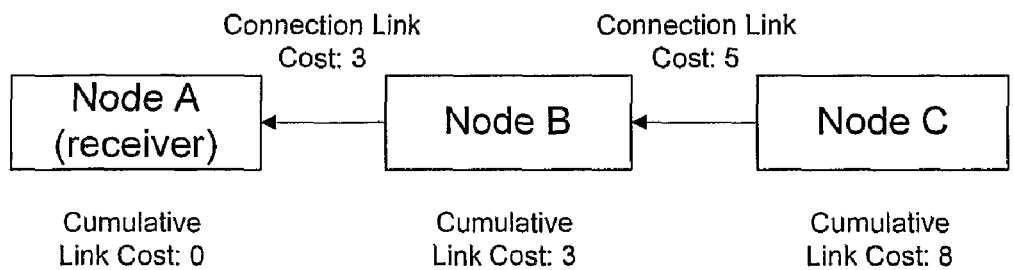
FIG. 22 is a schematic representation of a network showing the additive property of cumulative link cost for a method of spreading node knowledge in accordance with another embodiment of the invention.
Figure 23:
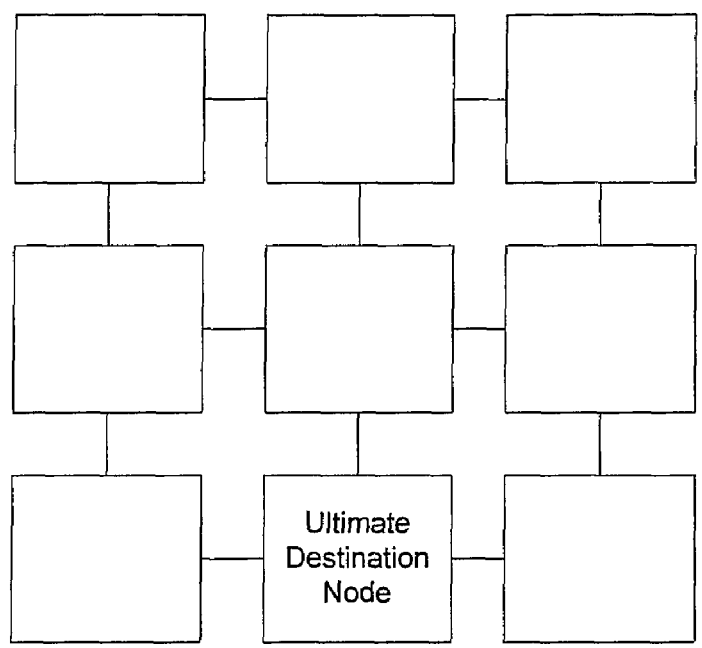
FIG. 23 shows a flow-chart depicting the flow of node knowledge through a network for a method of spreading node knowledge in accordance with an embodiment of the invention.
Figure 24:
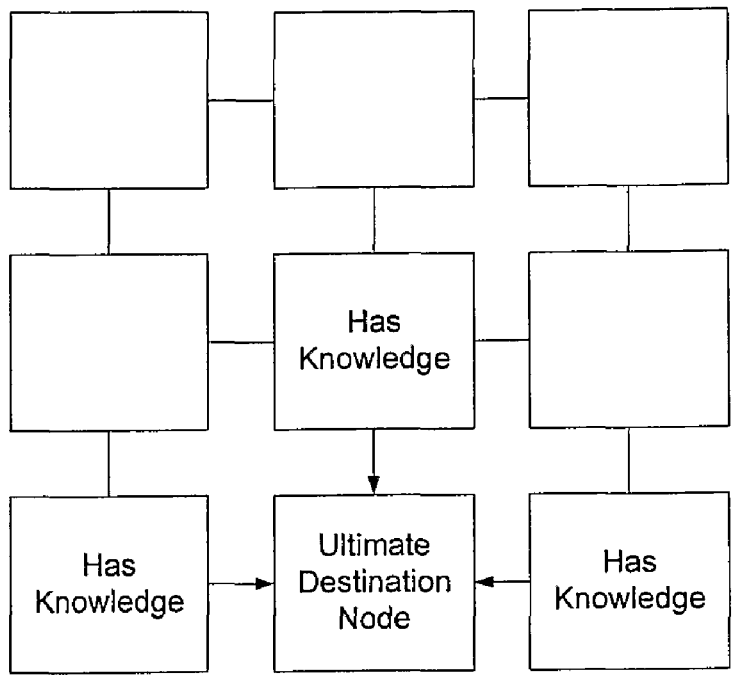
FIG. 24 shows a flow-chart depicting the flow of node knowledge through a network for a method of spreading node knowledge in accordance with an embodiment of the invention.
Figure 25:
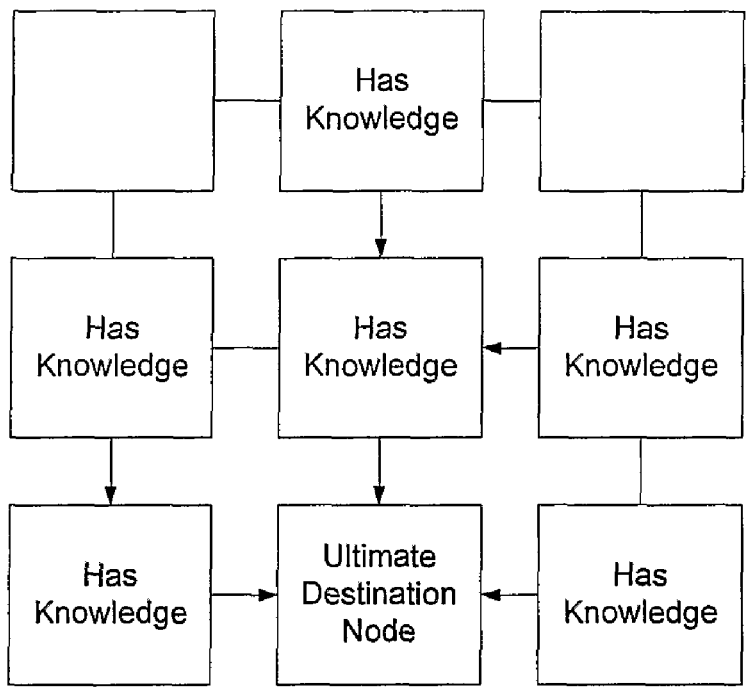
FIG. 25 shows a flow-chart depicting the flow of node knowledge through a network for a method of spreading node knowledge in accordance with an embodiment of the invention.
Figure 26:
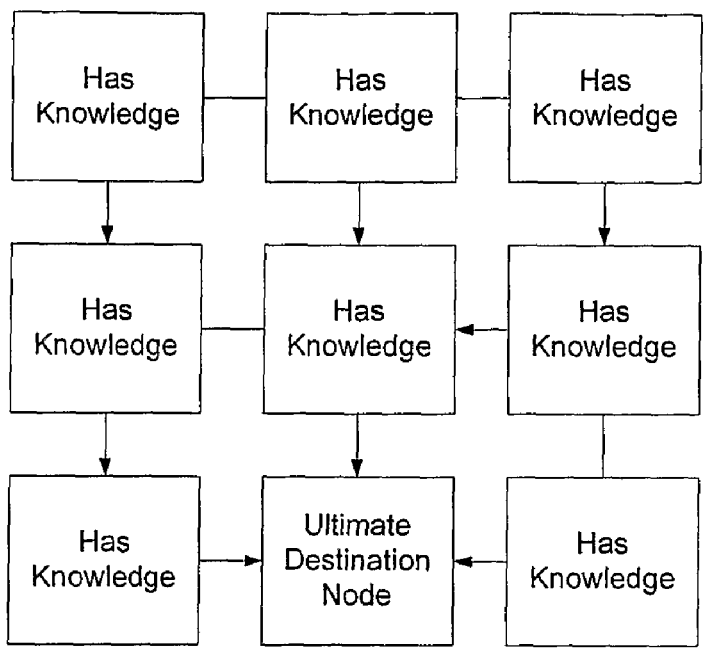
FIG. 26 shows a flow-chart depicting the flow of node knowledge through a network for a method of spreading node knowledge in accordance with an embodiment of the invention.

Cumulative link cost is additive. FIG. 22 demonstrates this additive property.

This process continues until knowledge of the node has spread through the entire network and each node has selected one link as having the lowest cumulative link cost.

This process is very similar to Dykstra's algorithm, or the Bellman-Ford algorithm for finding the shortest path through a network. Someone skilled in the art will recognize such approaches, and the variations that yield a similar result.

FIGS. 23-26 show the flow of node knowledge through a network. All the links are assumed to have cost of one. This is considered to be an example only and in no way is meant to limit the generality of this invention. For example, links may have different link costs, and the number of nodes and their specific interconnections may be infinitely varied.

At no point does a node need to build a global view of the network topology. A node is only aware of node knowledge its directly connected neighbor nodes have told it. This type of network might be compared to a distance vector network by someone skilled in the art.

An alternative embodiment could use the tie-breaker number (discussed earlier) to pick between two or more links with the lowest cumulative link cost.

The structure for message that spreads node knowledge might look like this (for example)

```
struct sNodeKnowledge {
    Name         NameOfTheNode;
    Float        fCumulativeLinkCost;
}
```

The fCumulativeLinkCost should be set to zero on the node with that particular name.

Alternative embodiments could have the fCumulativeLinkCost set to non-zero on the node with that particular name. This could be used to disguise the true location of a destination node. Setting the fCumulativeLinkCost to non-zero on the node with that particular name (for example 50) will not affect the convergence of the network.

Link Cost Changes

If a link cost changes then the node will need to need to take the difference between the new link cost and the old link cost and add it to the cumulative link cost for all node information that has been received from that link.

Below is exemplary pseudo code that shows how cumulative link cost can be adjusted for each node update that was received from the link that changed its link cost.

```
CumualtiveLinkCost=CumualtiveLinkCost+
    (NewLinkCost-OldLinkCost);

If (CumualtiveLinkCost>INFINITY)
    CumualtiveLinkCost=INFINITY;
```

On the basis of this change it will also re-evaluate its choice of 'Best Neighbour'. It will also need to tell its neighbors about any nodes where the lowest cumulative link cost for a particular destination node changed.

For example, if the link cost for a link that was not chosen as a 'Best Neighbour' for a destination node A changes, and after the change that link is still not chosen as a 'Best Neighbour' for destination node A, then the cumulative link cost would remain the same for node A and no updates would need to be sent to directly connected nodes.

Link Removal (if a Link is Removed)

This can be looked at the same way as the link cost for that link going to infinity.

For each destination node that was using this link as it 'Best Neighbour' the next best 'non-infinity' alternative for will be selected. If there is no such alternative then no 'Best Neighbour' can be selected and all directly connected nodes will be told a cumulative link cost of infinity for those nodes.

If no 'Best Neighbour' is selected then messages destined for those nodes will not be able to sent.

Large Networks

In large networks with a large variation in interconnect speed and node capability different techniques need to be employed to ensure that any given node can connect to any other node in the network, even if there are millions of nodes.

Using the original method, knowledge of a destination node will spread quickly through a network. The problem in large networks is three fold:

1. The bandwidth required to keep every node informed of all destination nodes grows to a point where there is no bandwidth left for data.
2. Bandwidth throttling on destination node updates used to ensure that data can flow will slow the propagation of destination node updates greatly.
3. Nodes with not enough memory to know of every node in the network will be unable to connect to every node in the network, and may also limit the ability of nodes with sufficient resources to connect to every node in the network.

A solution is found by introducing the idea of the 'core' or center of the network.

The core of the network will most likely have nodes with more memory and bandwidth then an average node, and most likely to be centrally located topologically.

Since this new network system does not have any knowledge of network topology, or any other nodes in the network except the nodes directly connected to it, nodes can only approximate where the core of the network is.

This can be done by examining which link is a 'Best Neighbour' for the most destination nodes. A directly connected link is picked as a 'Best Neighbour' for a destination node because it has the lowest cumulative link cost. The lowest link cost will generally be provided by the link that is closest to the ultimate destination node. If a link is used as a 'Best Neighbour' for more destination nodes then any other link, then this link is considered a step toward the core, or center of the network.

An alternative embodiment could be the node making a decision as to the next best step to some other node or beacon, and use this as its 'next best step to the core'.

An alternative embodiment could be the node using some combination of factors to determine what its 'next best step to the core' is. These factors could some combination of (although not limited to):
1. Radio direction finding of some target beacon
2. GPS position co-ordinates, and the next best step to some location
3. A special marker node or nodes.
4. Other externally measurable factors
A node does not need to know where the center of the network is, only its next best step the center of the network.

A core can be defined as when two nodes select each other as their next best step towards the core. There is nothing special about the core, the two nodes that form the core act as any other nodes in the network would act.

If there is a tie between a set of directly connected nodes for who was picked as the 'Best Neighbour' for the most destination nodes, the directly connected node with the highest 'tie-breaker' value (which was passed during initialization) will be selected as the next best step towards the core. This mechanism will ensure that there are no loops in a non-trival network (besides Node A->Node B->Node A type loops). If this tie-breaker embodiment is not used, then a random selection can be made.

This idea of using a nodes 'next best step to the core' forms a hierarchy. This hierarchy can be used to push specific node knowledge up the hierarchy to the top of the tree. The HSPP's (discussed later) exploit this hierarchy to push (or pull) node knowledge up and down this hierarchy.

FIG. 54 is an example of network where each node has selected a directly connected node as its next best step to the core. The network is then rearranged to better show the nature of the hierarchy that is created. As the network topology changes so will the hierarchy that is formed.

Detecting an Isolated Core

An alternative embodiment that helps in the detection of 'isolated cores'.

Figure 27:
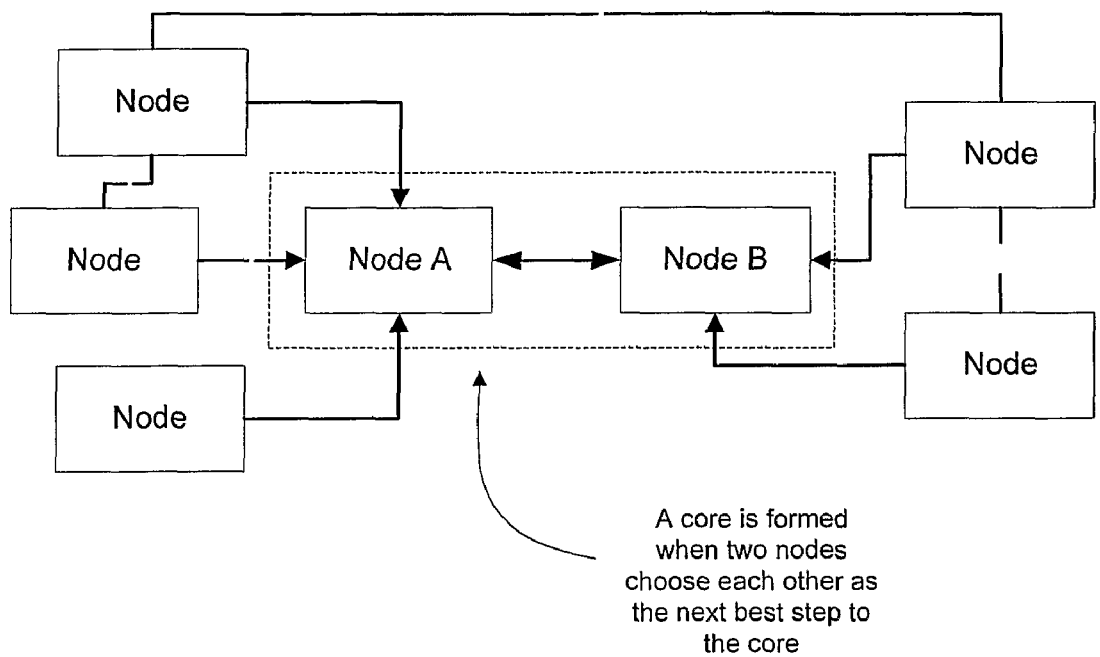
FIG. 27 is a schematic representation of a network showing a method for detecting an isolated core in accordance with an embodiment of the invention.

A core is defined as two directly connected nodes that have selected each other as the next best to the core. FIG. 27 illustrates and example of this.

When a node has chosen a directly connected node as its 'next best step to the core' it will tell that directly connected node of its choice. This allows nodes to detect when they have generated a core that no other nodes are using as their core.

The message that is passed can look like this:

```
struct sCoreMessage {
    bool        bIsNextStepToCore;
}
```

If a core is created, both nodes that form the core (in this example Node A and Node B) will check to see how many directly connected nodes they have. If there is more then one directly connected node then they kill examine all the other directly connected nodes.

If the only directly connected node that has chosen this node as its next best step to the core is the node that has caused the core to be created, then this node will select its next best choice to be the next best step to the core.

This can help eliminate cores that can block the flow of knowledge to the real core.

Exemplary Alternative Ways to Select the Next Best Step to the Core

The approach discussed previously involved assigning a credit of '1' to a directly connected node for each destination node that selects that directly connected node as a 'Best Neighbour'. The node with the highest count is the next best step to the core (or in the case of an isolated core, the second highest count).

If any embodiment uses multiple 'Best Neighbours' (such as multipath discussed later), then each 'Best Neighbour' chosen for each destination node could be assigned the appropriate credit. Alternatively, only that 'Best Neighbour' with the best latency (in the case of multipath) could be assigned the credit.

Instead of assigning a credit of one to each directly connected node for each destination node that selects it as its best choice, other values can be used.

For example, log(fCumulativeLinkCost+1)*500 can be the credit assigned. Other metrics could also be used. This metric has the advantage of giving more weight to those destination nodes that are further away. In a dense mesh with similar connections and nodes, this type of metric can help better, more centralized cores form.

Another possible embodiment which can be used to extend the idea of providing more weighting to destination nodes that are further away is to order all destination nodes by their link costs, and only use the x % (for example, 50%) that are the furthest away to determine the next best step to the core.

Another embodiment can use a weighting value assigned to each node. This weight could be assigned by the node that created the name. For example, if this weighting value was added to the node update structure it would look like this:

```
struct sNodeKnowledge {
    Name        NameOfTheNode;
    Float       fCumulativeLinkCost;
    Int         nWeight;
}
```

The nWeight value (that is in the sNodeKnowledge structure) can be used to help cores form near more powerful nodes. For example the credit assigned could be multiplied by 10^nWeight (where 10 is an example).

This will help cores form near the one or two large nodes, even if they are surrounded by millions of very low power nodes.

The nWeight value should be assigned in a consistent fashion across all nodes in the network. Possible nWeight values for types of nodes:

| nWeight value | Type of Node | Equivilant to X low capacity sensors |
|---|---|---|
| 0 | A very low capacity sensor or mote | 1 |

-continued

| nWeight value | Type of Node | Equivilant to X low capacity sensors |
|---|---|---|
| 1 | A bigger sensor | 10 |
| 2 | A bigger sensor with more battery life and memory | 100 |
| 3 | A cell phone | 1000 |
| 10 | A home computer | 10000000000 |
| 15 | A core router | 1000000000000000 |
| 20 | A super computer with massive connectivity and memory | 100000000000000000000 |

These weight values are suggestions only, someone skilled in the art would be able to assign suitable values for their application.

Next Step to the Core in a Network with Asymetric Link Costs

This is an alternative embodiment for choosing the next best step to the core.

If link is given an asymmetric cost, for example the link L that joins nodes A and B has a cost of 10 when going from A to B and a cost of 20 when going from B to A then an alternative embodiment is useful to help the core form in a single location in the network.

In an earlier embodiment the nodes agree on the link cost for a particular link and used their 'Best Neighbour' selection based on this shared link cost.

If asymmetric link costs are used to determine the 'Best Neighbour', then using symmetric link costs can be used to choose the next step to the core. Using symmetric link costs can help ensure that a core actually forms.

For each node that a node knows about it will decide which link is its next best step to reach that node. It chooses this next best step based on cumulative link cost, and perhaps a tie-breaker number. This 'Best Neighbour' is then given a credit that will be summed with the other credits assigned to it. The 'Best Neighbour' with the most credit will be picked as the next best step to the core.

In this alternative embodiment a node will agree with the node it is linked to on an alternative cost for the link. This alternative link cost will be the same for both nodes. This alternative link cost will be used to adjust the cumulative link cost. A choice for 'Best Neighbour' will be made with this alternative cumulative link cost. This 'Best Neighbour' will be assigned the credit that goes towards picking it as the next best step to the core, even if it was the not 'Best Neighbour' picked as the next best step to the actual node.

This equation describes how the alternative cumulative link cost can be calculated.

AlternativeCumulativeLinkCost=ActualCumulativeLinkCost+
(AlternativeLinkCost−ActualLinkCost)

High Speed Propagation Path(s) ("HSPP")

Since nodes not at the core of the network will generally not have as much memory as nodes at the core, they may forget about a node N that relies on them to allow others to connect to node N. If these nodes did forget, no other node in the network would be able to connect to that node N.

In the same way, a node that is looking to establish a connection with a node Q faces the same problem. The knowledge of node Q that it is looking for won't reach it fast enough—or maybe not at all if either node Q or the node that is trying to connect to it is surrounded by low capacity nodes.

An approach is to use the implicit hierarchy created by each nodes choice as to its 'next best step to the core'. Node knowledge is pushed up and down this hierarchy to the core. This allows efficient transfer of node knowledge to and from the center of the network.

Node knowledge can be pushed/pulled using a methodology referred to herein as a High Speed Propagation Path ("HSPP"). An HSPP can be thought of as a marked path/paths between a node and the core. Once that path has been set up it is maintained until the node that created it has been removed.

There are two types of HSPP's. the first is a notify HSPP. The Notify HSPP pulls knowledge of a particular node towards the core. Nodes that have an HSPP running through them are not allowed to forget about that node that is associated with the HSPP. All nodes create a Notify HSPP to drive knowledge of themselves towards the core.

A request HSPP is only created when node is looking for knowledge of another node. The request HSPP operates in the identical way to the notify HSPP except that instead of pulling knowledge towards to the core it pulls knowledge back to the node that created it.

(Persons skilled in the art will appreciate that, in the context of an HSPP, the terms "push" and "pull" are useful for illustrative purposes, but can be viewed as somewhat artificial terms, since in effect, an HSPP improves the 'rank' of a node in a node database so that knowledge of that node is sent before the knowledge of other nodes.)

An HSPP travels to the core using each nodes next best step the core. Each nodes 'next best step to the core' creates an implicit hierarchy.

An HSPP is not a path for user messages itself, rather it forces nodes on the path to retain knowledge of the node or nodes in question, and send knowledge of that node or nodes quickly along the HSPP. It also raises the priority of updates for the node names associated with the HSPP. This has the effect of sending route update quickly towards the top of this implicit hierarchy.

The HSPP does not specify where user data messages flow. The HSPP is only there to guarantee that there is always at least one path to the core, and to help nodes form an initial connection to each other. Once an initial connection has been formed, nodes no longer need to use the HSPP.

An HSPP may be referenced as belonging to one node name, or being associated with one node name. This in no way limits the number, or type of nodes that an HSPP may be associated with. In this embodiment the name of the HSPP is the usually the name of the node that the HSPP will be pushing/pulling to/from the core.

An HSPP is tied to a particular node name or class/group of node names. If a node hosts an HSPP for a particular destination node it will immediately process and send node knowledge of any nodes that are referenced by that HSPP.

Node knowledge in the case can be viewed as a sNode-Knowledge update (for example).

An alternative embodiment could limit that processing to:
1. Initial knowledge of the destination node
2. When the destination node fCumulativeLinkCost goes to infinity
3. When the destination node fCumulativeLinkCost moves from infinity to some other value This can ensure that all nodes in the HSPP will always know about the nodes referenced by the HSPP if any one of those nodes can 'see' the node or nodes referenced by the HSPP.

Node knowledge is not contained in the HSPP. The HSPP only sets up a path with a very high priority for knowledge of a particular node or nodes. This means that node updates for those nodes referenced by the HSPP will be immediately sent.

An HSPP is typically considered a bi-direction path.

Alternative embodiments can have two types of types of HSPP's. One type pushes knowledge of a node towards the core. This type of HSPP could be called a notify HSPP. The second pulls knowledge of a node towards the node that created the HSPP. This type of HSPP could be called a request HSPP.

When a node is first connected to the network, it can create an HSPP based on its node name. This HSPP will push knowledge of this newly created node towards the core of the network. The HSPP created by this node can be maintained for the life of the node, or for as long as the node wants to maintain the HSPP. If the node is disconnected or the node decides to no longer maintain the HSPP, then it will be removed. An alternative embodiment could have this HSPP be a 'push HSPP' instead of a bi-directional HSPP.

If a node is trying to connect to another node N, it will create an HSPP that references that node N. This HSPP will travel to the core and help pull back knowledge of node N to the node that created the HSPP and wants to connect to node N. An alternative embodiment could have this HSPP be a 'pull HSPP' instead of a bi-directional HSPP.

If the node no longer wants to maintain an HSPP (perhaps because the connection to node N is no longer needed) it can send an HSPP update with 'bActive'=false to all the directly connected nodes that it sent the original HSPP with bActive=true. This should only be done by the node that has created the HSPP.

Alternative embodiments could allow the request HSPP to be maintained by the node that generated the request HSPP after the connection has been dropped for some amount of time, in order to facilitate faster re-connects.

Both types of HSPP will travel to the core. The HSPP that sends knowledge of a node to the core can be maintained for the life of the node. The request HSPP will probably be maintained for the life of the connection.

An alternative embodiment has nodes that create an HSPP send that HSPP to all directly connected nodes, instead of only to their next best step to the core of the network. This embodiment allows the network to be more robust while moving and shifting.

An alternative embodiment includes making sure that a node will not send a directly connected node more HSPP's then the maximum nodes requested by that directly connected node.

An HSPP does not specify where user data should flow, it only helps to establish a connection (possibly non-optimal) between nodes, or one node and the core.

An HSPP will travel to the core even if it encounters node knowledge before it reaches the core. Alternative embodiments can have the HSPP stop before it reaches the core.

How an HSPP is Established and Maintained

If a node is told of an HSPP it remembers that HSPP until it is told to forget that about that HSPP, or the connection between it and the node that told it of that HSPP is broken.

In an embodiment where a node limits the number of nodes it wants to be told about, that node stores as many HSPP's as are given to it. A node should not send more HSPP's to a directly connected node then the maximum destination node count that directly connected node requested.

In certain systems the amount of memory available on nodes will be such that it can assumed that there is enough memory, and that no matter how many HSPP's pass through a node it will be able to store them all. This is even more likely because the number of HSPP's on a node will be roughly related to how close this node is to the core, and a node is usually not close to a core unless it has lots of capacity, and therefore probably lots of memory.

UR=Ultimate Receiver Node
US=Ultimate Sender Node

An HSPP takes the form of:

```
struct sHSPP {
    // The name of the node could be replaced with a number
    // (discussed later). It may also represent a class of nodes
    // or node name.
    sNodeName    nnName;
    // a boolean to tell the node if the HSPP is being
    // activated or removed.
    bool                    bActive;
    // a boolean to decide if this a UR (or US generated HSPP)
    bool                    bURGenerated;
};
```

In these descriptions an HSPP H is considered to be called HSPP H regardless of what bActive or bURGenerated (more generally the HSPP Type) are. The HSPP H can derive its name from the node name that it represents.

An alternative embodiment might be where the name of HSPP H is not linked to the node name (or names) it references. The HSPP structure in this embodiment might look like this (for example):

```
struct sAlternateHSPP {
    // a unique name to represent this HSPP
    sHSPPName    HSPPName;
    // The name of the node could be replaced with a number
    // (discussed later). It may also represent a class of nodes
    // or node name.
    sNodeName    nnName;
    // a boolean to tell the node if the HSPP is being
    // activated or removed.
    bool                    bActive;
    // a boolean to decide if this a UR (or US generated HSPP)
    bool                    bURGenerated;
};
```

The following description uses sHSPP (as oppose to sAlternateHSPP) in order to describe how HSPP's work. This should not be seen as limiting the generality of the method.

A UR generated HSPP can also be called a 'Notify HSPP' and a US generated HSPP can also be called a 'Request HSPP'.

It is important that the HSPP does not loop back on itself, even if the HSPP's path is changed or broken. This should be guaranteed by the process in which the next step to the core of the network is generated.

A node should never send an active HSPP H (bActive=true) to a node that has sent it an active HSPP H. A node will record the number of directly connected nodes that tell it to maintain the HSPP H (bActive is set to true in the structure). If this count drops to zero it will tell its directly connected nodes that were sent an active HSPP H (bActive=true), an inactive HSPP H (bActive=false).

At a broad level the HSPP finds a non-looping path to the core, and when it reaches the core it stops spreading. It does this because the two nodes that form the core will select each other as their next best step towards the core. And since an active HSPP will not be sent to a node that has already sent it an active HSPP the HSPP will only be sent by one node of the two node core.

If the HSPP path is cut, the HSPP from the cut to the core will be removed. It will be removed because the only node that told it an active HSPP will be removed. This will prompt the node on the core side of the cut to tell those nodes that it told an active HSPP H an inactive HSPP H. In most cases this process will cascade towards the core removing that active HSPP.

An HSPP will travel to the core using each nodes next best step to the core.

The purpose of the HSPP generated by the UR is to maintain a path between it and the core at all times, so that all nodes in the system can find it by sending a US generated HSPP (a request HSPP) to the core.

If a node N receives an active HSPP H from any of its directly connected nodes, it will send on an active HSPP H to the node (or nodes) selected as its next best step to the core, assuming that that node (or nodes) that has been selected as its next best step to the core has not sent it an active HSPP H.

If multiple active HSPPs H arrive at the same node, that node will send on an HSPP with bURGenerated marked as true, if any of the incoming HSPP's have their bURGenerated marked as true.

If the directly connected node that was selected as the next best step to the core changes from node A to node B, then all the HSPP's that were sent to node A will be sent to node B instead (assuming that the next 'best step to the core' has not sent this node an active HSPP of the same name already). Those HSPP's that were sent to node A will have an HSPP update sent to node A with their 'bActive' values set to false, and the ones sent to node B will have their 'bActive' values set to true.

An alternative embodiment is if node A creates an HSPP it should send the HSPP to all directly connected nodes. This ensures that even if this node is moving rapidly, that knowledge is always driven to or from the core.

When a node A establishes a connection to another node B, Node A can use an HSPP to pull route information for node B to itself (called a request HSPP). This HSPP should also be sent to all directly connected nodes.

An alternative embodiment has only one type of HSPP that moves data bi-directionally. This type of HSPP would be able to replace both a push/notify HSPP and a pull/request HSPP. In this embodiment that bURGenerated parameter is omitted.

An HSPP does not need to be continually resent. Once an HSPP has been established in a static network, no addition HSPP messages need to be sent. This will be apparent to someone skilled in the art.

Each node remembers which directly connected nodes have told it about which HSPP's, a node also typically remembers which HSPPs it has told to directly connected nodes.

Alternative HSPP Types

This alternative embodiment can help maintain connection in a low bandwidth environment.

In the previous embodiment there are two types of HSPP:
1. Notify HSPP
2. Request HSPP This embodiment will introduce a new type of HSPP called a 'Priority Notify HSPP'.

The 'Priority Notify HSPP' is the same as 'notify HSPP' except that it will be sent before all 'Notify HSPP's'. This will be discussed later.

For example, if a node is attempting to communicate with another node, or is aware that another node is attempting to communicate with it, then it can change its notify HSPP's into 'Priority Notify HSPP's'.

The following table describes what type of HSPP a node will send to its next best step to the core, given the types of HSPP's it receives for a particular destination node.

| HSPP's In | HSPP Out |
| --- | --- |
| Request HSPP | Request HSPP |
| Notify HSPP | Notify HSPP |
| Priority HSPP | Priority Notify HSPP |
| Request HSPP + Notify HSPP | Notify HSPP |
| Request HSPP + Priority Notify HSPP | Priority Notify HSPP |
| Request HSPP + Notify HSPP + Priority Notify HSPP | Priority Notify HSPP |
| Notify HSPP + Priority Notify HSPP | Priority Notify HSPP |

If the entries that contain 'Priority Notify HSPP' are ignored, this will also describe how the other embodiment decides which HSPP type to send to its next best step to the core.

The HSPP structure might be amended to look like this:

```
struct sHSPP {
    // The name of the node could be replaced with a number
    // (discussed previously)
    sNodeName    nnName;
    // a boolean to tell the node if the HSPP is being
    // activated or removed.
    bool                    bActive;
    // the HSPP Type (for ex: Request HSPP, Notify HSPP,
    // Priority Notify HSPP)
    int                     nHSPPType;
};
```

Ordering HSPP's to be Sent

An alternative embodiment adjusts the order that HSPP's are sent.

When a node receives an HSPP it will need to order it before sending. This will ensure that a more important HSPP's are sent first.

The order that HSPP's should be sent if the 'Priority Notify HSPP' embodiment is not used is:
1. Request HSPP
2. Notify HSPP If the 'Priority Notify HSPP' embodiment is used then the order is this:
1. Request HSPP and Priority Notify HSPP
2. Notify HSPP Removing Simple Loops This alternative embodiment can be used to stop simple loops from forming.

Someone skilled in the art will recognize the variations on the 'poison reverse'.

A node A that has picked node B as a 'Best Neighbour' for messages going to node N then node A will tell node B that it has been picked.

For example, node A could send node B a message that looks like this:

```
struct sIsBestNeighbour {
    Name       NodeName;
    Boolean    bIsBestNeighbour;
}
```

If node A has told node B that it is the 'Best Neighbour' for messages going to node N then node B will be unable to pick node A as the 'Best Neighbour' for messages going to node N.

If the only possible choice node B has for messages going to node N is node A then B will select no 'Best Neighbour' and set its cumulative link cost to node N to infinity.

Marking Nodes as in the Data Stream

This alternative embodiment can be used to mark those nodes that are in the data stream.

In this embodiment a node is only considered as 'in the data stream' if it is marked as 'in the data stream'. A node may forward payload packets without being marked in the data stream. If a node is forwarding payload packets, but is not marked in the data stream it is not considered as 'in the data stream'.

If a node A has attempted to establish a data connection to another node N in the network it will tell the node B that it has selected as its 'Best Neighbour' to node N that node B is a 'Best Neighbour' for node N and it is in the data stream for node N.

If a node B has been told that it is in the data stream by a directly connected node that has told B that it is a 'Best Neighbour' then node B will tell the directly connected node C that it has selected as a 'Best Neighbour' for node N that node C is in the data stream.

As an example the structure of this message might look like this:

```
struct sInTheDataStream {
    Name        NodeName;
    Boolean     bIsInTheDataStream;
}
```

If node B was marked as in the data stream for messages going to node N it would tell the node that it has selected as its next best step to node N that it is in the data stream. If node B is no longer marked as in the data stream because:

1. The directly connected node (or nodes) that had told node B that it was in the data stream disconnected.
2. The directly connected node (or nodes) that told node B that it was in the data stream all told node B that it was no longer in the data stream.

Then node B will tell its 'Best Neighbour' C. that it is no longer in the data stream.

A node is only marked as being the data stream by this flag. A node may forward message packets without being marked as in the data stream.

Link Cost from Stream

The term 'link cost from stream' is sometimes referred to herein as 'hop cost from flow'.

This alternative embodiment can be used to order the node updates in a network. This ordering allows the network to become much more efficient by sending updates to maintain and converge data flows before other updates.

The sNodeKnowledge structure used to pass node knowledge around might be modified to look like this: (for example)

```
struct sNodeKnowledge {
    Name    NameOfTheNode;
    Float   fCumulativeLinkCost;
    Float   fCumulativeLinkCostFromStream;
}
```

The fCumulativeLinkCostFromStream is incremented in the same way as the fCumulativeLinkCost. However, if a node is in the data stream for a particular node it will reset the fCumulativeLinkCostFromStream to 0 before sending the update to its directly connected nodes.

Just as the fCumulativeLinkCost is initialized to zero the fCumulativeLinkCostFromStream is also initialized to zero.

An alternative embodiment could have the fCumulativeLinkCostFromStream reset for other reasons as well such as user data messages being passed through that node. Someone skilled in the art will recognize such variations.

An alternative embodiment to help in low bandwidth environments is to have nodes set their fCumulativeLinkCostFromStream to a non-zero value (for example 50) if they are not exchanging user data with another node. If they are in communication with another node they would set their fCumulativeLinkCostFromStream to 0. An alternative embodiment could also set a non-zero fCumulativeLinkCostFromStream to a multiple of the min, max, average (etc) of the link costs associated with the links that this node has established.

If the fCumulativeLinkCost goes to infinity, then keep the last non-infinity fCumulativeLinkCostFromStream value. This will be used to order when to send the infinity update to directly connected nodes.

Alternative Link Cost from Stream

This embodiment is similar to the previous embodiment, except that it is more useful in helping the network remove node knowledge.

In the previous embodiment the fCumulativeLinkCostFromStream got reset to zero when it came across a node that was marked as in the data stream. This embodiment changes what type of update will be sent.

If a node A that created the destination node E (this could also be described as a node A that created a node name E for use by node A) is told by a directly connected node B that it is in the data stream for node E then node A will tell that directly connected node B a node update for node E where the fCumulativeLinkCostFromStream=fCumulativeLinkCost. In most cases this will have both these values set to zero since node A has created the name E.

All other directly connected nodes that have not told node A that it is in the data stream will be told a fCumulativeLinkCostFromStream != fCumulativeLinkCost. For example:

$$fCumulativeLinkCostFromStream = fCumulativeLinkCost + 0.1f;$$

Since fCumulativeLinkCost is usually zero these directly connect nodes would be told a fCumulativeLinkCostFromStream of 0.1 and a fCumulativeLinkCost of 0. 0.1 should be viewed as exemplar only.

If a node that is not the node that created the destination node name (in this example it would be any node except node A) is marked as 'in the data stream' and has a fCumulativeLinkCostFromStream==fCumulativeLinkCost then it will tell all its directly connect nodes that have not marked it in the data steam an update for node E with the fCumulativeLinkCostFromStream==0. For those nodes that have marked it as in the data stream it will tell them an update for node E with fCumulativeLinkCostFromStream==fCumulativeLinkCost.

At no point in this embodiment is the fCumulativeLinkCost adjusted to match fCumulativeLinkCostFromStream. The fCumulativeLinkCostFromStream is always adjusted relative to the fCumulativeLinkCost.

Ordering of Node Updates

In a large network there can be a lot of node updates to send. This alternative embodiment allows updates be ordered by how important they are.

This alternative embodiment assumes that fCumulativeLinkCostFromStream is used and that HSPP's are used. If only one of them are used then just ignore the ordering that un-used embodiment would provide.

All nodes in the system are ordered by the fCumulativeLinkCostFromStream value that was sent to it by the selected 'Best Neighbour' (the link cost for the connection was added to the value sent by the directly connected node). This ordered list could take the form of a TreeMap (in the example of Java).

If the previous embodiment is used then when fCumulativeLinkCost=fCumulativeLinkCostFromStream and a node is marked in the data stream then it should be added to the treemap as if it had a fCumulativeLinkCostFromStream of 0.

When an update to a destination node route needs to be sent to a directly connected node this destination node is placed in a TreeMap that is maintained for each directly connected node. The TreeMap is a data structure that allows items to be removed from in by ascending key order. This allows more important updates to be sent to the directly connected node before less important updates.

The destination nodes placed in this TreeMap are ordered by their fCumulativeLinkCostFromStream values, except in the case where:
1. This node is in the path of an HSPP for this destination node, and this directly connected node is:
   a. In the path to the core and the HSPP is a notify HSPP or if there is only one type of HSPP
   b. One of the nodes that told us of this HSPP and the HSPP is a request HSPP or there is only one type of HSPP.
2. This node is in the data stream for this destination node. (bIsInTheDataStream==true and fCumulativeLinkCost= fCumulativeLinkCostFromStream)

If the destination node belongs to one of these two groups, the item is placed at the start of the ordered update list maintained for each directly connected node. Exemplar pseudo code for this process looks like this:

```
float fTempCumLinkCostFStream = GetCumLinkCostFStream
    (NodeToUpdate);
if (NodeToUpdate for this connection belongs to group 1 or 2)
    fTempCumLinkCostFStream = 0;
while (CurrrentConnection.OrderedUpdateTreeMap contains
    fTempCumLinkCostFStream as a key)
{
    IncrementfTempCumLinkCostFStream by a small amount
}
Add pair (fTempCumLinkCostFStream, NodeToUpdate) to
    CurrrentConnection.OrderedUpdateTreeMap;
```

The destination node route updates are then sent in this order. When a destination update has been processed it is removed from this ordered list (CurrentConnection.OrderedUpdateTreeMap) This ordering insures that more important updates are sent before less important updates.

The fTempCumLinkCostFStream should also be used on a per connection basis to determine which destination node updates should be sent. For example, if there are five destination nodes with fTempCumLinkCostFStream values of:
1.202—dest node D
1.341—dest node F
3.981—dest node G
8.192—dest node B
9.084—dest node M
And the directly connected node has requested a maximum of four destination node routes sent to it, This node will only send the first four in this list (the node will not send the update for destination node M).

If destination node G has its fTempCumLinkCostFStream change from 3.981 to 12.231 the new list would look like this:
1.202—dest node D
1.341—dest node F
8.192—dest node B
9.084—dest node M
12.231—dest node G In response this update this node would schedule an update for both destination node G and destination node M. The ordered pairs in CurrentConnection.OrderedUpdateTreeMap (assuming no HSPP's or Data Streams) would looks this:
Position 1-(9.084,M)
Position 2-(12.231,G)

This node would then send an infinity update for node G. It would then schedule a delayed send for destination node M. (See 'Delayed Sending')

An infinity destination node update makes sure that the messages needed to pass this information is sent for the node that is getting an infinity update. This example includes several different embodiments, for those that are not used someone skilled in the art will be able to omit the relevant item(s).

| | |
|---|---|
| a. fCumulativeLinkCost | = INFINITY |
| b. fCumulativeLinkCostFromStream | = INFINITY |
| c. bIsBestNeighbour | = FALSE |
| d. bIsInDataStream | = FALSE |

When the update for destination node M is sent, it would be non-infinity.

Delayed Sending

This alternative embodiment helps node knowledge to be removed from the network when a node is removed from the network.

If node knowledge is not removed from the network, then a proper hierarchy and core will have trouble forming.

If this is the first time that a destination node update is being sent to a directly connected node, or the last update that was sent to this directly connected node had a fCumulativeLinkCost of infinity, the update should be delayed.

For example, if the connection has a latency of 10 ms, the update should be delayed by (Latency+1)*2 ms, or in this example 22 ms. This latency should also exceed a multiple of the delay between control packet updates (see 'Propagation Priorities)

Someone skilled in the art will be able to experiment and find good delay values for their application.

The exception is if either of these conditions are met:
1. This node is in the path of an HSPP for this destination node, and this directly connected node is:
   a. In the path to the core and the HSPP is a notify HSPP or there is only one type of HSPP.
   b. One of the nodes that told us of this HSPP and the HSPP is a request HSPP or there is only one type of HSPP.
2. This node is in the data stream for this destination node. (bIsInTheDataStream==true and fCumulativeLinkCost== fCumulativeLinkCostFromStream)

If an infinity update has been scheduled to be sent (by having it placed in the CurrentConnection.OrderedUpdateTreeMap), but has not been sent by the time a non-infinity update is scheduled to be sent (because it has been delayed), the infinity must be sent first, and then a non-infinity update should be delayed again before being sent.

Cycling a Destination Node from Infinity to Non-Infinity

This alternative embodiment helps node knowledge to be removed from the network when a node is removed from the network.

If any of these criteria are met for a node A update being sent to a directly connected node N:
1. If the alternative embodiment that limits the number of node updates that can be sent to a node is used:
    If the directly connected node N has been sent a non-infinity update for this destination node A, however the new fTempCumLinkCostFStream value (see above) for node A is greater then X other nodes' fTempCumLinkCostFStream value. Where X is the maximum number of nodes that the directly connected node N requested to be told about.
2. If the fTempCumLinkCostFStream for node A becomes the larger that any other nodes' fTempCumLinkCostFStream that was sent to this directly connected node N.

This node will send the directly connected node N an update of infinity for this destination node A. Then after a suitable delay (See Delayed Sending) this node will send a non-infinity update for this destination node to the directly connected node, except in the case where this node A still meets criteria 1.

This is part of the approach uses to help remove bad route data from the network, and automatically remove loops.

An infinity update is an update with the fCumulativeLinkCost value set to infinity (see above for a more complete definition).

The decision to send an infinity update (followed some time later with a non-infinity update for same destination node) when a destination node meets the previous criteria is a recommended approach. Alternative approaches to trigger the infinity update followed by the delayed non-infinity update are (but not limited to):
1. When the fTempCumLinkCostFStream increases by a certain percent, or amount in a specific period of time. For example, if the fTempCumLinkCostFStream increased by more then 10 times the connection cost in under 0.5 s.
2. When the position of this destination node in the ordered list moves more then (for example) 100 positions in the list, or moves more then (for example) 10% of the list in X seconds.

Persons skilled in the art can determine a suitable increase in fTempCumLinkCostFStream and suitable timing values in order to trigger the infinity/non-infinity send.

An alternative embodiment could use fCumulativeLinkCostFromStream instead of fTempCumLinkCostFStream.

If a previously unknown destination node appears at the top of the list, the infinity does not need to be sent because the directly connected nodes have not been told a non-infinity update before. However, telling the directly connected nodes about this destination node should be delayed.

This delayed sending does not need to occur if either on these conditions is met:
1. This node is in the path of an HSPP for this destination node, and this directly connected node is:
    c. In the path to the core and the HSPP is a notify HSPP or there is only one type of HSPP.
    d. One of the nodes that told us of this HSPP and the HSPP is a request HSPP or there is only one type of HSPP.
2. This node is in the data stream for this destination node. (bIsInTheDataStream==true and fCumulativeLinkCost== fCumulativeLinkCostFromStream)

End User Software

This network system and method can be used to emulate most other network protocols, or as a base for an entirely new network protocol.

It can also serve as a replacement for the 'routing brains' of other protocols.

In this document TCP/IP will be used as an example of a protocol that can be emulated. The use of TCP/IP as an example is not meant to limit the application of this invention to TCP/IP.

In TCP/IP when a node is turned on, it does not announce its presence to the network. It does not need to because the name of the node (IP address) determines its location. In the present invention, the node needs the network to know that it exists, and provide the network with a guaranteed path to itself. This is discussed in much greater detail elsewhere.

When end user software ("EUS") wishes to establish a connection, it could do so in a manner very similar to TCP/IP. In TCP/IP the connection code looks similar to this:
SOCKET sNewSocket=Connect(IP Address, port);
With this invention, the 'IP Address' is replaced with a Globally Unique Identifier ("GUID").
SOCKET sNewSocket=Connect(GUID, port).
In fact, if the IP Address can be guaranteed to be unique, then the IP address could serve as the GUID, providing a seamless replacement of an existing TCP/IP network stack with this new network invention.

One way to guarantee a unique IP is to have each node create a random GUID and then use that to communicate with a DHCP (Dynamic Host Configuration Protocol) like server to request a unique IP address that can be used as a GUID. The node would then discard its first GUID name and use only this IP address as a GUID. Using IP addresses in this context would mean that IP addresses would not necessarily need to reflect a nodes position in the network hierarchy.

Once a connection to a destination node has been requested, the network will determine a route to the destination (if such a route exists), and continually improve the route until an optimal route has been found.

The receiving end will look identical to TCP/IP, except a request to determine the IP address of the connecting node will yield a GUID instead. (or an IP address is those are being used as GUIDs).

This approach provides the routing through the network, someone skilled in the art could see how different flow control approaches might work better in different networks. For example, a wireless network might need an approach that does not lose packets when incoming data rates exceed outgoing connection rates.

Figure 28:
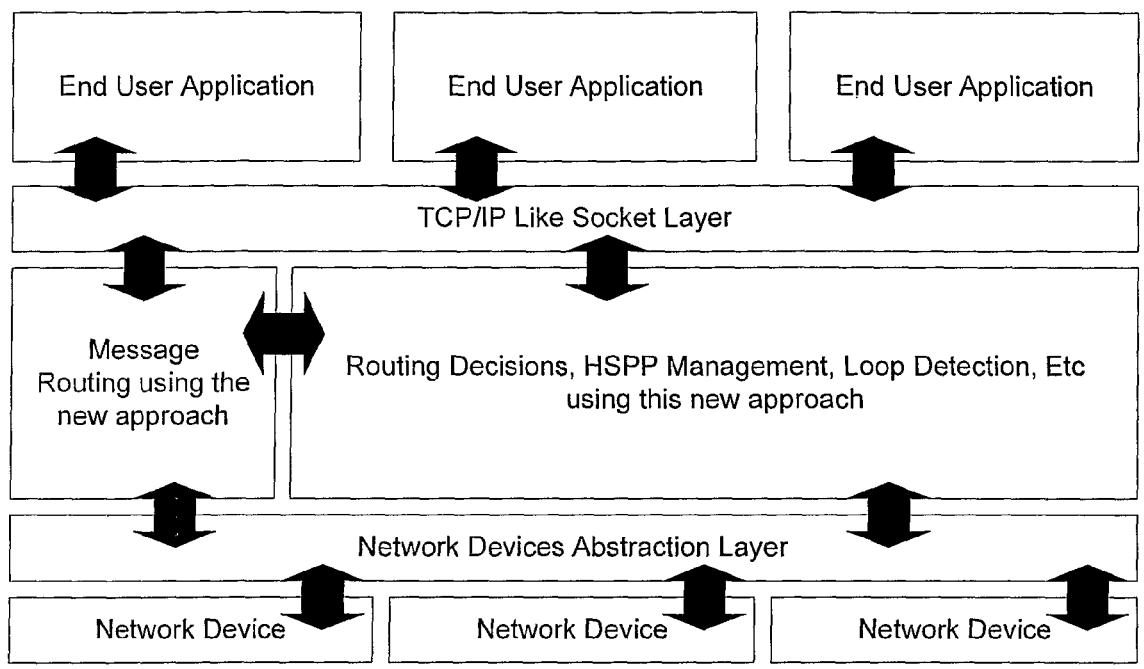
FIG. 28 shows a flow-chart depicting a method for routing through a network using TCP/IP as an example of a protocol that can be emulated, in accordance with an embodiment of the invention.

FIG. 28 is an example of where this routing method would fit into the TCP/IP example.

Persons skilled in the art will appreciate that this new routing approach allows a TCP/IP like interface for end user applications. This is an example not meant to limit this routing approach to any particular interface (TCP/IP for example) or application.

Connecting Two Nodes Across the Network

The following is an example of one approach that can be used to connect two nodes in this network. This example (like all examples in this document) is not meant to limit the scope of the patent. Someone skilled in the art would be aware of many variations.

If the alternative embodiment that uses HSPP's is not used then ignore the parts about HSPP's.

If node A wishes to establish a connection with node B, it will first send out a request HSPP (discussed earlier) to all directly connected nodes. This request HSPP will draw and maintain route information about node B to node A. This request HSPP will be sent out even if node A already has knowledge of nod B.

If the alternative embodiment that uses 'priority notify hspp' is used then node A can change its notify hspp to a priority notify hspp and inform all its directly connected nodes. This can help connectivity in low bandwidth mobile environments since it would allow nodes that are communicating to have their information spread before those nodes that are not communicating.

This HSPP will travel to the core even if it encounters node route knowledge before reaching the core.

Once Node A has a non-infinity, next best step to node B it will send out a 'connection request message' to the specified port on node B. This request will be sent to the directly connected node that has been selected as the 'Best Neighbour' for messages going to node B.

If the 'marking the data stream' embodiment is used then node A will tell its directly connect node that it has selected as a 'Best Neighbour' that it is in the data stream for node B.

The use of ports is for example only and is not meant to limit the scope of this invention. A possible alternative could be a new node name specifically for incoming connections. Someone skilled in the art would be aware of variations.

It will keep sending this message every X seconds (for example 15 seconds), until a sConnectionAccept message has been received, or a timeout has been reached without reception (for example 120 seconds). The connection request message might contain the GUID of node A, and what port to send the connection reply message to. It may also contain a nUniqueRequestID that is used to allow node B to detect and ignore duplicate requests from node A.

The connection request message looks like this (for example):

```
struct sConnectionRequest {
    // the name of node A, could be replaced with a number
    // for reduced overhead.
    sNodeName           nnNameA;
    // Which port on node A to reply to
    int                 nSystemDataPort;
    // Which port to send end user messages to on node A
    int                 nUserDataPort;
    // a unique request id that node B can use to
    // decide which duplicate requests to ignore
    int                 nUniqueRequestID;
}
```

When node B receives the 'connection request' message from node A it will generate a request HSPP for node A and send it to all directly connected nodes. This will draw and maintain route information about node A to node B.

If the alternative embodiment that uses 'priority notify hspp' is used then node B can change its notify HSPP to a priority notify HSPP and inform all its directly connected nodes. This can help connectivity in low bandwidth mobile environments.

If the alternative embodiment 'in the data stream' is used then Node B will wait until it sees where its next best step to node A is, and then mark the route to node A as 'In the data stream'.

Node B will then send a sConnectionAccept message to node A on the port specified (sConnectionRequest.nSystemDataPort). This message looks like this:

```
struct sConnectionAccept {
    // the name of node B
    sNodeName           nnNameB;
    // the port for user data on node B
    int                 nUserDataPortB;
    // the unique request ID provided by A in the
    // sConnectionRequest message
    int                 nUniqueRequestID;
}
```

The sConnectionAccept message will be sent until node A sends a sConnectionConfirmed message that is received by node B, or a timeout occurs.

The sConnectionConfirmed message looks like this:

```
struct sConnectionConfirmed {
    // the name of node A, could be replaced with a number
    // for reduced overhead.
    sNodeName           nnNameA;
    // the unique request ID provided by A in the
    // sConnectionRequest message
    int                 nUniqueRequestID;
}
```

If a timeout occurs during the process the connection is deemed to have failed and will be dismantled. The request HSPP's that both nodes have generated will be removed, and the 'in the data stream' flag(s) will be removed (if they were added).

Once the connection is established, both nodes may send user data messages to each others respective ports. These messages would then be routed to the end user software via sockets (in the case of TCP/IP).

An alternative embodiment would not require a connection to be established, just the sending of EUS messages/payload packets when route to the destination node was located.

Node Name Optimization and Messages

This alternative embodiment can be used to optimize messages and name passing.

Every node update and EUS message/payload packet needs to have a way to identify which destination node they reference. Node names and GUIDSs can easily be long, and inefficient to send with every message and node update. Nodes can make these sends more efficient by using numbers to represent long names.

For example, if node A wants to tell node B about a destination node named 'THISISALONGNODENAME.GUID', it could first tell node B that:
1='THISISALONGNODENAME.GUID'
A structure for this could look like (for example):

```
struct sCreateQNameMapping {
    // size of the name for the node
    int                 nNameSize;
    //name of the node
    char                cNodeName[Size];
    // the number that will represent this node name
    int                 nMappedNumber;
};
```

Then instead of sending the long node name each time it wants to send a destination node update, or message—it can send a number that represents that node name (sCreateQNameMapping.nMappedNumber). When node A decides it no longer wants to tell node B about the destination node called 'THISISALONGNODENAME.GUID', it could tell B to forget about the mapping.

That structure would look like:

```
struct sRemoveQNameMapping {
    int         nMappedNumber;
};
```

Each node would maintain its own internal mapping of what names mapped to which numbers. It would also keep a translation table so that it could convert a name from a directly connected node to its own naming scheme. For example, a node A might use:
1='THISISALONGNODENAME.GUID'
And node B would use:
632='THISISALONGNODENAME.GUID'

Thus node B, would have a mapping that would allow it to convert node A's numbering scheme to a numbering scheme that makes sense for node B. In this example it would be:

| Node A | Node B |
|--------|--------|
| 1      | 632    |
| ...    | ...    |
| ...    | ...    |

Using this numbering scheme also allows messages to be easily tagged as to which destination node they are destined for. For example, if the system had a message of 100 bytes, it would reserve the first four bytes to store the destination node name the message is being sent to, followed by the message. This would make the total message size 104 bytes. An example of this structure also includes the size of the message:

```
struct sMessage {
    // the number that maps to the name of the node where
    // this message is being sent to
    int                 uiNodeID;
    // the size of the payload packet
    int                 uiMsgSize;
    // the actual payload packet
    char                cMsg[uiMsgSize];
}
```

When this message is received by a node, that node would refer to its translation table and convert the destination mapping number to its own mapping number. It can then use this mapping number to decide if this node is the destination for the payload packet, or if it needs to send this payload packet to another directly connected node.

These quick destination numbers could be placed in a TCP/IP header by someone skilled in the art.

When to Remove Name Mapping

This alternative embodiment is used to help remove name mappings that are no longer needed.

If a destination node has a fCumulativeLinkCost of infinity continuously for more then X ms (for example 5000 ms) and it has sent this update to all directly connected nodes, then this node will remove knowledge of this destination node.

First it will release all the memory associated with this destination node, and the updates that were provided to it by the directly connected node. It will also remove any messages that this node has waiting to send to that destination node.

Next it will tell its directly connected nodes to forget the number->name mapping for this destination node.

Once all of the directly connected nodes tell this node that it too can forget about their number->name mappings for this destination node, then this node can remove its own number->name mapping.

At this stage there is no longer any memory associated with this destination node.

A node should attempt to reuse forgotten internal node numbers before using new numbers.

Simpler Fast Routing

This alternative embodiment is used to speed up the routing of packets.

An optimization would be add another column to the name mapping table indicating which directly connected node will be receiving the message:

Thus node B, would have a mapping that would allow it to convert node A's numbering scheme to a numbering scheme that makes sense for node B. In this example it would be:

| Node A | Node B | Directly Connected Node Message is Being Sent To |
|--------|--------|--------------------------------------------------|
| 1      | 632    | 7                                                |
| ...    | ...    |                                                  |
| ...    | ...    |                                                  |

This allows the entire routing process to be one array lookup. If node A sent a message to node B with a destination node 1, the routing process would look like this:
1. Node B create a pointer to the mapping in question: sMapping*pMap=&NodeMapping[pMessage->uiNodeID];
2. Node B will now convert the name: pMessage->uiNodeID=pMap->uiNodeBName;
3. And then route the message to the specified directly connected node: RouteMessage(pMessage,pMap->uiDirectlyConnectedNodeID);

For this scheme to work correctly, if a node decides to change which directly connected node it will route messages to a directly connected node, it will need to update these routing tables for all directly connected nodes.

If the directly connected nodes reuse internal node numbers, and the number of destination nodes that these nodes know about are less the amount of memory available for storing these node numbers. Then the node can use array lookups for sending messages.

This will provide the node with O(1) message routing (see above). If the node numbers provided by the directly connection nodes exceed size of memory available for the lookup arrays (but the total node count still fits in memory), the node could shift from using an array lookup to using a hashmap lookup.

More Complex Fast Routing

This alternative embodiment helps ensure that O(1) routing can be used and avoids the use of a hash map.

In order to ensure that nodes can always perform the fast O(1) array lookup routing, a node could provide each directly connected node with a unique node number-name mappings. This will ensure that the directly connected node won't need to resort to using a hash table to perform message routing (see above)

When generating these unique number->name mappings for the directly connected node, this node would make sure to re-use all numbers possible.

By reusing these numbers, it ensures that the highest number used in the mappings should never greatly exceed the maximum number of destination node updates requested by that directly connected node.

For each connection the node will need to create an array of integers, where the offset corresponds to the nodes own internal node ID, and the number stored at that offset is the unique number->name mapping used to for that directly connected node.

The fast routing would then look like this (see above):
1. Node B create a pointer to the mapping in question: sMapping*pMap=&NodeMapping[pMessage->uiNodeID];
2. Node B will now convert the name: pMessage->uiNodeID=pMap->uiNodeBName;
3. And then route the message to the specified directly connected node: RouteMessage(pMessage,pMap->uiDirectlyConnectedNodeID;
4. Before sending, the name will get changed one final time pMessage->uiNodeID=UniqueNameMapping[uiConnectionID][pMessage->uiNodeID];

Where UniqueNameMapping is a two dimensional array with the first parameter being the connection ID, and the second is the number used in the unique number->name mapping for the connection with that connection ID.

Reusing the numbers used in the number->name mappings for each directly connected node will require an array that is the same size as the maximum number of mappings that will be used. The array will be treated as a stack with the numbers to be reused being placed in this stack. An offset into the stack will tell this node where to place the next number to be reused and where retrieve numbers to be re-used.

If the directly connected node has requested a maximum number of destination nodes that is greater then the total number of destination nodes known about by this node, then a unique mapping scheme is not needed for that directly connected node.

If this circumstance changes, one can be easily generated by someone skilled in the art.

When to Send User Data Packets

A user data packet can be sent whenever there is a route available. Alternative embodiments could allow for QOS where certain classes of nodes had their user data packets sent first. Someone skilled in the art would be aware of variations.

If no route is immediately available a payload packet could be held for some amount of time in hopes that a valid route would appear.

A Time-To-Live (TTL) scheme may also be implemented by someone skilled in the art. Instead of using hops (such as a protocol like TCP/IP) the TTL might be a multiple of the fCumulativeLinkCost value for the destination node that is calculated by the node that creates the payload packets. Each node will then subtract its LinkCost for the link that the packet is received on from the TTL. If the TTL goes below zero the packet could be removed. Someone skilled in the art will recognize this as a standard TTL scheme with the use of link costs instead of hop counts (like in TCP/IP).

Allowing More Important Nodes to Spread Further

This alternative embodiment will allow some nodes to spread further and/or faster through network.

For this embodiment to work well, most (if not all) nodes in the network will need to follow the same rules.

For a class of nodes that is marked as 'more important', only a fraction of the link cost will be added to their fCumulativeLinkCost and/or fCumulativeLinkCostFromStream values. For example, if a node D was in the class of more important nodes, and the usual link cost for a link N was 10, then the update for node D would only have (for example) 5, or half of the link cost added to its fCumulativeLinkCost and/or fCumulativeLinkCostFromStream.

How important a node is might be linked to:
1. Its magnitude (discussed earlier)
2. an arbitrary scheme based on the name of the node.
3. another value or combination of values added to or present in the node update structure.

Congested or Energy Depleted Nodes

This alternative embodiment can help shift network traffic away from overly congested nodes, or nodes that are running low on battery.

If a node was running low on energy, or was experiencing congestion it could increase its link costs. This would help shift traffic away from this node was experiencing problems.

It is helpful that the node shifts its link values slowly and waits between changes. This will help avoid unstable network oscillations.

If a node experiences reduced congestion or its battery situation improves then it should slowly lower its link costs back to normal.

Someone skilled in the art will be aware of the oscillation problems and be aware of schemes to deal with these problems.

Nodes Sharing a Name

This alternative embodiment allows nodes to share a name.

In the case of a web server (for example), it can become important to provide more bandwidth and connectivity then a single server can provide.

If two or more nodes were to use the same name then nodes attempting to connect to a node with that name would connect to the closest node (based on fCumulativeLinkCost).

If the request was stateless (for example requesting the main page of a web site) a node could then send the request immediately, since no matter which node the request got routed to, the same result would be returned.

If the node required a state-full connection, then it would initially connect to the closest node with that name. That closest node would then return its unique name that could be used to establish a connection that needed state.

For example, in the sConnectionAccept struct discussed earlier the name of the node returned (sConnectionAccept.nnNameB) could be the unique name of the node.

Propagation Priorities

In a larger network, bandwidth throttling for control messages will need to be used.

Total 'control' bandwidth should be limited to a percent of the maximum bandwidth available for all data.

For example, we may specify 5% of maximum bandwidth for each group, with a minimum size of 4K. In a simple 10 MB/s connection this would mean that we'd send a 4K packet of information every:

$$= 4096/(10 \text{ MB/s} * 0.05)$$
$$= 0.0819 \text{ s}$$

So in this connection we'd be able to send a control packet every 0.0819 s, or approximately 12 times every second.

The percentages and sizes of blocks to send are examples, and can be changed by someone skilled in the art to better meet the requirements of their application.

Bandwidth Throttled Messages

These messages should be concatenated together to fit into the size of block control messages fit into.

If a control message references a destination node name by its quick-reference number, and the directly connected node does not know that number, then quick reference (number->name mapping) should precede the message.

There should be a split between the amount of control bandwidth allocated to route updates and the amount of control bandwidth allocated to HSPP updates. For example, 75% of the control bandwidth could be allocated to route updates and the remaining 25% could be allocated to HSPP updates. Someone skilled in the art could modify these numbers to better suit their implementation.

Multiple Path Networks

This section of the document describes an embodiment that allows multiple paths for end user data to form between two communicating nodes. This embodiment also allows for paths to move and shift to avoid congestion.

This embodiment uses the idea of nodes and queues. Queues are used as destinations for messages (in the way that node names were used in the previous section of the document). The terminology in this section of the document may be slightly different from above, however someone skilled in the art will be able to tell which terms are equivalent.

Any definitions or concepts provided in this section of the document should not be seen as invalidating or changing the meaning of definitions or concepts in the preceding part of this document.

Someone skilled in the art would be aware of variations that would be possible.

This network does not rely on any agent possessing global knowledge of the network.

The constituents of the network are nodes and queues.

This network holds to several principles:

General Principles
1. The network will use simple concepts.
2. Decision-making and knowledge will be kept local, avoiding the need for global knowledge.
3. There shall be no limits on system size or topography, nodal capacity, or structural flexibility.

These principles govern the design of the network. The operation of these principles is explained in detail later.

Particular Principles
1. A node will only send messages to directly connected nodes that it has specified as chosen destinations.
2. A node will only send a message to a chosen destination if the latency of data in the queue on that node is greater than the latency of that chosen destination minus the minimum latency of all chosen destinations.
3. Nodes not currently in the data stream have only one chosen destination. Nodes in the data stream can have multiple chosen destinations.
4. When looking for a better chosen destination, nodes not in the data stream use passive loop checking, while nodes in the data stream use active loop checking.
5. Connections are established and maintained in a TCP/IP manner.
6. Nodes in large networks look for knowledge in the core of the network.

Data Flow Principles
1. A stream of data must not cause its own path latencies to change, except in the case where the flow is past capacity.

It is to be reiterated that examples are given herein in order to clarify understanding. These examples, when making specific reference to numbers, other parties' software or other specifics, are not meant to limit the generality of the method and system described herein.

Nodes

Each node in this network is directly connected to one or more other nodes. A node could be a computer, network adapter, switch, or any device that contains memory and an ability to process data. Each node has no knowledge of other nodes except those nodes to which it is directly connected. A connection between two nodes could be several different connections that are 'bonded' together. The connection could be physical (wires, etc), actual physical items (such as boxes, widgets, liquids, etc), computer buses, radio, microwave, light, quantum interactions, etc.

No limitation on the form of connection is implied by the inventors.

Figure 29:
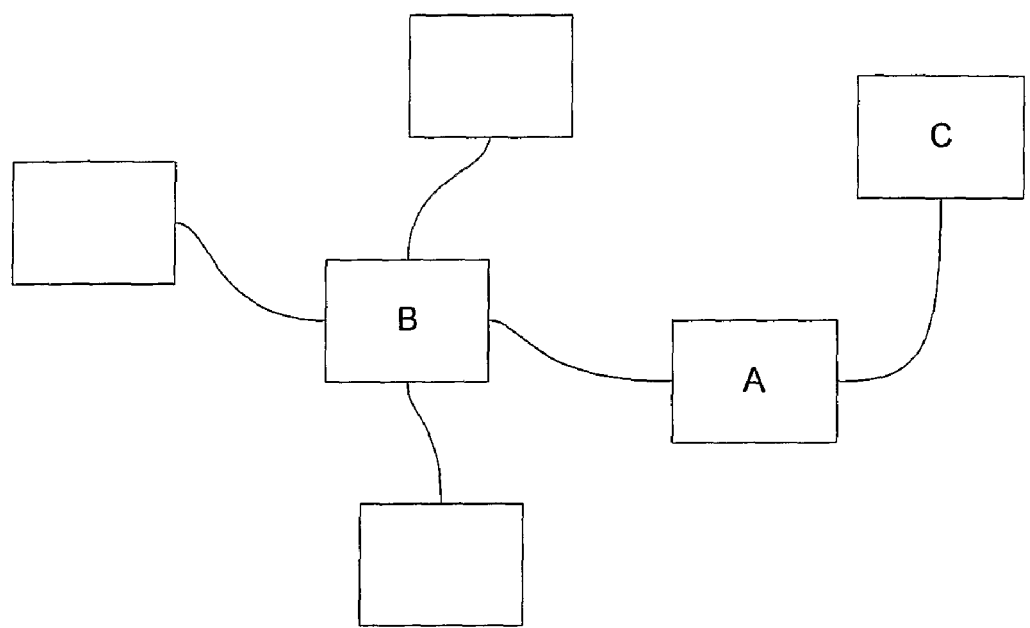
FIG. 29 is a schematic representation of a network showing node A directly connected to nodes B and C; node C only connected to node A; and node B directly connected to four nodes.

In FIG. 29 Node A is directly connected to nodes B and C. Node C is only connected to Node A. Node B is directly connected to four nodes.

'Chosen Destinations' are a subset of all directly connected nodes. Only 'Chosen Destinations' will ever be considered as possible routes for messages (discussed later).

'Chosen Destinations' is equivalent to 'Best Neighbour''s. It is used in this section of the document since 'Best Neighbour' may be somewhat misleading since there can only really be one 'best neighbour', whereas there can be multiple 'chosen destinations'.

Queues and Messages

Communication by end user software (EUS) is performed using queues. Queues are used as the destination for EUS messages/payload, as well as messages that are used to establish and maintain reliable communication. Every node that is aware of the existence of a queue has a corresponding queue with an identical name. This corresponding queue is a copy of the original queue, however the contents of queues on different machines will be different.

Messages are transferred between nodes using queues of the same name. A message will continue to be transferred until it reaches the original queue. The original queue is the queue that was actually created by the EUS, or the system, to be the message recipient.

A node that did not create the original queue does not know which node created the original queue.

Each queue created in the system is given a unique label that includes an EUS or system assigned queue number and a globally unique identifier (GUID). The GUID is important, because it guarantees that there is only every one originally created queue with the same name. For example:

Format: EUSQueueNumber.GUID
Example: 123456.af9491de5271abde526371

Alternative implementations could have several numbers used to identify the particular queue. For example:

Format: EUSAppID.EUSQueueNumber.GUID
Example: 889192.123456. af9491de5271abde526371

Each node can support multiple queues. There is no requirement that specific queues need to be associated with specific nodes. A node is not required to remember all queues it has been told about.

If a node knows about a queue it will tell those nodes it is connected to about that queue. (discussed in detail later). The only node that knows the final destination for messages in a queue is that final destination node that created that queue originally. A node assumes any node it passes a message to is the final destination for that message.

At no point does any node attempt to build a global network map, or have any knowledge of the network as a whole except of the nodes it is directly connected to. The only knowledge is has is that a queue exists, how long a message will take to reach the node that originally created that queue, and the maximum time a latency update from the original node will take to reach this node.

Latencies

Latencies play a central role in choosing the best path for data in the network. When node B tells node A that its latency is X seconds, it is saying that if node A were to pass a message to node B, that message would take X seconds to arrive at the ultimate destination and be de-queued by the EUS.

This latency value as calculated by node B is:

$$\text{Latency} = \text{MinOverTimePeriod}([\text{Bytes In Queue}]) *$$
$$[\text{Bytes/Second Send Rate}] + [\text{Lowest Latency of All Chosen Message Destinations}] + [\text{Service time on this queue}] + [\text{Physical Network Latency}]$$

Min Over Time Period is a period of time determined by the time it takes to perform a minimum of five sends or receives from the send and receive nodes associated with this queue. It is also a minimum time of 30 ms (or a reasonable multiple of the granularity of the fast system timer) This will be discussed in more detail later.

Bytes/Second Send Rate is the best estimate of the rate of data flowing out of the queue on this node.

Lowest Latency of All Chosen Message Destinations All directly connected nodes with knowledge of this queue will provide a latency to the node that originally created the queue. This is the lowest latency of all those nodes that are chosen destinations for this queue.

Service Time On This Queue is the time is takes for the node to attempt to send data from all other queues before it comes back to this one, excluding this particular queue.

Figure 30:
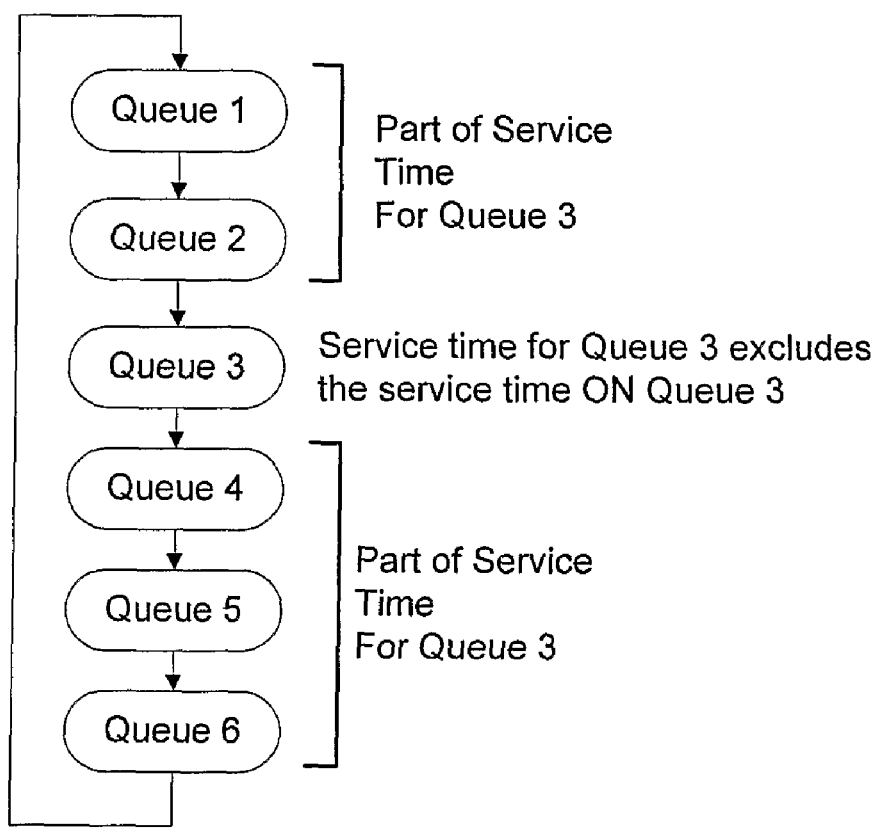
FIG. 30 shows a flow-chart depicting how service time on a queue can be calculated in accordance with an embodiment of the invention.

FIG. 30 illustrates how service time could be calculated

Calculation of Service Time on a Queue

For each directly connected node there is a list of queues that have that node as their chosen destination, and have data in their queue to send.

In order to service queues fairly, the system will cycle through these queues sending messages from them to a 'chosen destinations' in a round robin fashion. Each 'chosen destination' will have its own list of queues that it will cycle though on its own.

If quality of service (QOS) were to be implemented, this order of processing could be shifted to process the 'more important' queues more often.

Some types of nodes will have system timers with different resolutions available. Many times the low resolution timer is much faster to read the time from, thus it makes sense to use the lower resolution timer to increase the performance of a node.

The tradeoff is a slightly more complex algorithm for determining the service time on a queue.

As the system cycles through the list of queues for a chosen destination, it will record the number of times it was able to send a message from a particular queue by incrementing a counter associated with that queue. It will only increment this counter if it is able to pass a message from this queue to a network adapter associated with that chosen destination. It will only pass a message from that queue if there are the appropriate queue tokens available, and it passes the latency test. Both of these concepts will be defined later.

The node will also record how many messages it was able to send from all the queues.

It will keep looping through this round-robin process for at least 3 or 4 ticks of the low resolution timer. In the case of Windows 2000, to take one case but not to reduce the generality of this application, this would be approximately 45 or 60 milliseconds. For increased precision of this calculation, the number of ticks should be increased.

Once this time period has elapsed for a directly connected node, it will record these statistics:
1. The total number of messages sent to this directly connected node
2. The total time in seconds that this process took.

Each queue will also have recorded the number of messages that were sent from that queue to that particular chosen destination during that time period.

Two iterations of these statistics are stored; the one currently in progress and the last complete one. This allows the node to calculate the service time for the queue while continuing to gather new data for the next service time value.

To calculate the service time for this queue with this particular chosen destination (CD) this equation is used:

$$\text{Service Time} = ([\text{TotalMessagesSentToCD}] - [\text{TotalMessagesSentFromQToCD}]) / $$
$$[\text{TotalMessagesSentToCD}] * [\text{TotalTimeInSecondsForIterations}]$$

If there are multiple chosen destinations, we'll use this following equation to derive the service time:

$$\text{Service Time} = 1/(1/[\text{CD1Time}] + 1/[\text{CD2Time}] + \ldots))$$

This value is only calculated when it is being sent as part of a latency calculation. This reduces computational overhead.

Physical Network Latency

This is defined as

The time needed to send a packet similar to the average message size to a directly connected node, and have that packet be received by that directly connected node.

This value is very similar to the value of 'ping' in a traditional TCP/IP network.

This physical network latency is added to the latency provided to directly connected nodes, every time a calculation is performed using the latency that is provided by a directly connected node. For example, physical network latency would be used when:
1. Determining which is the lowest latency chosen destination
2. Detecting loops passively when not in the data stream. (defined later)
3. Picking Additional Chosen Destinations This value can be initialized by sending and timing a series of predefined packets to the directly connected node.

During operation of the system this value is re-calculated based on actual performance.

Assuming the network card is continuously sending data, all the system needs to do is record the amount of data sent, the average size of message and how much time elapses. The equation would look like:

Physical Network Latency
=[AverageMsgSize]/([TotalBytesSentDuringPeriod]/[ElapsedTime])
The time period should be chosen to be similar to the time period used to calculate service time.

End User Software

Unlike conventional networks where each machine has an IP address and ports that can be connected to, this system works on the concept of queues.

When the end user software (EUS) creates a queue, it is similar to opening a port on a particular machine. However, there are several differences:

1. When connecting to a queue all you need is the name of the queue (For example: QueueName.GUID as discussed previously), unlike TCP/IP where the IP address of the machine and a port number is needed. The name of the queue does not necessarily bear any relationship to the node, the node's identity or its location either physically or in the network.
2. In TCP/IP when a node is connected to the network it does not announce its presence. Under this new system when a node is connected to the network it only tells its directly connected neighbors that it exists. This information is never passed on.
3. When a port is opened to receive data under TCP/IP this is not broadcast to the network. With the new system when a queue is created the entire network is informed of the existence of this queue, in distinct contrast to the treatment of nodes themselves, as described in '2' immediately above. The queue information is propagated with neighbor to neighbor communication only.

These characteristics allow EUS' to have connections to other EUS' without any information as to the network location of their respective nodes.

In order to set up a connection between EUS' a handshake protocol similar to TCP/IP is used.

1. Node A: Creates QueueA1 and sends a message to QueueB with a request to open communication. It asks for a reply to be sent to QueueA1. The request would have a structure that looks like this:

```
struct sConnectionRequest {
    // queue A1 (could be replaced with a number -
    // discussed later)
    sQNameType              qnReplyQueueName;
    // update associated with queue A1 (explained
    // later) Includes Latency, UpdateLatency, etc..
    sQUpdate                quQueueUpdate;
•}
```

As this message travels through the network it will also bring along the definition for queue A1. This way, when this message arrives there is already a set of nodes that can move messages from the Node B to queue A1.

If Node A has not seen a reply from node B in queue A1, and queue A1 on node A is not 'in the data stream' (indicating that there is an actual connection between node B and queue A1), and it still has non-infinity knowledge of queue B (indicating that queue B, and thus node B still exists and is functioning), it will resend this message.

It will resend the message every 1 second, or every 'Queue B Latency' seconds—which ever is longer.

Node B will of course ignore multiple identical requests.

If any node has two identical requests on it, that node will delete all except one of these requests.

2. Node B: Sends a message to Queue A1 saying: I've created a special Queue B1 for you to send messages to. I've allocated a buffer of X bytes to re-order out-of-order messages.

```
struct sConnectionReply {
    // queueB1
    sQNameType      qnDestQueueForMessages;
```

```
    // update associated with queue B1 (explained
    // later) Includes Latency, UpdateLatency, etc..
    sQUpdate              quQueueUpdate;
    // buffer used to re-order incoming messages
    integer               uiMaximumOutstandingMessageBytes;
}
```

As this message travels through the network it will also bring along the definition for B1. As a result of this mechanism, when this message arrives there will be already a set of nodes that can move messages from the Node A to queue B1.

If Node B does not see a reply from node A in queue B, and queue B1 on node B is not 'in the data stream', and node B still has non-infinity knowledge of queue A1, it will resend this message.

It will resend the message every 1 second, or every 'Queue A1 Latency' seconds—which ever is longer.

Node B will continue resending this message until it receives a sConfirmConnection message, and queue B1 is marked 'in the data stream'.

Node B will of course ignore multiple identical sConfirmConnection replies.

If any node has two or more identical replies on it, that node will delete all except one.

3. Node A: whenever node receives a sConnectionReply from node B on queue A1, and it has knowledge of queue B1, it will send a reply to queue B indicating a connection is successfully set up.

```
struct sConfirmConnection {
    // the queue being confirmed
    sQNameType              qnDestQueueForMessages;
}
```

If a any node has two identical sConfirmConnection messages on it, that node will delete all except one of these messages.

By attaching the queue definitions to the handshake messages the time overhead needed to establish a connection is minimized. It is minimized because the nodes do not need to wait for the queue definition to propagate through the network before being able to send.

Node A can then start sending messages. It must not have more then the given buffer size of bytes in flight at a time. Node B sends acknowledgements of received messages from node A. Node B sends these acknowledgements as messages to queue A1.

An example of the arrangement of nodes and queues looks like FIG. 31.

Acknowledgements of sent messages can be represented as a range of messages. Acknowledgments will be coalesced together. For example the acknowledgement of message groups 10-35 and 36-50 will become acknowledgement of message group 10-50. This allows multiple acknowledgements to be represented in a single message.

The structure of an acknowledgement message looks like:

```
struct sAckMsg {
    integer         uiFirstAckedMessageID;
    integer         uiLastAckedMessageID;
```

Acknowledgements (ACKs) are dealt with in a similar way to TCP/IP. If a sent message has not been acknowledged within a multiple of average the ACK time of the messages sent to the same 'chosen destination', then the message will be resent.

The message is stored on the node where the EUS created them, until they have been acknowledged. This allows the messages to be resent if they were lost in transit.

If the network informs node B that queue A1 is no long visible it will remove queue B1 from the network and de-allocate all buffers associated with the communication. If the network informs node A that queue B1 is no longer visible then node A will remove queue A1.

This will only occur if all possible paths between node A and node B have been removed, or one or both of the nodes decides to terminate communication.

If messages are not acknowledged in time by node B (via an acknowledgement message in queue A1) then node A will resend those messages.

Node B can increase or decrease the 're-order' buffer size at any time and will inform node A of the new size with a message to queue A1. It would change the size depending on the amount of data that could be allocated to an individual queue. The amount of data that could be allocated to a particular queue is dependent on:
1. How much memory the node has
2. How Many Queues it Remembers
3. How many data flows are going through it
4. How many queues originate on this node
This resize message looks like this:

```
struct sResizeReOrderBuffer {
    // since messages can arrive out of order,
    // the version number will help the sending
    // node determine the most recent
    // 'ResizeReorderBuffer'.
    integer        uiVersion;
    // the size of the buffer
    integer        uiNewReOrderSize;
```

There is also a buffer on the send side (node A). The size of that buffer is controlled by the system software running on that node. It will always be equal or less then the maximum window size provided by node B.

Nodes in the Data Stream

A node is considered in the data stream if it is on the path for data flowing between an ultimate sender and ultimate receiver. A node knows it is in the data stream because a directly connected node tells it that it is in the data stream.

Data may flow through a node that is not marked as in the data stream. Only a node marked as 'in the data stream', is considered to be in the data stream. A node with data flowing through it but is not marked in the data stream is considered not to be in the data stream.

The first node to tell another node that it is 'in the data stream' is the node where the EUS resides that is sending a message to that particular queue. For example, if node B wants to send a message to queue A1. Node B would be the first node to tell another node that it is 'in the data steam' for queue A1. A node will send a queue's like queue B without marking them 'in the data stream'.

A node in a data stream for a particular queue will tell all its nodes that are 'chosen destinations' for that queue, that they are in the data stream for that queue. If all the nodes that told the node that it was in the data stream tell it that it is no longer in the data stream then that node will tell all its 'chosen destinations' that they are no longer in the data stream.

Basically, if a node is not in the data stream any more it tells all those nodes it has as chosen destinations that they are not in the data stream.

This serves two purposes. First it allows the nodes in the data stream to instantly try to find better routes, Second it ensures that nodes in the data stream do not 'forget' about the queues.

The structure used to tell another node that is in the data stream is:

```
struct sDataStream {
    // the name of the queue, this could be replace with a
    // number that maps to the queue name. (discussed later)
    sQName         qnName;
    // true if now in the stream, false if not.
    bool           bInDataStream;
};
```

Only data streams for queues of type B1 have the ability to created braided multi-path routes. Queues of type A1 that are in the data stream, can be limited to a single path if desired because ACK messages are both small and are easily merged together. Nodes of type B are never marked as 'in the data stream'.

A possible enhancement would be GUID probing each node about to be added to the 'data stream' to be sure it is non-looping. (GUID probes defined later).

Node Tasks

Nodes communicate with directly connected nodes to send messages created by an EUS to another EUS. Nodes will also send messages used to establish and maintain a reliable communication with another EUS.

To send messages a node must determine
1. Where to Send Messages
2. When to Send Messages Each of these occasions is addressed in the following sections.

Where to Send Messages

To determine where it will send messages a node tries to pick a connected node:
1. That provides the best latency to the ultimate destination
2. That will not introduce a 'loop'
3. Not at its Sending Capacity Initial Queue Knowledge When a queue is created by an EUS the system needs a way to tell every node in the network that the queue exists, and every node needs a path through other nodes to that queue. The goal is to create both the awareness of the queue and a path without loops.

When the EUS first creates the queue, the node that the queue is created on tells all directly connected nodes:
1. The Name of the Queue
   This is a name that is unique to this queue. Two queues independently created should never have the same name.
2. Latency
   Discussed previously. This is a value in seconds that describes how long it will take a message to travel from that node to the node that is the ultimate receiver.
3. 'At Capacity' Status
   Discussed Later. This is a boolean value that is true if the any of the nodes in the path of chosen destinations for this node are unable to handle more data flow then they are already have.

4. Update Latency
   Discussed Later. This is a value in seconds that describes the maximum time a latency update from the ultimate receiver will take to reach this node.
5. Distance from Data Stream
   Discussed Later. Very similar to 'Update Latency', except that it describes how far this node is from a node marked in the data stream. This can be used to decide which queues are 'more important'. An alternative implementation could have it represent how far a node is from either a marked data stream, or a node carrying payload messages.

This update takes the structure of:

```
struct sQUpdate {
    // the name of the queue. Can be replaced with
    // a number (discussed later)
    sQName              qnName;
    // the time it would take one message to travel
    // from this node to ultimate receiver and be
    // consumed by the EUS
    float               fLatency;
    // if true, this node is already handling as
    // much data as it can send. (discussed later)
    bool                bAtCapacity;
    // the maximum time a latency update will
    // take to travel from the ultimate receiver
    // to this node. (discussed later)
    float               fUpdateLatency;
    // calculated in a similar fashion
    // to 'fUpdateLatency'. and records the distance
    // from a marked data stream for this node.
    float               fLatencyFromStream';
};
```

Regardless of whether this is a previously unknown queue, or an update to an already known queue the same information can be sent.

Delayed sending of node updates and the ordering of node updates should follow the same approach described previously.

If this is the first time a directly connected node has heard about that queue it will choose the node that first told it as its 'chosen destination' for messages to that queue. A node will only send EUS messages/payload to a node or nodes that are 'chosen destinations', even if other nodes tell it that they too provide a route to the EUS created queue.

If a node picks a directly connected node as a 'chosen destination', it must tell that node that it was selected as a 'chosen destination'. The structure of the message looks like this:

```
struct sPickedAsChosenDestination {
    // the name of the queue. Could be replaced with a number
    // (discussed later)
    sQName              qnName;
    // true if the node this message is being sent to is a
    // a chosen destination for this queue.
    bool                bSelected;
};
```

A node will never pick another node as a 'chosen destination' if that node already has this node as a 'chosen destination' for that queue. If this happens because both nodes pick each other at the same time it needs be resolved instantly.

One approach would be for both nodes to remove each other as chosen destinations, wait a random amount of time and then try to re-select each other.

In this fashion a network is created in which every node is aware of the EUS created queue and has a non-looping route to the EUS queue through a series of directly connected nodes.

FIG. 32 is a series of steps showing knowledge of a queue propagating the network. The linkages between nodes and the number of nodes in this diagram are exemplar only, whereas in fact there could be indefinite variations of linkages within any network topography, both from any node, between any number of nodes.

At no point does any node in the network attempt to gather global knowledge of network topology or routes. The system provides every node with the names of the EUS created queues and the latencies the directly connected nodes provide to the EUS created queues.

Even if a node has multiple possible paths for messages it will only send messages along the node or nodes that it has chosen as its 'chosen destinations'.

When a node has selected another directly connected node as its 'chosen destination', it will tell that node of its choice in order to avoid loops that may be created if two nodes pick each other as 'chosen destinations'.

Every node keeps track of what queue's it has told its directly connected nodes about. Every new queue that the directly connected node has not been told about will be immediately sent (see Propagation Priorities). In the case of a brand new connection, nodes on either side of that connection would send knowledge of every queue they were aware of.

If a node does not contain enough memory to store the names, latencies, etc of every queue in the network the node can 'forget' those queues it deems as un-important. The node will choose to forget those queues where this node is furthest from a marked data stream. The node will use the value 'fLatencyFromStream' to decide how far this node is from the marked data stream.

An alternative embodiment could use the value fLatencyFromStream' to represent its distance from either a marked data stream, or a node carrying payload packets.

The only side effect of this would be an inability to connect to those queues, and for those nodes that rely exclusively on you for a destination to connect to those queues.

The value 'fLatencyFromStream' can be used to help determine which queues are more important (See Propagation Priorities). If the node is 100 seconds from the marked data stream for queue A, and 1 second away from a marked data stream for queue B, it should chose to remember queue B—because this node is closest to a marked data stream and can be more use in helping to find alternative paths.

A node that is told about a new queue name with latency of infinity (discussed later) will ignore that queue name.

Queue Name Optimization and Messages

Every queue update needs to have a way to identify which queue it references. Queue names can easily be long, and inefficient to send. Nodes can become more efficient by using numbers to represent long names.

For example, if node A wants to tell node B about a queue named 'THISISALONGQUEUENAME.GUID', it could first tell node B that:
   1='THISISALONGQUEUENAME.GUID'
A structure for this could look like:

```
struct sCreateQNameMapping {
    int                 nNameSize;
    char                cQueueName[Size];
    int                 nMappedNumber;
};
```

Then instead of sending the long queue name each time it wants to send a queue update, it could send a number that represented that queue name. When node A decides it no longer wants to tell node B about the queue called 'THISI-SALONGQUEUENAME.GUID', it could tell A to forget about the mapping.

That structure would look like:

```
struct sRemoveQNameMapping {
    int      nNameSize;
    char     cQueueName[Size];
    int      nMappedNumber;
};
```

Each node would maintain its own internal mapping of what names mapped to which numbers. It would also keep a translation table so that it could convert a name from a directly connected node to its own naming scheme. For example, a node A might use:
1='THISISALONGQUEUENAME.GUID'
And node B would use:
632='THISISALONGQUEUENAME.GUID'
Thus node B, would have a mapping that would allow it to convert node A's numbering scheme to a numbering scheme that, makes sense for node B. In this example it would be:

| Node A | Node B |
|--------|--------|
| 1      | 632    |
| ...    | ...    |
| ...    | ...    |

Using this numbering scheme also allowueA1 andes to be messagetagged aeB with ch queuet to opee destined for. For example, if the system had a message of 100 bytes, it would reserve the first four bytes to store the queue name the message belongs to, followed by the message. This would make the total message size 104 bytes. An example of this structure also includes the size of the message:

```
struct sMessage {
    int      uiQueueID;
    int      uiMsgSize;
    char     cMsg[uiMsgSize];
}
```

When this message is received by the destination node, that node would refer to its translation table to decide which queue this message should be placed in.

Path to Queue Removed

If a node that is on the path to the node where the original queue was created, is disconnected from the node that it was using as its only 'chosen destination', that node will first attempt to find a non-looping alternative path.

It will do this by examining all nodes that are not currently sending to this node (ie. Have this node as a 'chosen destination'). If it picked a node that has this node as a 'chosen destination' a loop would be created.

This node will use a GUID probe to check for loops in the remaining possible nodes using the 'GUID probe' process described later in 'Adding additional routes'.

If all potential alternative paths are loops, the node will set its latency to infinity, and tell all connected nodes immediately of this new latency.

If a node has a 'chosen destination' tell it a latency of infinity, it will instantly stop sending data to that node and will remove that node as a 'chosen destination'. If all 'chosen destinations' have been removed the node will set its own latency to infinity and immediately tell its directly connected nodes.

Once a node has set its latency for a queue to infinity and tells its directly connected nodes, it waits for a certain time period (one second for example). At the end of this time period the node will instantly choose as a chosen destination any directly connected node that does not have a latency of infinity, and resume the sending of data.

If it does not see a suitable new source within double the original fixed time period (2 seconds for example) after the first time period has elapsed, it will delete messages from that queue, and remove knowledge of that queue.

This time period is based on a multiple of how long it would take this node to send the update that this queue has gone to infinity. (See Propagation priorities later). This value is then multiplied by 10, or a suitably large number that is dependant on the interconnectedness of the network.

For example, if the network is very large and sparsely connected, the number would be higher then 10. In a dense, well connected network, the value would be 10.

If a node's latency moves from infinity to non-infinity it will immediately tell all directly connected nodes of its new latency.

In this example, in a network with ten nodes, an EUS has created a queue on one of the nodes that has a direct connection to two nodes, one on each side of the network.

Figure 33:
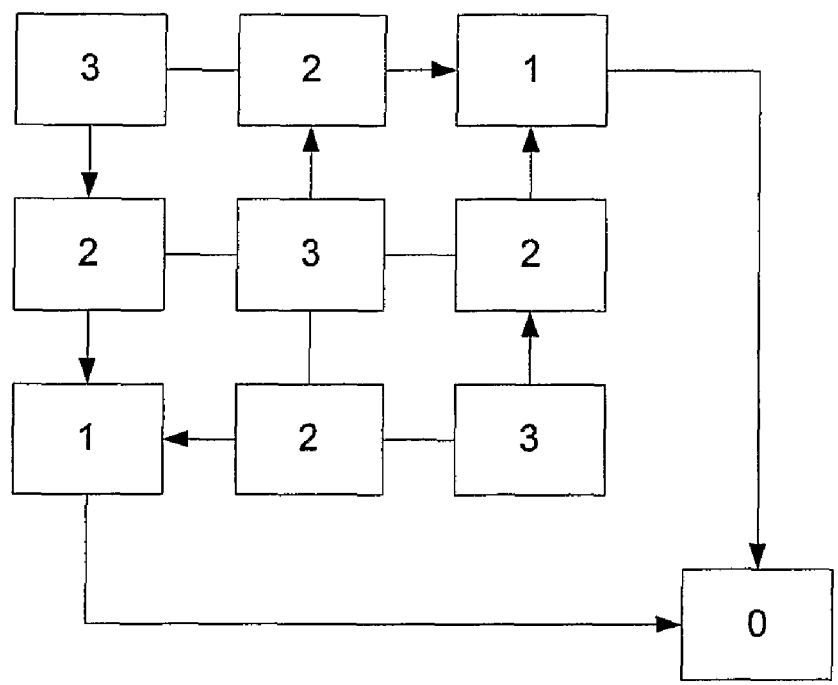
FIG. 33 is a schematic representation of a network showing every node in the network having just become aware of the EUS created queue, in accordance with an embodiment of the invention.

In FIG. 33, every node in the network has just become aware of the EUS created queue (which has zero latency—lower right), the numbers in each node represent the latency in seconds as defined above.

Figure 34:
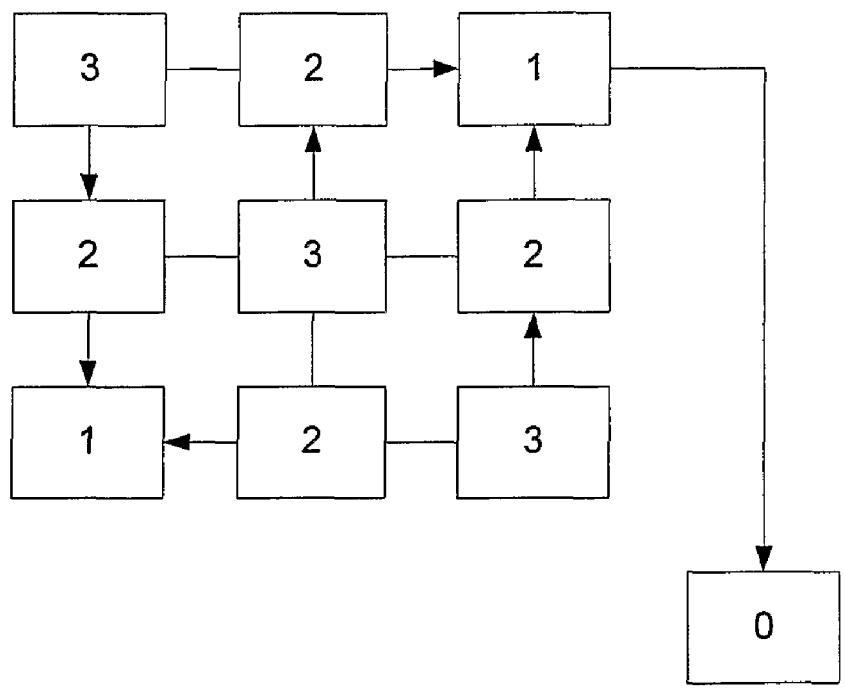
FIG. 34 is a schematic representation of the network of FIG. 33 with one of the connections between the node with the EUS created queue removed.
Figure 35:
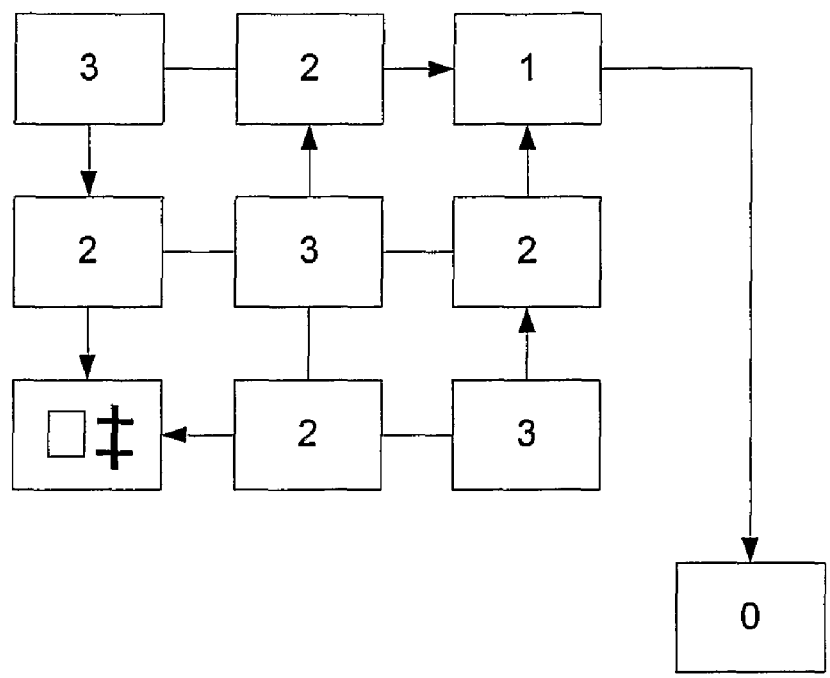
FIG. 35 is a schematic representation of the network of FIG. 33 with the directly connected node that lost its connection to the node with the EUS created queue set to a latency of infinity.

Next, in FIG. 34, one of the connections between the node with the EUS created queue is removed The directly connected node that lost its connection to the node with the EUS created queue will check to see if any of the nodes it is directly connected to are using it as sender. Since all of them are, it does not need to probe them with GUIDs to determine if they loop. This node then sets itself to a latency of infinity. This is shown in FIG. 35.

Figure 36:
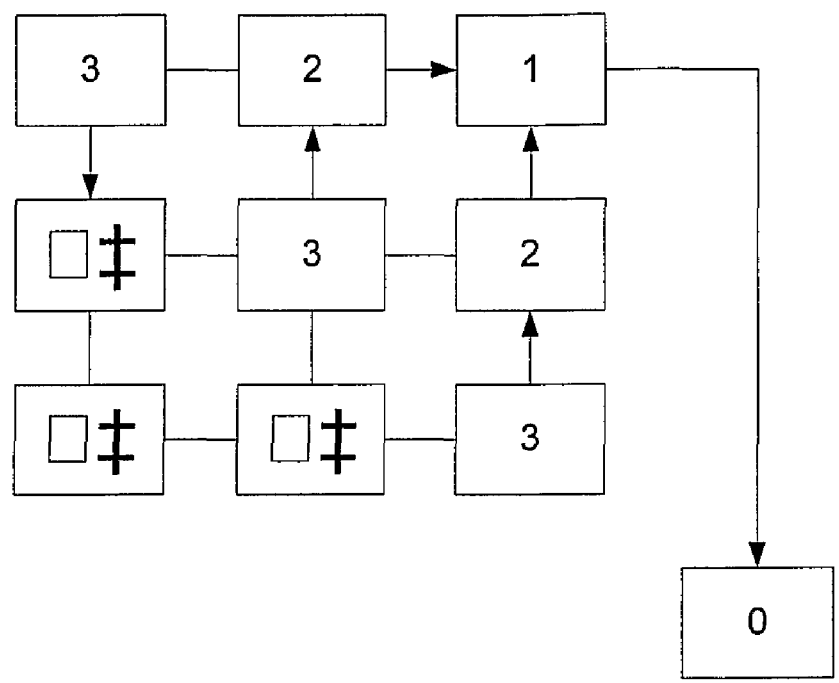
FIG. 36 is a schematic representation of the network of FIG. 33 with all the node's 'chosen destinations' at infinity.

It immediately tells all directly connected nodes of its new latency. If all the node's 'chosen destinations' are at infinity, those nodes' latencies become infinity as well. This is shown in FIG. 36.

Figure 37:
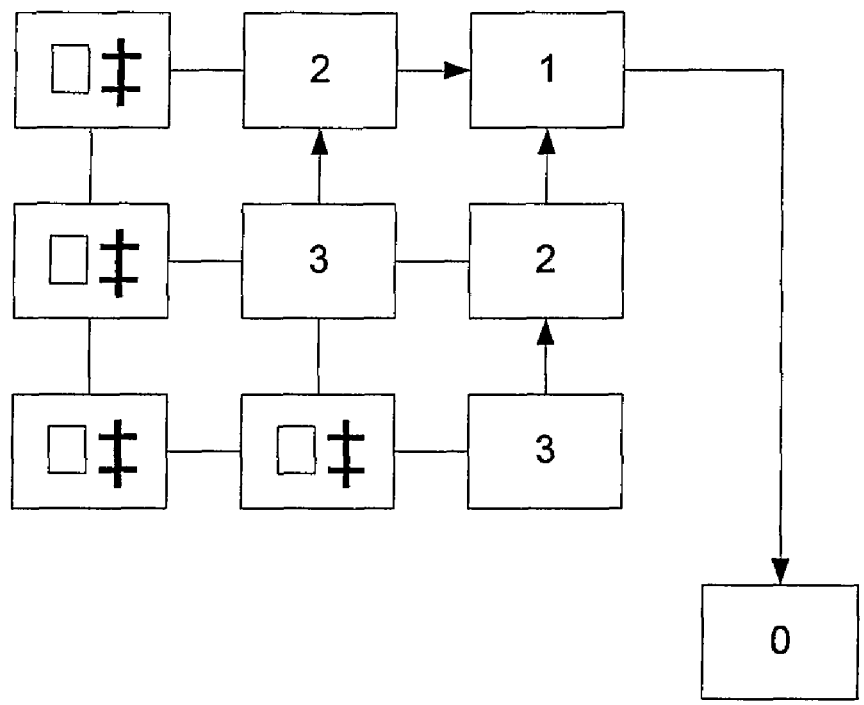
FIG. 37 is a schematic representation of the network of FIG. 33 with all nodes that can be set to infinity being set to infinity.

This process continues until all nodes that can be set to infinity are set to infinity. This is shown in FIG. 37.

Figure 38:
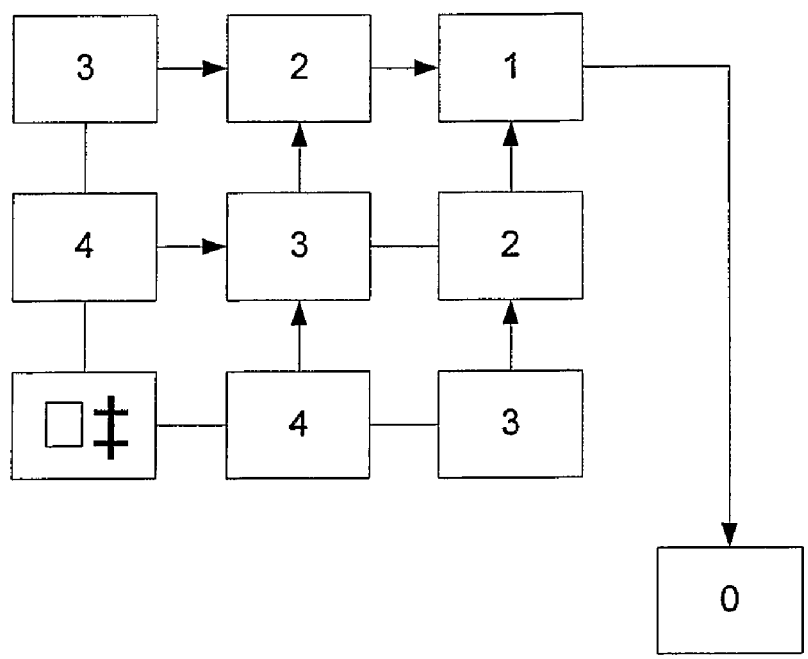
FIG. 38 is a schematic representation of the network of FIG. 33 with every node that has been set to infinity paused for a fixed amount of time, and then picking the lowest latency destination it sees that is not infinity.

At this point, every node that has been set to infinity pauses for a fixed amount of time (for example, one second), and then picks the lowest latency destination it sees that is not infinity. This is shown in FIG. 38.

Figure 39:
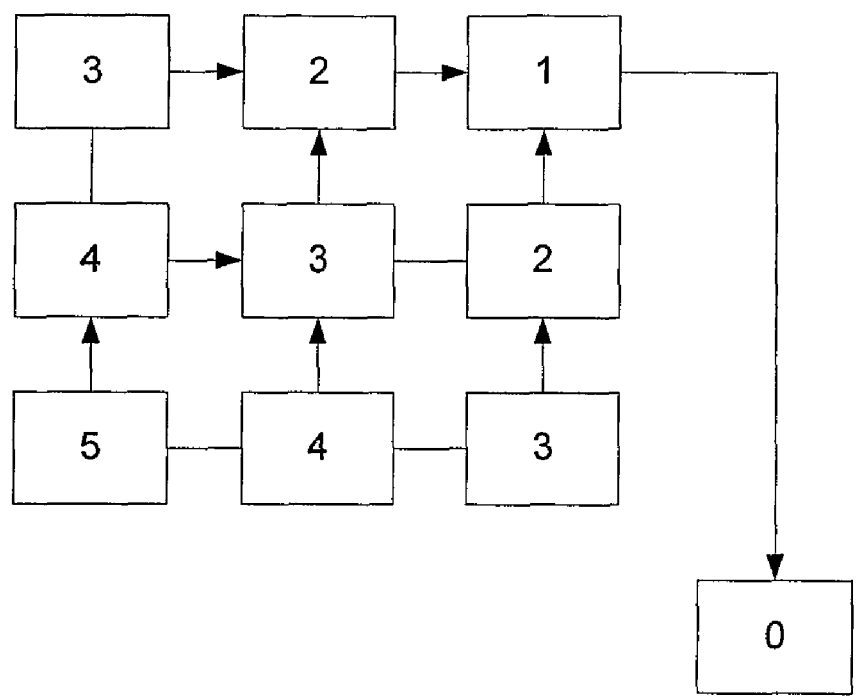
FIG. 39 is a schematic representation of the network of FIG. 33 showing that as soon as a node that was at infinity becomes non-infinity it tells the nodes directly connected to it immediately.

As soon as a node that was at infinity becomes non-infinity it will tell the nodes directly connected to it immediately. If one of those nodes is at infinity it will select the first connected node to provide it with a non-infinity latency as its chosen destination. This is shown in FIG. 39.

At this point the network connections have been re-oriented to enable transfer of all the messages destined for the EUS created queue to that queue.

If a node's latency for a queue is at infinity for more then several seconds the node can assume that there is no other alternative route to the ultimate receiver and any messages in the queue can be deleted along with knowledge of the queue.

Figure 40:
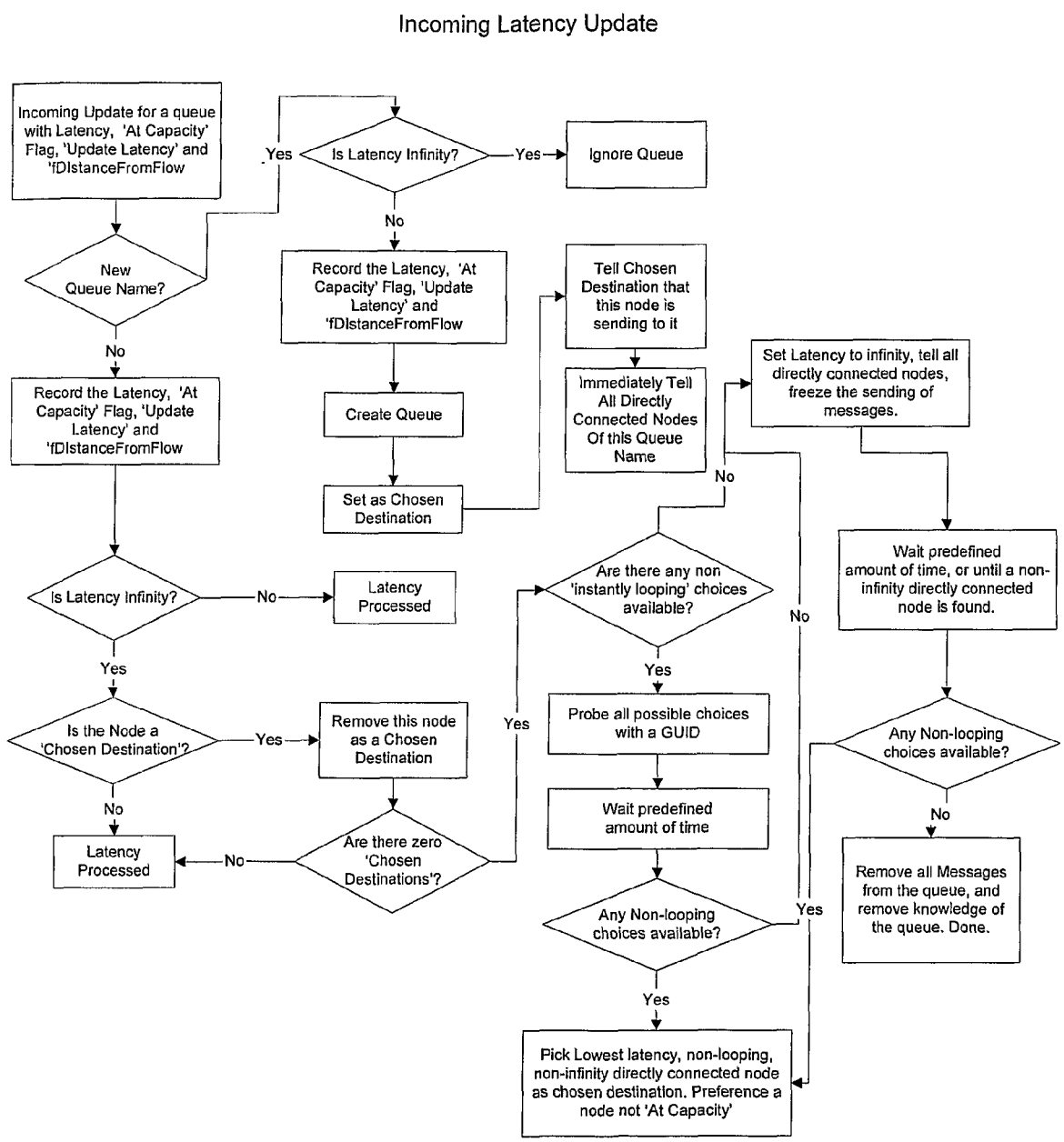
FIG. 40 shows a flow-chart depicting the incoming latency update outlined in the schematic representations of FIGS. 33-39.
Figure 41:
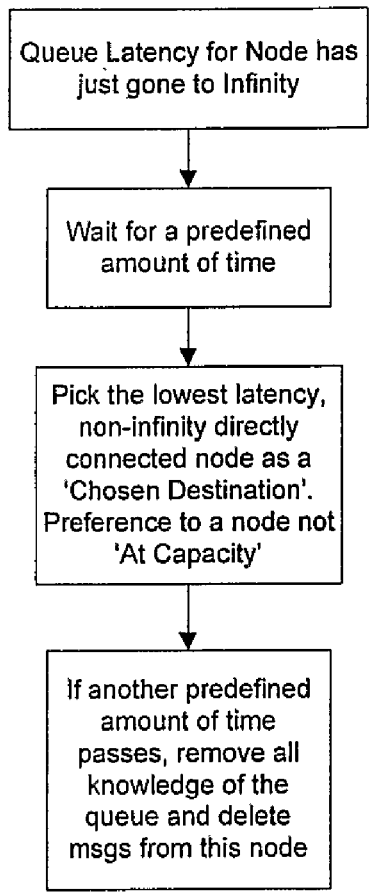
FIG. 41 shows a flow-chart depicting latency at infinity.

FIG. 40 outlines the above processes.

Converging on Optimal Paths for Nodes 'Not In The Data Stream'

Nodes are always trying to lower their latency to the originally created queue by selecting different chosen destinations.

Figure 42:
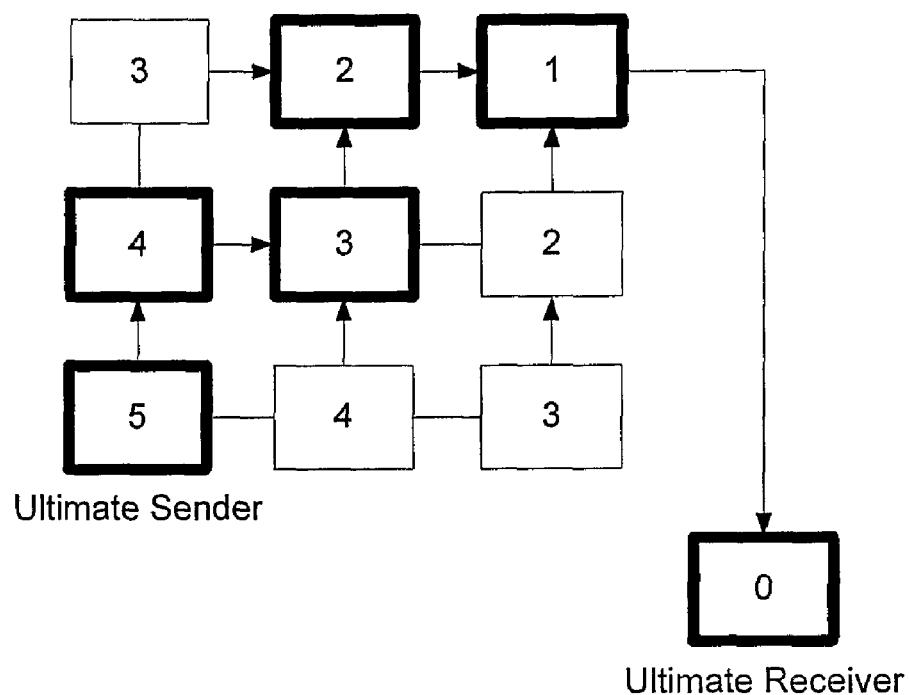
FIG. 42 is a schematic representation of a network showing the data stream on nodes between the ultimate sender and ultimate receiver.

Only the queue that is established on nodes between the ultimate sender and ultimate receiver for transferring EUS message data will use braided multiple paths for increased bandwidth. The ultimate sender marks this path by telling all 'chosen destinations' that they are in this data sending path ('in the data stream'). Each of those 'chosen destination' nodes tell their own 'chosen destination' nodes that they to are 'in the data stream'. FIG. 42 illustrates this.

If all senders to a particular node are disconnected or tell that node that it is no longer in the 'data stream', or the node that told it that it was in the 'data stream' tells it that it is no longer a 'chosen destination', then it will clear the 'in the data stream' flag and tell all its chosen destinations they are no longer in the data stream.

If a node is currently in the path of EUS message transfers between two node with EUS it uses a different mechanism to select a new 'chosen destination'.

If a node that has multiple chosen destinations is removed from the data stream it will remove all chosen destinations except that one with the lowest latency. This enables the mechanism for finding loops to remain effective since that mechanism will only work with one chosen destination.

A node that is not currently in the data stream will always try to improve its latency to the ultimate receiver by selecting a node with a lower latency then its current chosen destination.

A node needs to be sure that when it is selecting a different 'chosen destination' that it will not introduce a loop.

A node looking to upgrade its connection will prefer any node that is not 'at capacity' (explained later) over any node that is 'at capacity', regardless of latency.

A the node is not currently in the path of EUS messages/payload it is not allowed to use GUIDs, or messages to check to see if the possible new chosen destination is a loop because a network of any size would quickly be overrun with these messages.

Instead it watches the latency of a potential choice by waiting for a periodic, automatic latency update from that node and compares it with the latency of its currently 'chosen destination'.

In the circumstance where a potential new destination would create a loop, if chosen, the major cause of apparent lower latency is lag introduced by the travel time for data in the loop between the current node and this potential new node.

For example, if every second the current node's latency increases by 1 s, and there was a loop with a three second lag between this node and the new potential 'chosen destination', the new potential 'chosen destination' would always appear to have 3 second lower latency then the current chosen destination.

Figure 43:
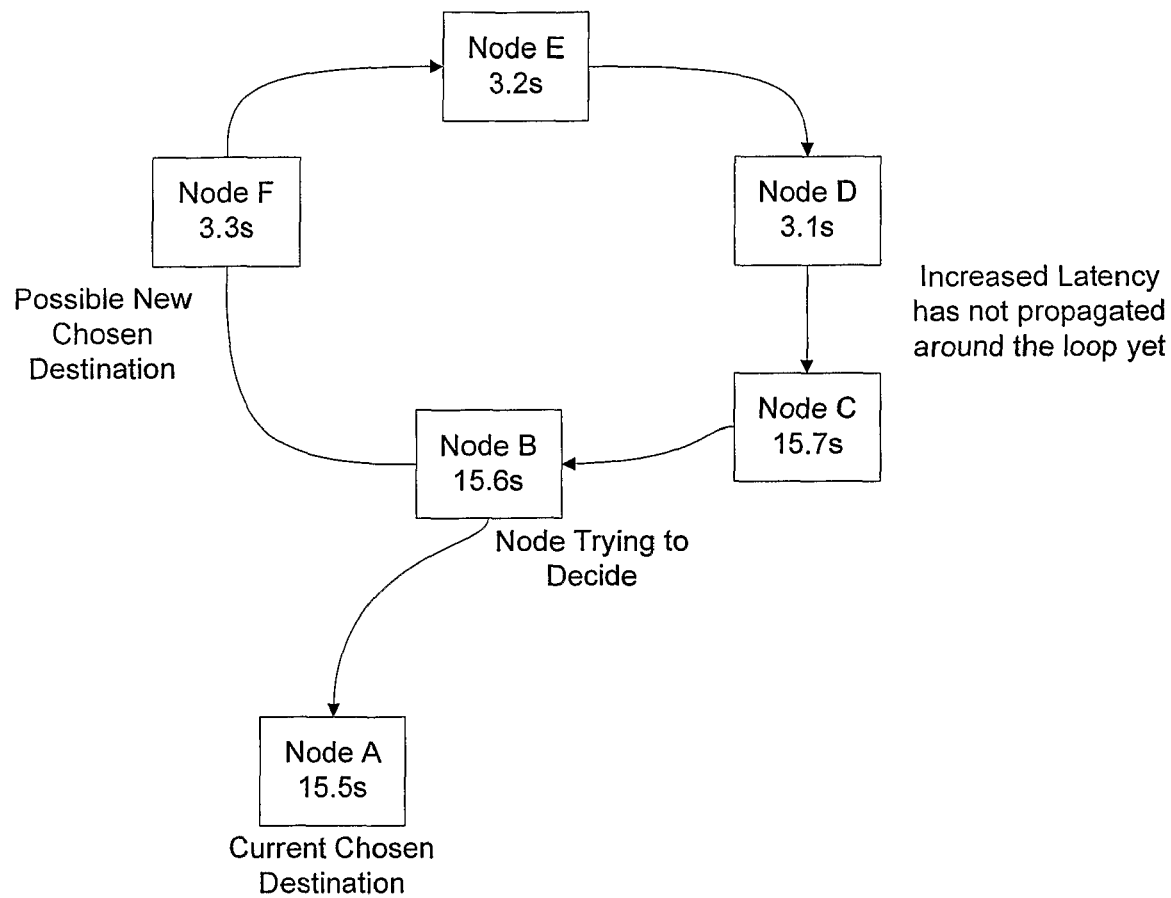
FIG. 43 is a schematic representation of a network showing an example of a potential loop to be avoided.

FIG. 43 is another example of a potential loop to be avoided

If the current node chose this apparently 'better choice' it would create a loop in the system.

This is where the 'fUpdateLatency' value from the queue update is used. This number is the maximum time it takes for a latency update to travel from the node that created the queue. The actual calculation of this value is discussed later.

In the previous diagram node B is trying to decide if node F is a better choice then node A. It will compare the difference in 'fUpdateLatency' from node F and node A. The two values in this example would be:

Node A fUpdateLatency: 8 s
Node F fUpdateLatency: 13 s

Since node A is the currently chosen destination, and node F's 'fUpdateLatency' is higher then node A's 'fUpdateLatency' node B needs to check to see if node F is actually routing its messages through as series of nodes to node B.

Node B can't immediately discard node F as a valid new 'chosen destination' just because it has a higher 'fUpdateLatency'. This is because the alternative route that node F provides, although potentially a longer path to the ultimate destination it could be faster because of congestion on the route provided by node A.

The basic idea behind passive loop testing is the following.

The fUpdateLatency difference between A and F (in this example 5 seconds) is how long it will take at maximum for a latency update sent from node B to reach node F.

If a loop is present, then the maximum latency value from node F during this period of time will be greater then the median latency value from node A during the same time period before this time.

The total time period for the median must never be longer then value of node A's 'fUpdateLatency'. For example, if the difference between the 'fUpdateLatency' values of node A and node F was 500 seconds, and node A's 'fUpdateLatency' was 8 seconds, the time period for calculating the median would be only 8 seconds. The time period watching for a maximum would be 500 seconds.

Figure 44:
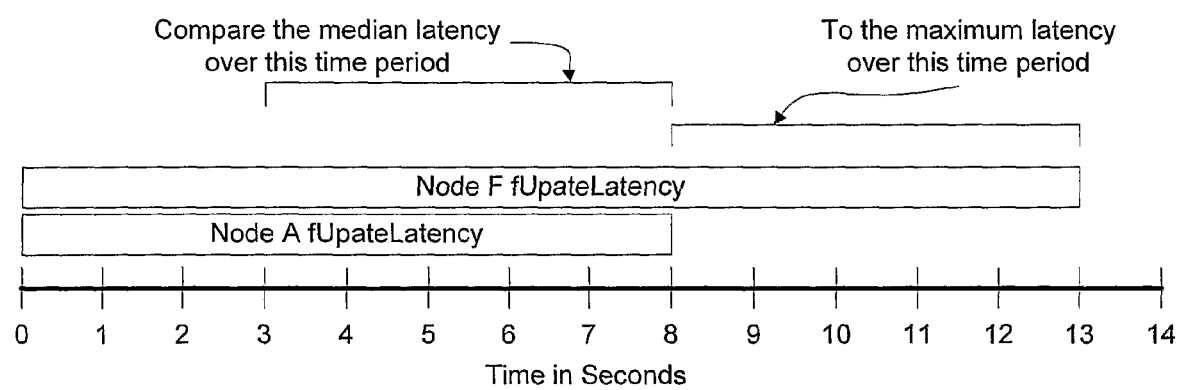
FIG. 44 shows a chart comparing the median latency over a time period to the maximum latency over another time period.

FIG. 44 illustrates this.

This technique may yield a false positive for a loop, however it will only very rarely yield a false negative. Dealing with a loop is discussed later.

Using a median in the above case would be ideal, however calculating a median requires storing all the observations. Below is a pseudo code algorithm that can approximate a median and requires a low fixed overhead.

```
float    fPart1 = 0;
float    fPart2 = 0;
int      nCount = 0;
while    (not done all observations) {
         float fCurOb = GET_CURRENT_OBSERVATION( )
         fPart1 = fPart1 + fCurOb;
         nCount = nCount + 1;
         fPart2 = fPart2 + abs( fPart1 / nCount - fCurOb);
}
float fCloseToMedian = fPart1 / nCount1 - fPart2/nCount;
```

If the observations' time periods are too small they will get rounded up one iteration of the low resolution timer.

During the observation period for both the median and the maximum, the values of fUpdateLatency may change. If the difference between the two 'fUpdateLatency''s increases, the new increased time period will be used. Lower values will be ignored. This can lead to the circumstance where the 'median' time period will be smaller then the 'maximum' time period. This is fine.

If the 'fUpdateLatency' for node F is less then node A, or becomes less during the course of the comparison, then no loop is possible and the node can select node F as a new chosen destination without further delay.

If the queue on this node is 'at capacity', we'll prefer to pick a node with a higher latency that is not 'at capacity'. This node will still wait the appropriate time to be sure that this 'not at capacity' node stays 'not at capacity'. If the considered node turns to 'at capacity' during the time period, but it provides a lower latency and not a loop then this node can use that node as a 'chosen destination'.

If this node is currently at infinity, this process will not be used. (See previous)

If during the 'maximum' time period a latency update arrives from node F greater then the median of node A, then the test will end indicating a loop. Node B will not wait for the entire 'maximum' time period to expire. The exception to this is if this node is 'at capacity' and the node being considered is not 'at capacity'.

Since a node not in the data stream can have only one chosen destination for that queue, when it picks a new chosen destination it will stop using the old chosen destination.

When a node not in the data stream switches to new chosen destination it will record the difference between current chosen destination's 'fUpdateLatency' and the new chosen destination's 'fUpdateLatency'. This value will be stored and used to help detect a loop. (discussed later)

At Capacity Checking

Each queue of each node also has a mechanism to detect when it is sending or receiving data at capacity. A queue on a node is considered at capacity when the latency of data in its queue exceeds max([all chosen destination latencies])−min([all chosen destination latencies])

for more then 5 time intervals, for example. A time interval is defined as the time every destination able to send has sent a certain number of messages (for instance, 10), or a minimum of a certain time period (for example, double the minimum granulation of the fast system timer), or a maximum of another time period (for example 6 seconds).

It is important that enough time has elapsed during the time interval that the chosen destinations have had the chance to bring the total amount of data in the queue to the lowest point possible. For example, if data is flowing in at 100 bytes every second, and flowing out at 500 bytes every five seconds, an absolute minimum time interval of 5 seconds would be required.

Figure 45:
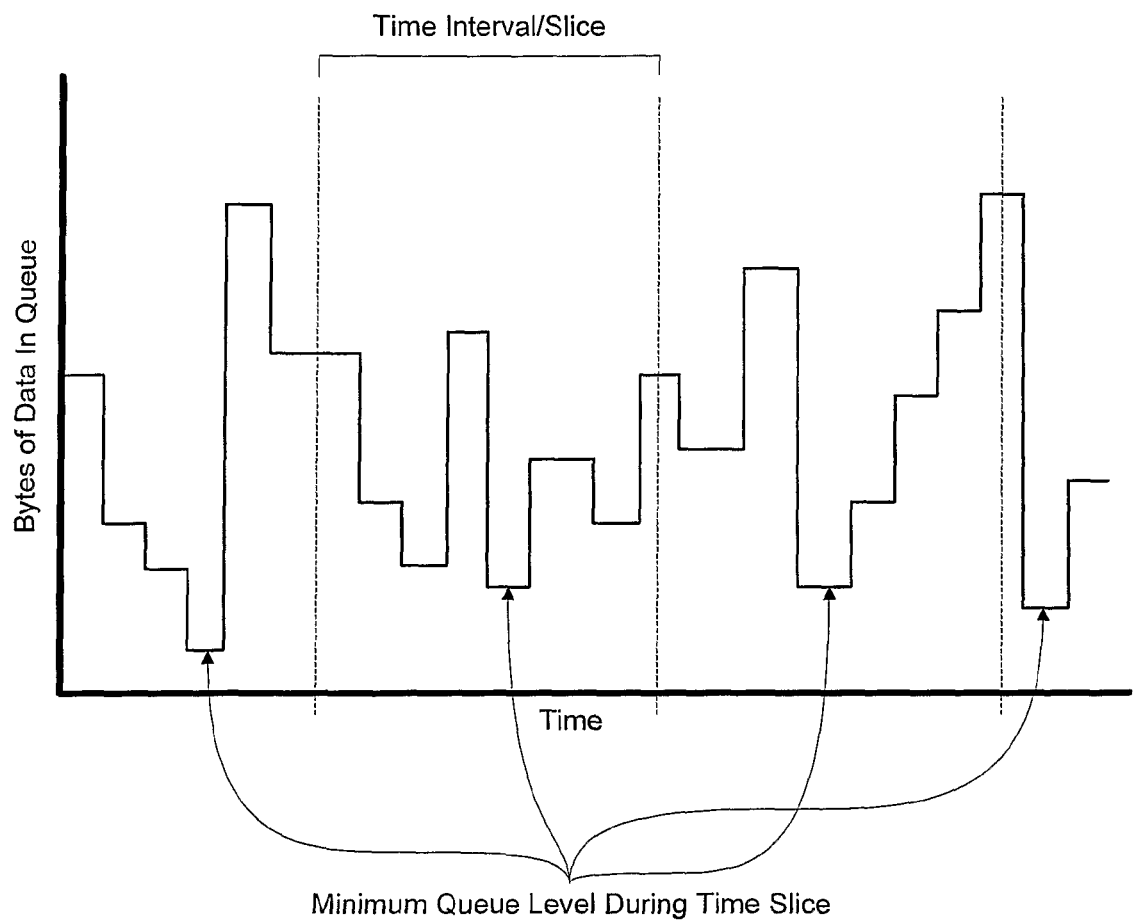
FIG. 45 is graph depicting bytes of data in queue over time, and showing minimum queue levels during time intervals.

FIG. 45 is an example of queue levels and minimums during a time interval.

A node is considered at capacity if it is unable to bring the queue latency down to this level over this time period. If it is unable to do so, then there is too much data flowing into the node to successfully send it out almost as soon as it arrives.

When a node is at capacity it tells all nodes that are connected to it. If all 'chosen destinations' for a queue on a node are marked 'at capacity' then that node tells all its directly connected nodes it that it is also at capacity.

'At capacity' updates travel through the network at the same time as normal latency updates. They do not preempt normal data flow. (see sQueueUpdate previously)

As discussed previously, nodes that are not in the flow of data will attempt to find non-looping alternatives to 'chosen destinations' that become marked 'at capacity'. If a node is in the data stream, it will not attempt to remove an 'at capacity' node as a 'chosen destination' because of its 'at capacity' status, it will make its decision to remove that node based on latency only.

Finding Additional Routes when at Capacity

A node 'at capacity' because it has too much data flowing into it will make a list of all possible additional routes using directly connected nodes. A possible additional route is a node that:
 1. Is not at capacity
 2. Is not sending to this node
 3. Will not Create a Loop
 4. Has a destination of a queue other then the node querying
    (ie. Not loop creating)

For each of these possible routes the at-capacity node will create a unique GUID. This GUID will be sent down each possible route to test each of the routes for a loop. If a loop is detected that route is discarded from the list of possible additional routes.

Each GUID that corresponds to a possible route is sent to the destination node next along that route. That node will store and forward that GUID on to all nodes it has as 'chosen destinations'. If the node chooses a new node for a destination then the GUID will be passed to that new node. A node will deactivate a GUID by telling all 'chosen destinations' to forget the GUID. If all the nodes telling it to remember the GUID, tell it to stop remembering the GUID, or tell them that they are no longer chosen as a destination, or they are disconnected, the GUID is deactivated.

Figure 46:
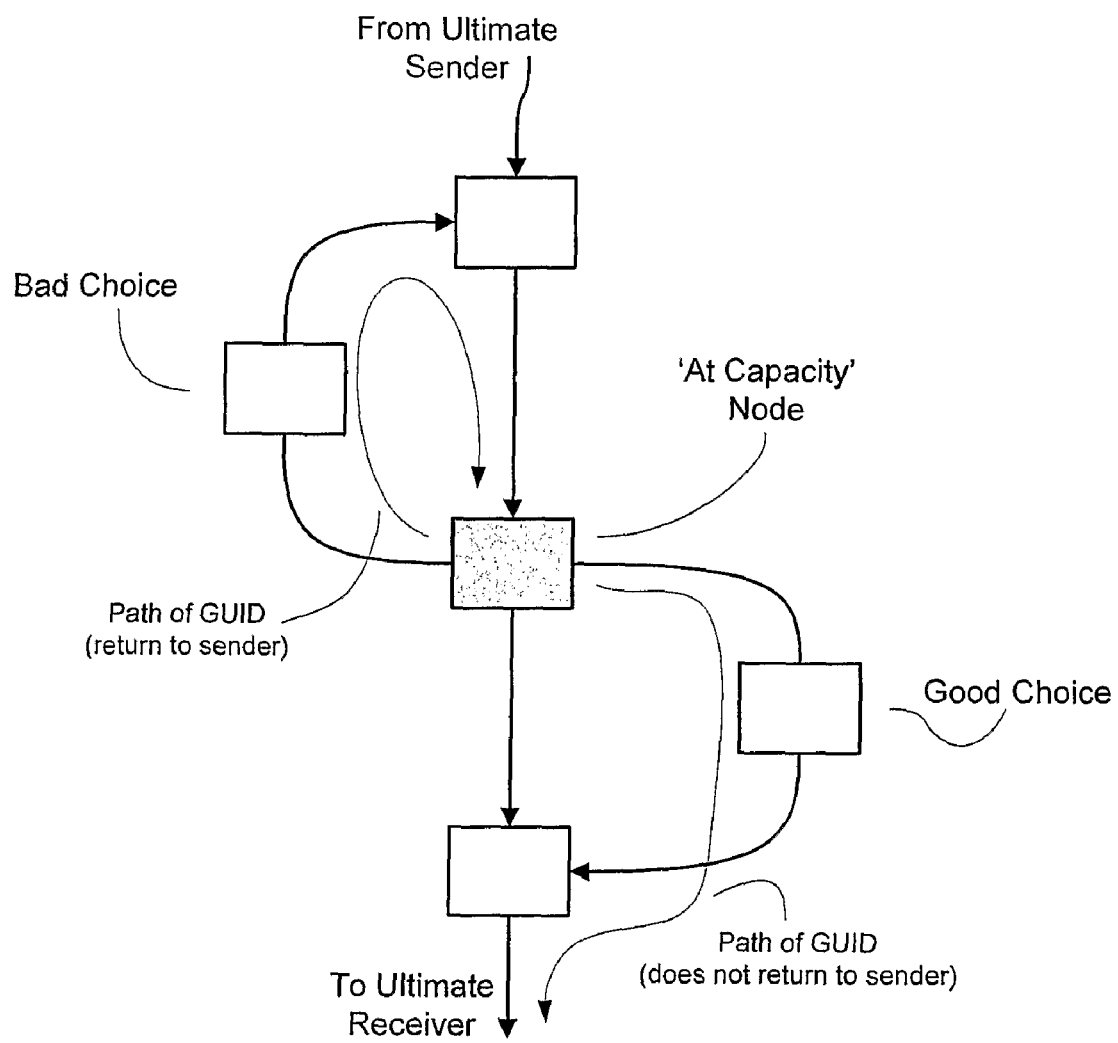
FIG. 46 is a schematic representation of a network showing that when a node at capacity sees a GUID it sent to a possible additional chosen destination it knows that choice would be a bad choice.

FIG. 46 is an example of this. In FIG. 46 if the node at capacity sees a GUID it sent to a possible additional chosen destination it knows that choice would be a bad choice.

In this same manner the GUID sent to a chosen route will enumerate all paths along which data could flow from that node.

If the machine that is at capacity sees one of the GUID's it has sent out coming back to it from a node that is sending it data then it knows that the node down which it sent the GUID forms part of a loop, and that possible route is eliminated as a choice to relieve the 'at capacity' status. A GUID message is composed of a GUID, the name of the queue in question, a 'travel time', and a note telling the node to either 'remember' or 'forget' this GUID.

When a node is told of a GUID to remember or forget it will send this message as soon as possible (see Propagation Priorities). If it has already seen and processed this GUID message it will ignore it.

A GUID message will take the structure of:

```
struct sGUIDProbe {
    // could also be a number that represents this queue
    // (discussed previously)
    sQueueName      qnQueueName;
    // true if the node is supposed to remember this GUID
    // false if its supposed to forget it.
    bool            bRememberGUID;
    // the actual GUID
    char            cGUID[constant_Guid_Size];
    // how far the GUID will travel (based on fUpdateLatency)
    float           fMaximumGUIDTravelTime;
};
```

The travel time for the GUID is set as triple (for example) the difference between the fLatencyUpdate of node looking for a new route and the fLatencyUpdate of the possible new route that is not at capacity. Each time a node receives a GUID probe it subtracts its contribution to the fLatencyUpdate value from the fMaximumGUIDTravelTime time before it tells its directly connected nodes of this GUID probe (instead of adding this value to fLatencyUpdate they way it normally does). If after it subtracts its contribution from fMaximumGUIDTravelTime the value is less then 0, the GUID probe is not passed on to any chosen destinations.

The value that it subtracts is based on the time for a round robin update of all the queues in the same class as the queue this GUID probe is based on. (discussed later, see 'Propagation priorities'—'second group')

The node that is at capacity will wait for a minimum of its initial 'fMaximumGUIDTravelTime' to give the GUIDs a chance to work through the network and loop back to the 'at capacity' node, if a loop exists. If the time has elapsed, all potential choices whose GUID did not make it back to the node are considered valid options.

The lowest latency, not 'at capacity', non-looping node is chosen and a message is sent to that node indicating that it is now a 'chosen destination'. This is done to prevent two directly connected nodes from choosing themselves as destinations, creating a loop.

If two directly connected nodes select each other as destinations at the same time, they will both instantly switch back to their previous destinations and retry the process of finding additional destinations. Since the GUID mechanism includes a random interval the likelihood of the two nodes again selecting each declines dramatically at each iteration.

If all possible routes came back as loops, the 'at capacity' node will remove the GUID's. If this node is still 'at capacity' after a period of time it retry the process looking for alternatives. It will wait (for example) three times the maximum 'fMaximumGUIDTravelTime' used for the last round of GUID probes.

Even though a node has several choices where to send data, the maximum latency allowed in the queue is still max([all chosen destination latencies])−min([all chosen destination latencies])

subject to available memory on that node. As soon as this new destination is chosen the node will be able to clear its 'at capacity' status.

This maximum is not a hard limit, since it is possible there may be outstanding flow control quota allowing for a bit more data to be sent. (see flow control)

Every time a token update is sent to a node sending data to this node, the current minimum latency over the last time interval as well as the 'at capacity' flag is sent along as well. This enables sending nodes to have the current latency data enabling them to always choose the best route.

Removing Unused Additional Routes

Because nodes not in the data stream only ever have one chosen destination, they don't remove additional sources, instead they switch from one source to a better source. (discussed previously).

Nodes in the data stream are the only nodes that are given the potential to develop multiple data paths. (discussed previously).

If a node in the data stream does not use a particular 'chosen destination' to send data for a certain amount of time, then the node will remove that chosen destination from its list of chosen destinations and alert that node that it is no longer a chosen destination.

Telling a node that is no longer a chosen destination will also remove the 'in the data stream' flag unless another node that is 'in the data stream' has also selected this node as a chosen destination.

The certain amount of time to wait before removing an un-used chosen destination should be relatively long compared to the amount of time required to create the connection in the first place. The amount of time a chosen destination is maintained could also be dynamically adjusted over time based on how much time elapsed between when a node is removed until when it is re-added in.

Deciding when to Add/Remove a Chosen Destination while not 'At Capacity'

A node must always have at least one 'chosen destination' if any possible choice exists. (if not its latency would be at infinity)

If a node is in the data stream for a particular queue it may have more then one 'chosen destination' if the queue is the queue used to transfer data. In our TCP/IP handshake example, this would be queue B1 (diagram previously).

If a node is not at capacity, and is not able to remove a 'chosen destination' because all of the 'chosen destinations' are too active to be removed (see previous) then it will try to add a new chosen destination with a latency that is less then highest latency of all the 'chosen destinations'.

It must only choose possible 'chosen destinations' that are not 'at capacity'.

The node does this in hope that it will replace its current 'chosen destinations' with better choices. This will allow the node to make the entire route faster, as well as need less buffer space for messages passing through it.

The node will probe the possible choice with a GUID probe (described above). If the GUID probe fails (a loop was detected) then next time the node attempts to optimize this connection it will pick another directly connected node with the next lowest latency.

Figure 47:
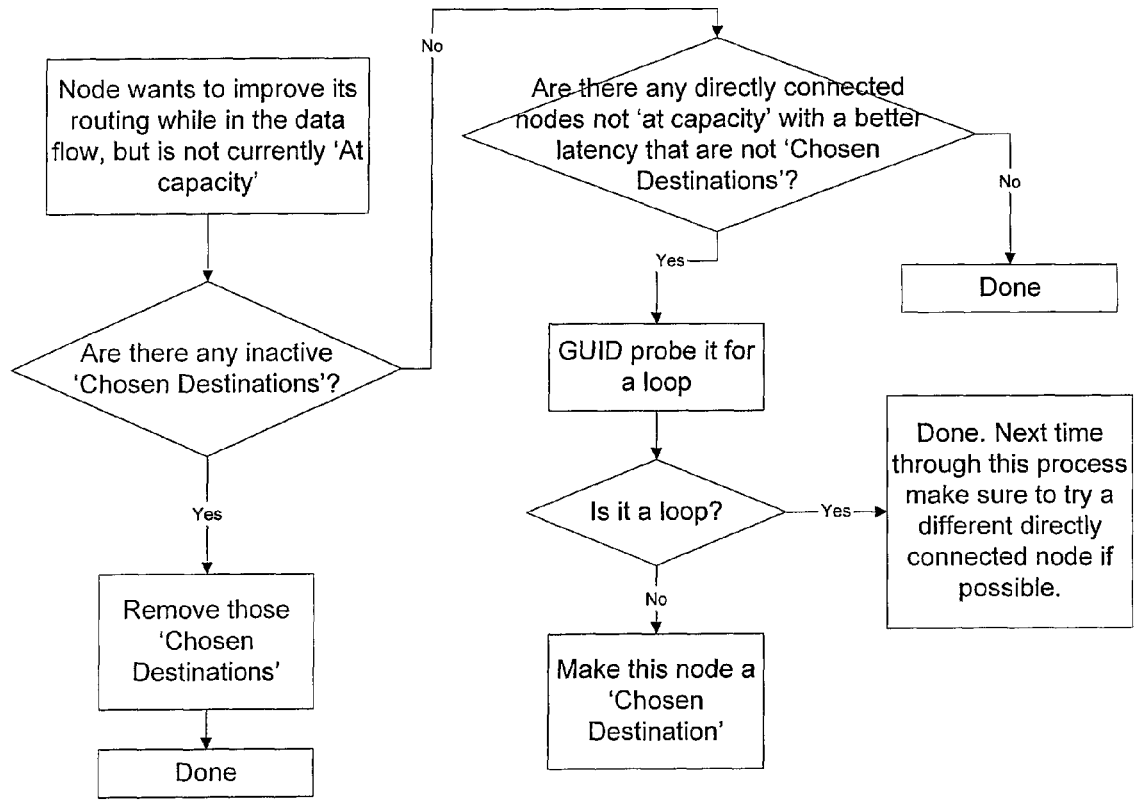
FIG. 47 shows a flow-chart depicting a method of deciding when to add/remove a chosen destination while not 'At Capacity'.

FIG. 47 is a flowchart that illustrates this process.

Resolving Accidentally Created Loops

If a loop is accidentally created in nodes that are not part of the marked data stream their latency and 'fUpdateLatency' will spiral upwards.

Figure 48:
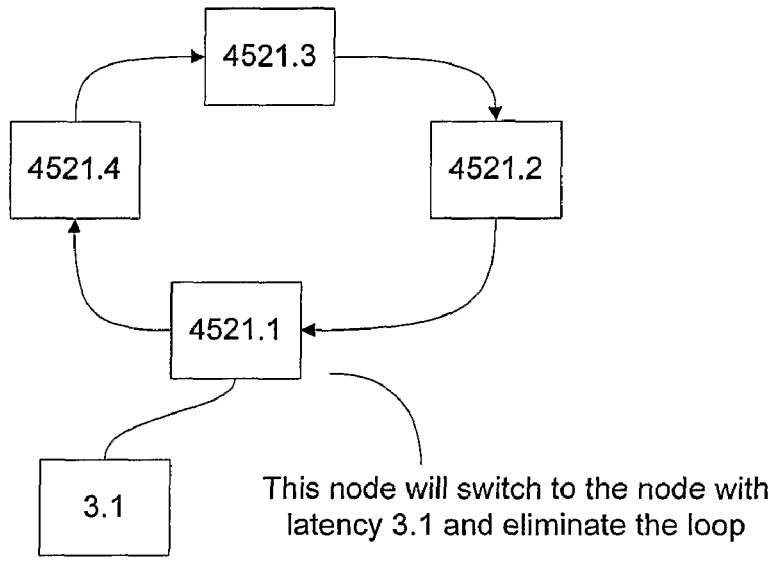
FIG. 48 is a schematic representation of a network showing a loop that was accidentally created in nodes not in the data stream.

FIG. 48 shows a loop that was accidentally created in nodes not in the data stream.

Loops in nodes not in the data stream will be rare because of the way we compare latencies for possible new chosen destinations. (see above).

Because we probe possible new destinations explicitly for loops using GUIDs, loops will not be created in the data stream except very, very rarely as a result of intervening path changes after the GUID mechanism has been used.

Simple loops that do not involve nodes 'at capacity' or nodes that have gone to infinity will be easily resolved using the standard 'passive' loop find mechanism.

Nodes in a loop will create the appearance of knowing about the queue with no actual connection to the ultimate receiver for that queue. For example, if a loop is maintained, and the actual ultimate receiver leaves the network, this loop would continue to self-maintain this queue knowledge.

This problem occurs when:
1. Nodes inside the loop are not 'at capacity' and nodes outside the loop are 'at capacity'.
2. Nodes outside the loop are at 'infinity'.

In both cases the solution is to detect that there is a possibility of a loop and change their latency to infinity in the same manner as discussed previously. This will cause the nodes to move into a non-loop state quickly.

If we're on a node that is not in the data stream, and there are directly connected nodes that are:
1. 'At Capacity' when this node is not
2. Have a latency of infinity when we do not Then loop testing will be invoked.

During the process of choosing a new 'chosen destination' the node recorded the difference in the 'fUpdateLatency''s of the new 'chosen destination' and the old 'chosen destination'. This time in seconds multiplied by three will be referred to as the 'possible loop time' (PLT).

Our loop testing will begin by recording the minimum 'fUpdateLatency', 'fLatencyFromStream' and 'flatency' for the PLT.

If during two successive iterations, all three recorded values ('fUpdateLatency', 'fLatencyFromStream' and 'fLatency') were less then the iteration before, then a GUID probe is used to determine if there is in fact a loop. The GUID probe (see previously) is set up to travel PLT*5 (for example) time through the network.

If a loop is detected then the node that detected it will go to infinity in the same manner as 'Path to Queue Removed'.

If the GUID probe fails then the node returns to its loop testing described above.

If this process repeats three times then the node will goto 'infinity' anyway. (See 'Path to Queue Removed')

When to Send Messages

In determining when to send a message the node decides if the node being sent to:
1. Has room to store the message
2. Provides latency to the destination that is useful given the latencies of other directly connected nodes and the amount of data in this node's queue.

Send to Useful Chosen Destinations Only

Even if a node has chosen multiple 'chosen destinations' for sending messages it does not mean that they will all be used. A 'chosen destination' will only be used if the current latency of data in the queue is equal or greater then the =[Chosen Destination Latency]−min([All Chosen destinations])

If a 'chosen destination' latency is x seconds over the minimum of all the 'chosen destinations' latencies then x seconds of data would be stored on that node before using that chosen destination.

If a chosen destination has latency above the current queue latency (as defined previously) then we have the option of sending a message to that node asking it to inform us when the latency of that node drops below a specified value. Asking a node to send an update at a specified value will also cause the node to send the current latency.

This solves the problem of rapid updates required to keep the sender informed as to the latency of the receiver.

Latency and 'at capacity' updates are passed both in token updates (defined later), as well as a constant stream that is throttled not to exceed X % of node to node bandwidth. Usually this number would be 1-5%. The node would cycle through all known available latencies in a round-robin fashion. (See Propagation Priorities) Other ways to determine what order or frequency to send queue updates could also be used:
1. Percentage Change
2. A particular class of queue names are marked for more frequent updating
3. A 'distance from data stream' counter could be used to increase latency updates in the vicinity of the data stream.

If no queue messages are sent to a chosen destination for a certain time period then that chosen destination is removed from the list of chosen destinations for that node. This time period would be at least an order of magnitude greater then the total time needed to establish the destination initially. An adaptive approach could also be used (described previously).

Flow Control

Each node has a variable amount of memory, primarily RAM, used to support information relevant to connections to other nodes and queues, e.g. message data, latencies, GUIDs, chosen destinations etc.

An example of the need for flow control is if node A has chosen node B as a destination for messages. It is important that node A is not allowed to overrun node B with too much data.

Flow control operates using the mechanism of tokens. Node B will give node A a certain number of tokens corresponding to the number of bytes that node A can send to node B. Node A is not allowed to transfer more bytes then this number. When node B has more space available and it realizes node A is getting low on tokens, node B can send node A more tokens.

There are two levels of flow control. The first is node-to-node flow control and the second is queue-to-queue flow control. Node-to-node flow control is used to constrain the total number of bytes of any data (queues and system messages) sent from node A to node B. Queue-to-queue flow control is used to constrain the number of bytes that move from a queue in node A to a queue in node B with the same name.

For example, if 10 bytes of queue message move from node A to node B, it costs ten tokens in the node-to-node flow control as well as 10 tokens in the queue-to-queue flow control for that particular queue.

When node B first gives node A tokens, it limits the total number of outstanding tokens to a small number as a start-up state from which to adjust to maximize throughput from node A.

Node B knows it has not given node A a high enough 'outstanding tokens' limit when two conditions are met:
if node A has told node B that is had more messages to send but could not because it ran out of tokens, and
Node B has encountered a 'no data to send' condition where a destination would have accepted data if node B had had it to send.

If node A has asked for a higher 'outstanding tokens' limit and node B has not reached 'no data to send' condition, node B will wait for a 'no data to send' condition before increasing the 'outstanding tokens' limit for node A.

Node B will always attempt to keep node A in tokens no matter the 'outstanding tokens limit'. Node B keeps track of how many tokens it thinks node A has by subtracting the sizes of messages it sees from the number of tokens it has given node A. If it sees node A is below 50% of the 'outstanding limit' that node B assigned node A, and node B is able to accept more data, then node B will send more tokens up to node A. Node B can give node A tokens at its discretion up to the 50% point, but at that point it must act.

Assigning more tokens represents an informed estimate on Node B's part as to the maximum number of tokens node A has available to send data with.

This number of tokens, when added to node B's informed estimate of the number of tokens node A has, will not exceed the 'outstanding tokens' limit. It may also be less, depending on the amount of data in node B's queue. (discussed later).

Figure 49:
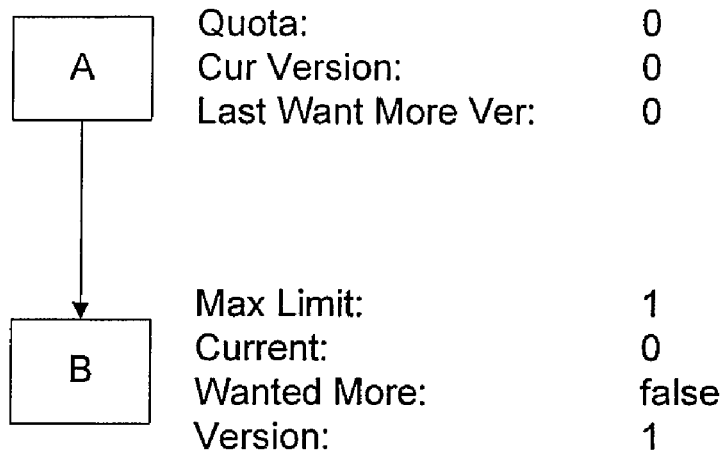
FIG. 49 is a schematic representation of a network showing node A and node B negotiating so that node A can send to node B.

For example, lets consider node A and node B that are negotiating so that node A can send to node B. FIG. 49 shows the current state.

Node B has created the default quota it wants to provide to node A. It then sends a message to node A with the quota (the difference between the current and the maximum). It also includes a version number that is incremented each time the maximum limit is changed. The message node B sends to node A looks like this:

```
struct sQuotaUpdate {
    // the version
    unsigned integer            uiVersion;
    // the queue name or number (see previous)
    sQNName                     qnName;
    // how much additional quota is sent over
    unsigned integer            uiAdditionalQuota;
};
```

Figure 50:
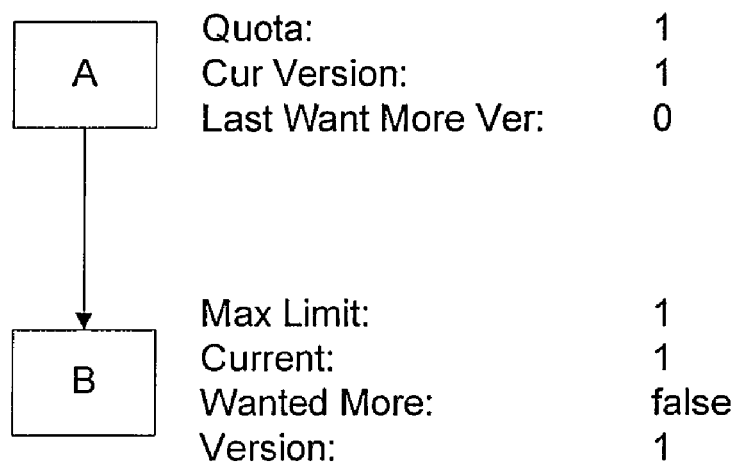
FIG. 50 is a schematic representation of a network showing how node A indicates it wants to send more data.

We do this so that when node A tells us that it wants to send more data, it will only do so once for each time we adjust the maximum limit. FIG. 50 shows the current state.

If node A wants to send a message of 5 bytes to node B it will not have enough quota. Node A would then send a message to node B saying 'I'd like to send more'. It will then set its 'Last Want More Ver' to match the current version. This will prevent node A from asking over and over again for more quota if node B has not satisfied the original request. This message looks like this:

```
struct sRequestMoreQuota {
    // the queue name or number (see previous)
    sQNName          qnName;
};
```

Figure 51:
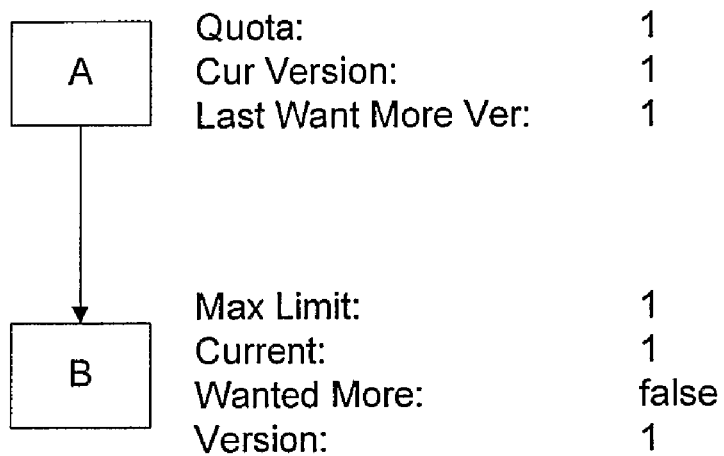
FIG. 51 is a schematic representation of a network showing how two nodes can negotiate transfers of messages when a quota is limited.

FIG. 51 shows this state.

Figure 52:
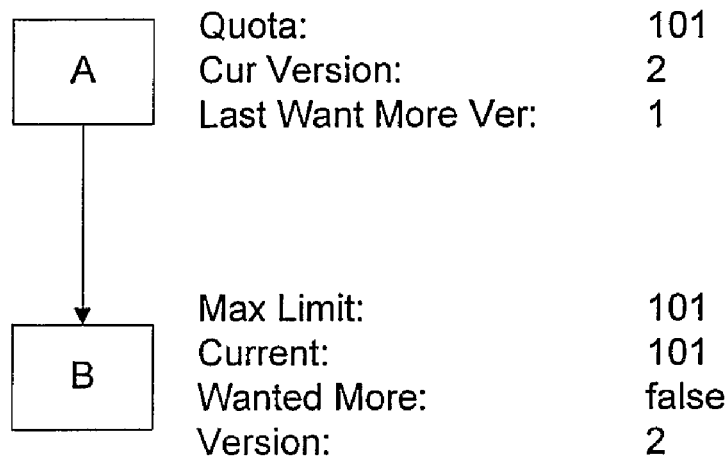
FIG. 52 is a schematic representation of a network showing how two nodes can negotiate transfers of messages when a quota is limited.

Node B has no data in its queue and yet it would have been able to send to its chosen destination, so it will increase the maximum quota limit for node A to 100 bytes. It will send along the new quota along with the new version number. FIG. 52 shows this state.

Figure 53:
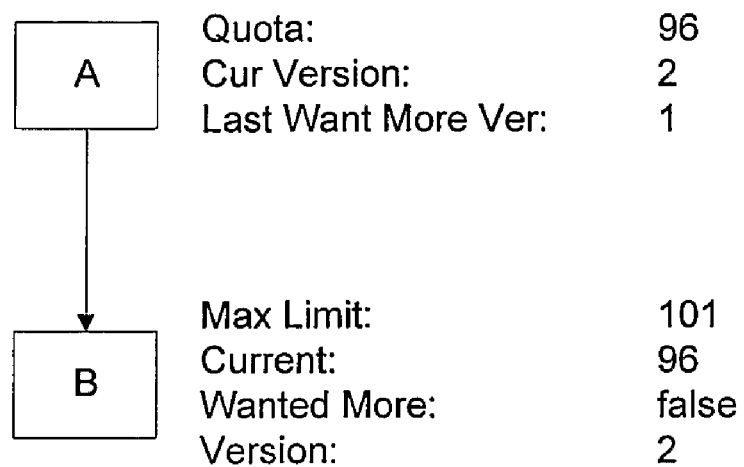
FIG. 53 is a schematic representation of a network showing how two nodes can negotiate transfers of messages when a quota is limited.

Node A now has enough quota to send its 5 byte message. When the message is sent, node A removes 5 bytes from its available quota. When the message is received by node B, it removes 5 bytes from the current quota it thinks node A has. FIG. 53 shows this state.

Messages can continue to flow until node A runs out of quota or messages to send. If the quota that node B thinks node A has drops below 50 bytes, node B will send a quota update immediately. A quota update that does not change the maximum limit will not result in the version being incremented. Quota updates for different queues can piggy back together, thus if one quota update 'needs' to be sent, others that just need a top off can be sent at the same time. This will reduce the incidence of a special message being sent with just one quota update.

In general, system messages can also be piggy-backed with data messages to reduce their impact.

The same approach to expanding the 'outstanding limit' for queue-to-queue flow control also applies to node-to-node flow control.

The 'outstanding limit' is also constantly shrunk at a small but fixed rate by the system (for example, 1% every second). This allows automatic correction over time for 'outstanding limits' that may have grown large in a high capacity environment but are now in a low capacity environment and the 'outstanding limit' is unnecessarily high. If this constant shrinking drops the 'outstanding limit' too low, then the previous mechanism (requesting more tokens and more being given if the receiving node encounters a 'no data to send' condition) will detect it and increase it again.

At Capacity Flow Control

When giving other nodes quota to send, it is important that they be given enough quota to move the receiving node to an 'at capacity' state and keep it there if possible.

If the latency in a queue on the node is over (max([latency all chosen destinations])−min([latency all chosen destinations])), then each incoming flow of data must not get more than their maximum 'outstanding limit' of quota amount over this maximum latency.

This is implemented by having an 'over capacity token count' variable attached to the flow control structures on the receiving side that records the number of bytes received from that source while the queue is over capacity.

This number is subtracted from the 'max outstanding limit' when it comes to providing the sending node with more quota.

If the queue latency drops below its maximum latency the 'over capacity token count' variable is set to 0.

When data is removed from a queue that is above capacity, we take the number of bytes that have been removed and subtract that sum of bytes as evenly as we can from all 'over capacity token count' variables that are greater then zero. It is important that the 'over capacity token count' is always equal to or greater then zero.

For example, if 120 bytes are removed from the queue and there are four connections putting data into that queue and their 'over capacity token counts' are 0, 100, 20, 50, we would divide the number of bytes (120) by the number of 'over capacity token count' variables greater then zero (three), this gives us 40. Since the lowest 'over capacity token count' variable is less then 40 (20), we will subtract that number (20) from all 'over capacity token count' variables. This leaves us with 0, 80, 0, 50 and have 60 bytes still left. We repeat the process and subtract 30 from each of the remaining two 'over capacity token count' variables, leaving us 0, 50, 0, 20.

Flow Control for EUS Queues

In TCP/IP window size selection is important. If the window size in TCP/IP is too small performance will suffer, if it is too large system resources will be used up without increasing performance.

This invention allows rapid convergence to the best window size using a 'send-side only' algorithm.

Nodes that are part of the marked data stream will only buffer enough data to ensure they can send at maximum speed. This means that even if there are gigabytes of data to send, only a relatively fixed, small percent will ever be in transit at a given time.

However, if there are gigabytes of data to send (instead of just one small message), many more paths will be used to transfer that data. However, no matter how many paths were used the total amount of data in transit would not exceed the buffer provided to the ultimate sender by the ultimate receiver.

A key metric that a node uses to determine which nodes they will send to is latency. If there are a thousand seconds of data remaining to send, then all paths with a latency to the destination of under 1000 seconds should be considered. If there is a very small amount of data and the latency to send it is 10 ms, then very few paths (and only the fastest) will be used to transfer data.

This allows nodes to recruit as many or as few nodes as needed to insure the fastest transfer of data. This technique allows us to implicitly increase bandwidth when needed by trading off latency that is not needed.

The amount of data in transit is also limited by the size of buffer the sending node can allocate to that queue. The best size for the send buffer is such that its latency is:

SendBufferLatency=>Max(AllChosenDestinationLatencys)−Min(AllChosenDestinationLatencys)

This means that if we can keep adding nodes to our chosen destination list, we'll be able to keep expanding our send buffer on the ultimate sender.

The node with the EUS sending the messages should allow this send buffer to grow to a point where the EUS can keep the queue 'at capacity' (in the same way as flow control works). This ensures that all 'chosen destinations' can be used as much as possible.

At the ultimate receiver messages received are placed into the re-order buffer. As the node is able to place these messages in order, they are shifted into a queue that the EUS uses to de-queue messages for processing. The size of this de-queue buffer is set the same way as the queue buffers between nodes (discussed in flow control).

If the queue the EUS uses to retrieve messages exceeds its maximum size, this node tells its directly connected nodes that it is 'at capacity', and does not give any more quota to the directly connected nodes. Ordered messages from the re-order buffer are still placed into this queue used by the EUS, however the flow of incoming messages to the re-order buffer will be cut off because this node is no longer handing out quota to directly connected nodes for this queue.

If the queue the EUS uses gets completely empty, and directly connected nodes wanted to send more messages to the node with the EUS, then the maximum size of the queue that the EUS uses is expanded (in the same way the flow control works).

The size of this queue is also subject to downward pressure that same way the queues are during flow control.

The size of the re-order buffer has no relation to the number of messages (or the number of bytes) that the queue used by the EUS can hold.

If the receiving EUS were to completely stop processing messages, all the nodes in the network would shift to 'at capacity' for the queue, and the ultimate sender would very quickly be given no more quota with which to push messages into the network.

Propagation Priorities

In a larger network, bandwidth throttling for control messages will need to be used.

We're going to use several types of throttling. Total 'control' bandwidth will be limited to a percent of the maximum bandwidth available for all data.

Control messages will be broken into to groups. Both these groups will be individually bandwidth throttled based on a percentage of maximum bandwidth. Each directly connected node will have its own version of these two groups.

For example, we may specify 5% of maximum bandwidth for each group, with a minimum size of 4K. In a simple 10 MB/s connection this would mean that we'd send a 4K packet of information every:

$$= 4096 / (10 \text{ MB/s} * 0.05)$$
$$= 0.0819 \text{ s}$$

So in this connection we'd be able to send a control packet every 0.0819 s, or approximately 12 times every second for each group.

The percentages, and sizes of blocks to send are examples, and can be changed by someone skilled in the art to better meet the requirements of their application.

First Bandwidth Throttled Group

The first bandwidth throttled group sends these messages. These messages should be concatenated together to fit into the size of block control messages fit into.
1. Name to number mappings for queues needed for the following messages.
2. Standard Flow Control Messages
3. GUID probes
4. Informing a node if its now a 'Chosen Destination'
5. HSPP messages
6. Initial Queue Knowledge/To Infinity/From Infinity of HSPP queues
7. Initial Queue Knowledge/To Infinity/From Infinity of non-HSPP queues.

Second Bandwidth Throttled Group

The second group sends latency updates for queues. It divides the queues into three groups, and sends each of these groups in a round robin fashion interleaved with each other 1:1:1.

The first two groups are created by ordering all queues using the value of 'fLatencyFromStream'. If the queue has multiple chosen destinations, then the 'chosen destination' with the lowest latency is used to decide which 'fLatencyFromStream' value we're going to use.

The queues are ordered in ascending order in a similar manner described previously in the single path embodiment. They are divided into two based on how many updates can be sent in a half a second using the throttled bandwidth. This ensures that the first group will be entirely updated frequently, and the rest will still be updated—but less frequently.

The third group is composed of queues where this node is in the data stream.

Each latency update includes a value 'fUpdateLatency'. This value 'fUpdateLatency' is calculated separately for queues in each of the three groups. It is calculated as the amount of time that it takes to send all items in the group once. This value is added to the 'fUpdateLatency' of the chosen destination with the lowest 'fLatency'.

This value is also used when determining how far a GUID probe will travel.

The time to send each of the three groups should be constantly updated based on current send rates.

A queue can only be a member of one of these groups at a time. This is important, otherwise the 'fUpdateLatency' would be difficult to calculate.

The 'fLatencyFromStream' is calculated the same way as 'fUpdateLatency', except all nodes in a data stream will not add the 'fLatencyFromStream' value from another node when they pass their 'fLatencyFromStream' onto directly connected nodes.

For example, if node A is in the data stream, and its time to update the group which the particular queue is in takes 3 seconds, it will tell all directly connected nodes that it is 3 seconds from the data stream. Alternatively, it could tell all directly connected nodes that it is 0 seconds from the data stream.

If a queue needs to move from a high frequency update to a low frequency update, we'll change its reported 'fUpdateLatency' latency number to match the lower frequency group, but keep the item in the high frequency group for three updates cycles before actually moving it to the lower frequency group.

If a node becomes aware of a new queue, it will place that queue at the end of the list of queues to update in one of three groups it belongs to in the second group of throttled updates.

Possible Uses

These are examples where this invention could be used. These examples are not intended to limit the use of the invention.
1. Used in communication networks it would enable network topography to take unlimited structures
2. Used in cell phone networks it would remove the need for current 'cells' structure that needs to hand off a moving cell phone to the next communications tower.
3. Used in a grid computing environment to help eliminate hotspots and deal with failed nodes.

4. Used by utilities with the software enabled in all electrical appliances such appliances could be turned on or off from a central command centre in order to achieve system load management
5. Used in computing it would enable multiple interconnected CPUs or computers to be linked in order to exchange messages for applications such as grid computing, mass storage or super-computing environments which applications are currently constrained by the lack of flexible, dynamic message routing capability.
6. Used in military applications it would enable every soldier and every piece of equipment in a theatre of combat to be in constant communication across a continually changing topographical structure and enable the network to continue regardless of elements being removed or destroyed or added.
7. Used to form discrete network groups either in isolation from or as a subset of larger networks it would enable any group to form its own network at any time.
8. Used in traffic management it would enable motor vehicles equipped with this software and with communications ability to coordinate their highway interaction for greater efficiency or safety or highway traffic management facilitation.
9. Used in traffic management of traffic signals it would enable all traffic lights to communicate with traffic management computers and with each other for greater effectiveness in managing traffic flows, and enable traffic signals to be added or deleted from the system with no need for any software administration to the system.
10. Used as a 'master network' it could become the communication utility for a community or region, providing virtually unlimited capacity and back-up resources because every participant in the network could provide linkage to the whole network and the sum of its resources.
11. Used to manage a computing centre the software would add or subtract machines and applications and administer and monitor the centre without human intervention and without any need to curtail or cease operations while doing so.
12. Used within an electrical energy grid this software could be used to integrate generating, transmission and consumption to deal with both ordinary changes and untoward events by making decisions based on predetermined criteria and acting immediately,
13. Used to enable remote computing by dynamically linking users and remote sites with no human intervention.
14. Used in air traffic control by managing and coordinating aircraft, air traffic and ground resources
15. Used to coordinate and network varying communications technologies such as wireless, land line, satellite, computer and airborne systems
16. Used to create efficient routes for the physical delivery of goods to various destinations, such routes able to be altered dynamically for varying circumstances such as traffic pattern changes, additions or deletions to the route destinations.
17. Used as a mathematical tool similar to biological computing for solving multiple simultaneous computations to find a correct solution, especially to complex problems that involve many criteria.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A self-organizing network comprising:
   (a) a plurality of nodes;
   (b) at least one link interconnecting neighbouring ones of said nodes;
   (c) each of said nodes being operable to maintain information about each other node that is within a first portion of said nodes, said information including:
      (i) a first identity of another one of said nodes within said first portion;
      (ii) for each first identity, a second identity representing a neighbouring node that is a desired step to reach the said another one of said nodes respective to said first identity;
   (d) each of said nodes being operable to maintain a third identity representing a neighbouring node that is a desired step to send a request for information about said nodes in a second portion of said nodes that is not included in said first portion,
   wherein said third identity is determined based on which of said neighbouring nodes most frequently appears in each said second identity.

2. The network of claim 1 wherein each of said nodes is operable to exchange said information with its neighbouring nodes.

3. The network of claim 1 wherein said at least one link has a set of service characteristics such that any path between two of said nodes has a cumulative set of service characteristics.

4. The network of claim 3 wherein said information includes said cumulative set; and said desired step associated with said second identity is based on which of said paths has a desired cumulative set of service characteristics.

5. The network of claim 3 wherein said service characteristics include at least one of bandwidth, latency and bit error rate.

6. The network of claim 1 wherein said nodes are at least one of computers, telephones, sensors, personal digital assistants.

7. The network of claim 1 wherein said at least one link is based on a wireless connection.

8. The network of claim 1 wherein a network core is formed between neighbouring nodes that determine each other is a desired step to locate said nodes within said second portion.

9. The network of claim 8 wherein each said node is operable to deliver instructions to other nodes between said core and itself to maintain information about itself.

10. The network of claim 8 wherein said information includes, for each said first identity, a value representing a distance-to-data marked stream for said node associated with said first identity.

11. The network of claim 10 wherein nodes associated with said first identity are ranked in an ascending order increasing according to said distance and said instructions are delivered to those nodes according to said rank.

12. The network of claim 1 comprising at least 2,000 nodes interconnected by a plurality of links.

13. The network of claim 1 comprising at least 5,000 nodes interconnected by a plurality of links.

14. The network of claim 1 comprising at least 10,000 nodes interconnected by a plurality of links.

15. The network of claim 1 comprising at least 100,000 nodes interconnected by a plurality of links.

16. A computer readable medium, non-transitory storage medium, for storing a set of programming instructions for execution by, or on behalf of, a node forming part of a self-organizing network having a plurality of other nodes and at least one link interconnecting neighbouring ones of said nodes; said programming instructions for causing a computing apparatus within said node to maintain information about each of said other nodes that are within a first portion of all of said other nodes, said information including:
- (a) a first identity of another one of said nodes within said first portion;
    - (i) for each said first identity, a second identity representing a neighbouring node that is a desired step to reach the said another one of said nodes respective to said first identity;
- said programming instructions for further causing said computing apparatus to maintain a third identity representing a neighbouring node that is a desired step to send a request for information about said nodes in a second portion of said nodes that are not included in said first portion; and wherein said third identity is determined based on which of said neighbouring nodes most frequently appears in each said second identity.

17. The computer readable medium of claim 16 wherein each of said nodes is operable to exchange said information with its neighbouring nodes.

18. The computer readable medium of claim 16 wherein said at least one link has a set of service characteristics such that any path between two of said nodes has a cumulative set of service characteristics.

19. The computer readable medium of claim 18 wherein said information includes said cumulative set; and said desired step associated with said second identity is based on which of said paths has a desired cumulative set of the service characteristics.

20. The computer readable medium of claim 18 wherein said service characteristics include bandwidth.

21. The computer readable medium of claim 18 wherein said service characteristics include latency.

22. The computer readable medium of claim 18 wherein said service characteristics include bit error rate.

23. The computer readable medium of claim 16 wherein said nodes are computers.

24. The computer readable medium of claim 16 wherein said nodes are telephones.

25. The computer readable medium of claim 16 wherein said nodes are sensors.

26. The computer readable medium of claim 16 wherein said nodes are personal digital assistants.

27. The computer readable medium of claim 16 wherein said at least one link is based on wireless connections.

28. The computer readable medium of claim 16 wherein a network core is formed between neighbouring nodes that determine each other is a desired step to locate said nodes within said second portion.

29. The computer readable medium of claim 28 wherein each said node is operable to deliver instructions to other nodes between said core and itself to maintain information about itself.

30. The computer readable medium of claim 28 wherein said information includes, for each said first identity, a value representing a distance-to-data marked stream for said node associated with said first identity.

31. The computer readable medium of claim 30 wherein nodes associated with said first identity are ranked in an ascending order increasing according to said distance and said instructions are delivered to those nodes according to said rank.

32. The computer readable medium of claim 16 comprising at least 2,000 nodes interconnected by a plurality of links.

33. The computer readable medium of claim 16 comprising at least 5,000 nodes interconnected by a plurality of links.

34. The computer readable medium of claim 16 comprising at least 10,000 nodes interconnected by a plurality of links.

35. The computer readable medium of claim 16 comprising at least 100,000 nodes interconnected by a plurality of links.

* * * * *